United States Patent
Sibbach et al.

(10) Patent No.: US 12,510,025 B2
(45) Date of Patent: *Dec. 30, 2025

(54) REVERSE FLOW GAS TURBINE ENGINE HAVING ELECTRIC MACHINE

(71) Applicants: General Electric Company, Evendale, OH (US); General Electric Company Polska Sp. z o.o., Warsaw (PL)

(72) Inventors: Arthur William Sibbach, Boxford, MA (US); Adam Tomasz Paziński, Warsaw (PL)

(73) Assignees: General Electric Company, Evendale, OH (US); General Electric Company Polska Sp. z o.o., Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 18/926,865

(22) Filed: Oct. 25, 2024

(65) Prior Publication Data

US 2025/0043719 A1    Feb. 6, 2025

Related U.S. Application Data

(63) Continuation-in-part of application No. 18/307,938, filed on Apr. 27, 2023, now Pat. No. 12,188,414.

(30) Foreign Application Priority Data

Feb. 17, 2023   (PL) ......................................... 443814

(51) Int. Cl.
*F02C 6/20* (2006.01)
*F02C 3/06* (2006.01)
(Continued)

(52) U.S. Cl.
CPC ................ *F02C 6/206* (2013.01); *F02C 3/06* (2013.01); *F02C 7/06* (2013.01); *F02C 7/08* (2013.01); *F02C 7/36* (2013.01)

(58) Field of Classification Search
CPC .. F01N 3/0205; F02C 3/04; F02C 3/12; F02C 3/24; F02C 3/045; F02C 6/206;
(Continued)

(56) References Cited

U.S. PATENT DOCUMENTS

| 2,394,299 A | * | 2/1946 | Friedrich | B64D 35/04 |
| | | | | 416/127 |
| 3,850,388 A | | 11/1974 | Olcott et al. | |

(Continued)

FOREIGN PATENT DOCUMENTS

| CN | 108603442 B | * | 9/2020 | ............. F02C 7/045 |
| EP | 2708701 A2 | | 3/2014 | |

(Continued)

OTHER PUBLICATIONS

European Patent Office, "Extended European Search Report," issued in connection with European Patent Application No. 24151475.1, dated Jun. 14, 2024, 7 pages.

*Primary Examiner* — Craig Kim
(74) *Attorney, Agent, or Firm* — Hanley, Flight & Zimmerman, LLC

(57) ABSTRACT

An aircraft engine assembly includes a gas turbine engine having an intake channel configured to receive an incoming flow of air and thereby form an intake flow of air, the intake channel configured to turn the received incoming flow of air from an incoming flow direction to a first axial direction of the gas turbine engine, the incoming flow direction reverse of the first axial direction, and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

20 Claims, 29 Drawing Sheets

(51) Int. Cl.
*F02C 7/06* (2006.01)
*F02C 7/08* (2006.01)
*F02C 7/36* (2006.01)

(58) Field of Classification Search
CPC .......... F05D 2240/14; F05D 2260/213; F05D 2220/323; F05D 2220/32
See application file for complete search history.

(56) References Cited

U.S. PATENT DOCUMENTS

| | | | |
|---|---|---|---|
| 4,688,995 A * | 8/1987 | Wright | B64C 11/306 |
| | | | 416/129 |
| 4,856,273 A | 8/1989 | Murray | |
| 4,976,102 A * | 12/1990 | Taylor | F02C 7/20 |
| | | | 416/129 |
| 5,265,408 A | 11/1993 | Sheoran et al. | |
| 6,142,418 A | 11/2000 | Weber et al. | |
| 6,171,055 B1 | 1/2001 | Vos et al. | |
| 7,372,175 B2 | 5/2008 | Bouiller et al. | |
| 8,176,725 B2 | 5/2012 | Norris et al. | |
| 8,272,833 B2 * | 9/2012 | Gallet | F04D 29/362 |
| | | | 416/129 |
| 8,278,774 B2 | 10/2012 | Macchia | |
| 8,438,829 B2 * | 5/2013 | Negulescu | F02K 3/072 |
| | | | 416/129 |
| 8,459,038 B1 | 6/2013 | Lickfold et al. | |
| 8,534,044 B2 | 9/2013 | Smith | |
| 8,566,000 B2 | 10/2013 | Lickfold et al. | |
| 8,701,381 B2 * | 4/2014 | Eames | F01D 7/00 |
| | | | 60/39.163 |
| 9,008,943 B2 | 4/2015 | Lickfold et al. | |
| 9,057,326 B2 * | 6/2015 | Charier | F01D 1/24 |
| 9,097,134 B2 | 8/2015 | Ferch et al. | |
| 9,157,377 B2 | 10/2015 | Lickfold et al. | |
| 9,169,780 B2 | 10/2015 | Barnett et al. | |
| 9,239,029 B2 | 1/2016 | Herrmann | |
| 9,410,482 B2 * | 8/2016 | Krautheim | F02K 3/06 |
| 9,915,164 B2 | 3/2018 | Roberge | |
| 9,932,120 B2 | 4/2018 | Fisher et al. | |
| 10,059,432 B1 | 8/2018 | Lisio | |
| 10,176,648 B2 | 1/2019 | Descubes et al. | |
| 10,308,366 B2 | 6/2019 | Kupiszewski et al. | |
| 10,435,167 B2 | 10/2019 | Thiriet et al. | |
| 10,458,340 B2 | 10/2019 | Lefebvre | |
| 10,550,764 B2 | 2/2020 | Roberge | |
| 10,634,053 B2 | 4/2020 | Schwarz et al. | |
| 10,677,166 B2 * | 6/2020 | Pesyna | F02K 3/06 |
| 10,800,514 B2 | 10/2020 | Lisio | |
| 10,816,085 B2 | 10/2020 | Olson et al. | |
| 11,073,200 B2 | 7/2021 | Gebhard et al. | |
| 11,085,521 B2 | 8/2021 | Edwards et al. | |
| 11,162,379 B2 | 11/2021 | Spierling | |
| 11,242,156 B2 | 2/2022 | Spierling | |
| 11,268,453 B1 | 3/2022 | Desjardins et al. | |
| 11,371,430 B2 | 6/2022 | Lents et al. | |
| 11,378,009 B2 * | 7/2022 | Roberge | F02K 3/115 |
| 11,492,918 B1 * | 11/2022 | Ostdiek | F01D 7/00 |
| 11,614,037 B2 * | 3/2023 | Rambo | F02C 6/14 |
| | | | 60/782 |
| 11,808,208 B2 | 11/2023 | De Bellis et al. | |
| 11,828,247 B2 | 11/2023 | Eddy | |
| 11,852,232 B1 | 12/2023 | Speller et al. | |
| 2010/0126178 A1 * | 5/2010 | Hyde | F01K 23/10 |
| | | | 60/645 |
| 2010/0155016 A1 * | 6/2010 | Wood | F01D 25/12 |
| | | | 165/181 |
| 2012/0216506 A1 * | 8/2012 | Eleftheriou | F28D 21/001 |
| | | | 29/401.1 |
| 2013/0091850 A1 | 4/2013 | Francisco | |
| 2013/0145769 A1 | 6/2013 | Norris et al. | |
| 2013/0183136 A1 | 7/2013 | Roberge et al. | |
| 2013/0255224 A1 | 10/2013 | Kupratis et al. | |
| 2014/0001307 A1 | 1/2014 | Ehinger et al. | |
| 2014/0079530 A1 | 3/2014 | Ferch et al. | |
| 2016/0017810 A1 * | 1/2016 | Lord | E04B 1/84 |
| | | | 60/725 |
| 2016/0290226 A1 | 10/2016 | Roberge | |
| 2016/0312702 A1 * | 10/2016 | Thomas | F28F 27/02 |
| 2018/0003071 A1 | 1/2018 | Lents et al. | |
| 2018/0003072 A1 | 1/2018 | Lents et al. | |
| 2018/0003109 A1 | 1/2018 | Lents et al. | |
| 2018/0230911 A1 * | 8/2018 | Pastouchenko | F01D 25/24 |
| 2019/0040795 A1 * | 2/2019 | Regnard | F02C 7/14 |
| 2019/0063324 A1 | 2/2019 | Gould et al. | |
| 2019/0128189 A1 * | 5/2019 | Rambo | F02K 3/115 |
| 2019/0316486 A1 | 10/2019 | Roberge | |
| 2020/0017225 A1 | 1/2020 | Chung et al. | |
| 2020/0063599 A1 * | 2/2020 | Waun | B60L 1/003 |
| 2020/0080476 A1 | 3/2020 | Plante et al. | |
| 2020/0173300 A1 | 6/2020 | Gemin | |
| 2020/0182183 A1 * | 6/2020 | Hunter | B64D 31/04 |
| 2020/0291810 A1 | 9/2020 | Spierling | |
| 2021/0231058 A1 | 7/2021 | Plante et al. | |
| 2021/0239046 A1 | 8/2021 | Muldoon | |
| 2021/0262386 A1 | 8/2021 | Makela et al. | |
| 2021/0324799 A1 | 10/2021 | Suzuki et al. | |
| 2021/0355869 A1 | 11/2021 | Lefebvre | |
| 2021/0388732 A1 | 12/2021 | Turcotte | |
| 2022/0045573 A1 | 2/2022 | Seki et al. | |
| 2022/0090507 A1 | 3/2022 | Erdmenger et al. | |
| 2022/0307418 A1 | 9/2022 | Vitt et al. | |
| 2022/0403782 A1 | 12/2022 | Menheere | |
| 2023/0243310 A1 | 8/2023 | Plante et al. | |
| 2023/0349302 A1 | 11/2023 | Gebhard et al. | |
| 2023/0349326 A1 | 11/2023 | Turnquist et al. | |
| 2024/0043133 A1 * | 2/2024 | Giannini | B64D 35/023 |
| 2025/0043719 A1 * | 2/2025 | Sibbach | F02C 6/206 |

FOREIGN PATENT DOCUMENTS

| | | | | |
|---|---|---|---|---|
| EP | 2615275 B1 * | 3/2015 | | F01D 25/12 |
| EP | 3792465 A1 | 3/2021 | | |
| EP | 3808430 B1 | 8/2023 | | |
| FR | 2981406 A1 | 4/2013 | | |
| FR | 3060661 A1 * | 6/2018 | | F02C 6/206 |
| FR | 3061239 A1 * | 6/2018 | | B64D 27/26 |
| FR | 3127269 A1 | 3/2023 | | |
| FR | 3130896 A1 | 6/2023 | | |
| FR | 3130897 A1 | 6/2023 | | |
| FR | 3133367 A1 | 9/2023 | | |
| FR | 3133368 A1 | 9/2023 | | |
| GB | 2610568 A | 3/2023 | | |
| GB | 2633130 A * | 3/2025 | | B64C 13/503 |
| WO | 2024018137 A1 | 1/2024 | | |

* cited by examiner

REVERSE FLOW GAS TURBINE ENGINE HAVING ELECTRIC MACHINE

PRIORITY INFORMATION

The present application claims priority to U.S. patent application Ser. No. 18/307,938, filed on Apr. 27, 2023, which claims priority to Polish Patent Application Number P.443814, filed on Feb. 17, 2023. U.S. patent application Ser. No. 18/307,938 and Polish Patent Application Number P.443814 are hereby incorporated by reference in their entirety for all purposes.

FIELD

The present disclosure relates generally to a reverse flow gas turbine engine having an electric machine.

BACKGROUND

A gas turbine engine generally includes a turbomachine and a rotor assembly. Gas turbine engines, such as turboprop engines, may be used for aircraft propulsion. In the case of a turboprop engine, the rotor assembly may be configured as a variable pitch propeller. In some installations the gas turbine engine is oriented in a reverse flow configuration such that an air flow provided by forward motion of an aircraft is received by the gas turbine engine and turned to flow in a reverse direction through the turbomachinery of the gas turbine engine before an exhaust is discharged from the engine. Locating auxiliary components in such a reverse flow configuration remains an area of interest.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
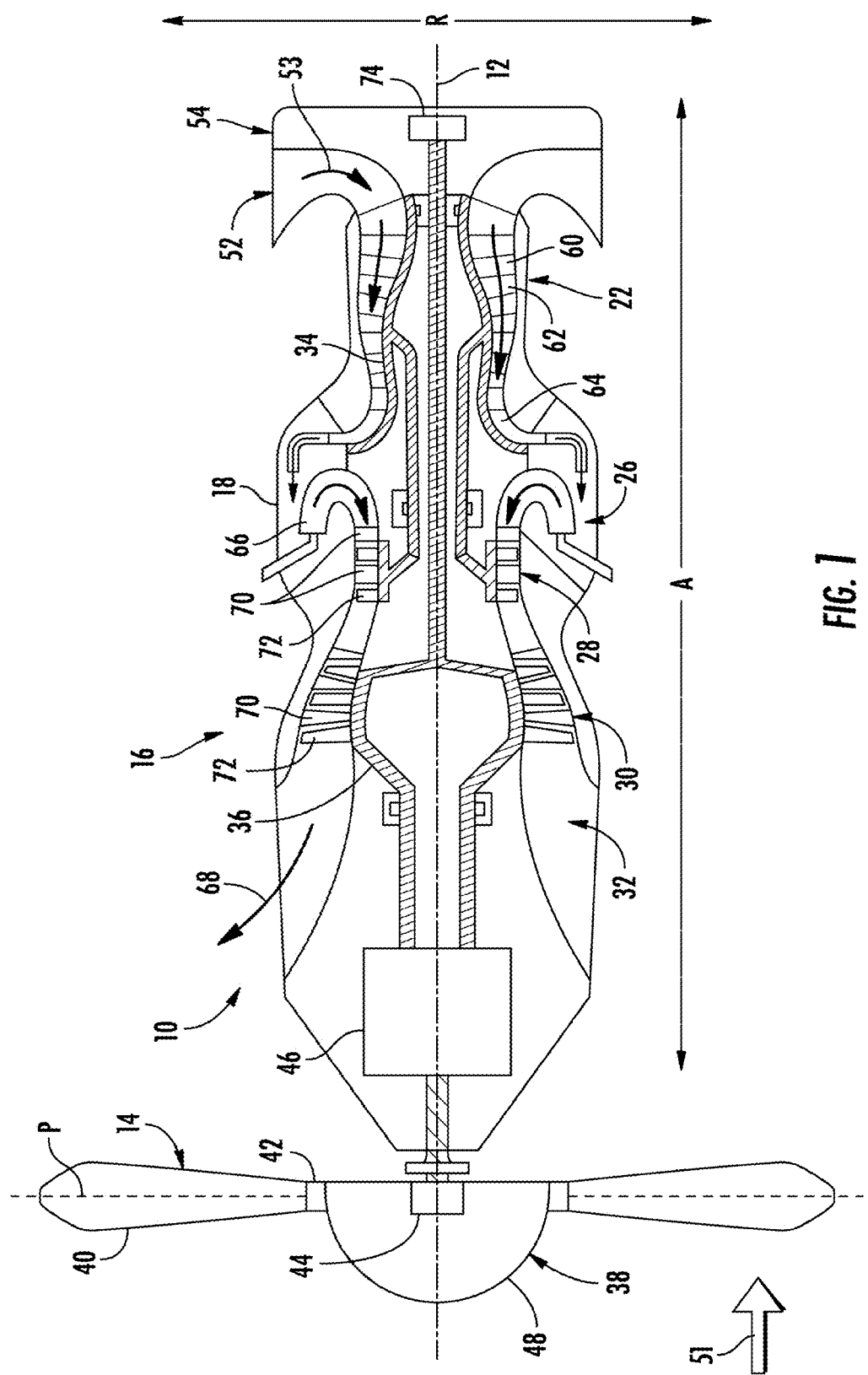
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative pressure within an engine unless otherwise specified. For example, a "low turbine" or "low pressure turbine" defines a component configured to operate at a pressure lower than a "high pressure turbine" of the engine.

The terms "forward" and "aft" refer to relative positions within a gas turbine engine or vehicle, and refer to the normal operational attitude of a vehicle such as an aircraft. For example, with regard to an aircraft, forward refers to a position closer to a nose of the aircraft and aft refers to a position closer to an empennage of the aircraft.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, "top" refers to a highest or uppermost point, portion, or surface of a component in the orientations shown in the figures.

As used herein, "bottom" refers to a lowest or lowermost point, portion, or surface of a component in the orientations shown in the figures.

As used herein, "remote" or a "remote" component means a component that is discrete from a first component such that the component is free from mechanical coupling (e.g., direct or indirect) to the first component. For example, a remote propulsor is a propulsor that is discrete from a first propulsor such that the remote propulsor can be mounted at a location on the aircraft that is different than the location of the first propulsor. The remote component may be communicatively or electrically coupled to the first component.

As used herein, a "propulsor" is a component that rotates and generates thrust. The propulsor can be a propeller. For example, the propulsor can be a propeller of a turboprop engine that is drivingly coupled to the turbo-engine such that rotation of the components of the turbo-engine causes the propulsor to rotate and to generate thrust. The propulsor can be an electric propulsor (e.g., propeller) that is remote from the turbine engine and is drivingly coupled to an electric machine such that the electric machine causes the propulsor to rotate and to generate thrust.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

As will be discussed in more detail below, the subject matter of the present disclosure is directed generally to locating an electric machine near an intake channel of a reverse flow turboprop engine at a location which is closer to an aft end of the turboprop engine than to a forward end of the turboprop engine. The electric machine is rotatingly coupled to a low pressure shaft of the reverse flow turboprop engine and as a consequence of the reverse flow configuration the low pressure shaft extends aft of a core of the turboprop engine. The electric machine can be operated as a generator and/or motor for use in either adding power to and/or extracting power from the low pressure shaft. Placement of the electric machine in the proximate location described above permits an exchange of heat between the electric machine and a flow of air traversing through an intake channel of the engine. Such exchange of heat can provide tighter packaging of the electric machine and/or higher heat generating operating demands placed upon the electric machine.

To accommodate the placement of the electric machine in an aft location in at least one embodiment, an intake channel may be provided that forms a non-annular flow path at an inlet to the intake channel which then changes to an annular flow path around the LP shaft prior to air being delivered to a compressor of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed aft of the propeller section 14 from an aircraft perspective, the propeller section 14 being operable with, and driven by, core turbine engine 16. The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, a high pressure (HP) turbine 28, a low pressure (LP) turbine 30, and an exhaust section 32. An air flow path generally extends through compressor 22, combustion section 26, HP turbine 28, LP turbine 30, and exhaust section 32 which are in fluid communication with each other.

An HP shaft or spool 34 drivingly connects the HP turbine 28 to the compressor 22. An LP shaft or spool 36 drivingly connects the LP turbine 30 to propeller section 14 of the turboprop engine 10. For the embodiment depicted, propeller section 14 includes a variable pitch propeller 38 having a plurality of propeller blades 40 coupled to a disk 42 in a spaced apart manner. As depicted, the propeller blades 40 extend outwardly from disk 42 generally along the radial direction R. Each propeller blade 40 is rotatable relative to the disk 42 about a pitch axis P by virtue of the propeller blades 40 being operatively coupled to a suitable actuation member 44 configured to collectively vary the pitch of the propeller blades 40 in unison. The propeller blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front hub 48 aerodynamically contoured to promote an airflow through the plurality of propeller blades 40.

During operation of the turboprop engine 10, a volume of air 50 (also referred to as a free stream flow of air 51 prior to its encounter with the propeller 38, and referred to as an incoming flow of air 50 after passage through the propeller 38) passes through blades 40 of propeller 38 and is urged toward a radial inlet 52 of core turbine engine 16. More specifically, turboprop engine 10 includes an intake channel 54 that defines radial inlet 52 that routes an inlet portion of air 53 of the flow of air 50 from inlet 52 downstream to compressor 22. Though the inlet 52 is depicted as a radial inlet in the embodiment of FIG. 1, other configurations of inlet 52 are also contemplated. For example, the inlet 52 can also take the form of an inlet arranged in an axial direction to capture the inlet portion of air 53 of the volume of air 50. The inlet portion of air 53 of the flow of air 50 captured by the inlet 52 is referred to herein as an intake flow of air. The intake channel 54 defines the intake flow of air and generally extends from an inlet of the intake channel 54 to just upstream of the compressor 22.

The turboprop engine 10 embodiments described herein are configured as reverse flow engines. Such engines are characterized by a general relationship between the direction of the flow of incoming air 50 (such direction can be used to characterize the relative motion of air during a mode of operation of the engine 10 such as a forward thrust mode) and that of the flow of air axially through the turboprop engine 10. The flow of air through the core turbine engine 16 is generally reverse to that of the flow of incoming air 50. Turning the flow from the direction of the incoming flow of air 50 to the axial direction through the core turbine engine 16 is usually performed by the intake channel 54. The change of direction is reversed in that the bulk direction of the flow of air 50 (itself having a circumferential swirl component imparted by the propeller blades 40 in addition to a longitudinal component) is opposite, or reverse, to the bulk direction of air flow axially through the core turbine engine 16 (which itself also includes a longitudinal component but also include radial and circumferential components owing to the shape of the flow path and swirl induced by rotating turbomachinery components) during one or more phases of operation of the core turbine engine 16. Thus, it will also be appreciated that the term "reverse" is a relative comparison of the longitudinal components of the bulk flow of air 50 and bulk flow of air axially within the engine 10. Though the longitudinal direction of the flow of air 50 may not be perfectly parallel with the axial flow of air through the engine 10, it will be appreciated that the longitudinal components of the directions the flow of air 50 and the axial flow are reversed.

Compressor 22 includes one or more sequential stages of compressor stator vanes 60, one or more sequential stages of compressor rotor blades 62, and an impeller 64. Though the illustrated embodiment includes both axial and centrifugal flow compressors, in some forms the turboprop engine 10 can include just an axial flow compressor(s) or centrifugal flow compressor(s). The one or more sequential stages of compressor stator vanes 60 are coupled to the outer casing 18 and compressor rotor blades 62 are coupled to HP shaft 34 to progressively compress the air 53. Impeller 64 further compresses air 53 and directs the compressed air 53 into combustion section 26 where air 53 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of propeller section 14 through LP shaft 36. Combustion gases 68 exit turboprop engine 10 through exhaust section 32.

It will be understood that one or more rows of stator vanes 60 and 70 can be variable vanes controlled by a controller (see below with respect to controller 100) in one form. Furthermore, with particular respect to stator vanes 70, one or more rows of the stator vanes 70 can be variable.

In other exemplary embodiments, the turbine engine may include any suitable number of compressors, turbines, shafts, etc. For example, as will be appreciated, HP shaft 34 and LP shaft 36 may further be coupled to any suitable device for any suitable purpose. For example, in certain exemplary embodiments, turboprop engine 10 of FIG. 1 may be utilized in aeroderivative applications. Additionally, in other exemplary embodiments, turboprop engine 10 may include any other suitable type of combustor, and may not include the exemplary reverse flow combustor depicted.

The embodiment of turboprop engine 10 illustrated in FIG. 1 includes an electric machine 74 located aft of the core turbine engine 16 and rotatingly coupled to the LP shaft 36. In some forms the electric machine 74 is contained in an environmentally sealed housing which can be pressurized to minimize electrical corona and discharge effects. Further, in some forms the LP shaft 36 and electric machine 74 can be configured to rotate at a constant speed from idle to max power, with thrust of the engine 10 controlled by the variable pitch propeller 38.

Given the coaxial relationship of the LP shaft 36 with the HP shaft 34, in such an embodiment the LP shaft 36 is configured to extend aft of the core turbine engine 16, and also further aft than the HP shaft 34, despite the HP compressor 22 being the upstream-most compressor of the turboprop engine 10 (i.e., despite there being no low-pressure compressor upstream of the HP compressor 22 and downstream of the inlet 52).

The electric machine 74 can be used in many different power configurations. In one form the electric machine is configured to extract power from the LP shaft 36 when the machine 74 operates as a generator. The extraction of mechanical power from the LP shaft 36 and conversion to electric power can be used to charge an on-board power storage device such as a battery, or alternatively to provide power to another electrical device (e.g., an electric motor, an electrical accessory on an aircraft, etc.). In other forms, the electric machine 74 can be used as a motor to provide power to the LP shaft 36 to supplement power extracted by the LP turbine 30 from the combustion gases 68. In these forms, the electric machine 74 can be configured to provide a minimum of 10% of supplemental thrust to the engine 10, a minimum of 20% of supplemental thrust to the engine 10, and up to 40% of supplemental thrust to the engine 10 in various embodiments. In still other forms, the electric machine 74 can be configured to power to drive 100% of thrust from the propeller section 14. A scenario in which the electric machine 74 provides all power to the propeller section 14 can include shutdown of the engine 10. In one non-limiting example of an engine being shut down, upon or near landing the engine 10 can be command to shut down and the electric machine 74 used to drive further propeller thrust requirements, whether that includes fine power on short final or power when the propeller section 14 is configured in reverse pitch to aid in slowing the aircraft.

A battery or other secondary power source can be used to provide power to the electric machine 74 when operated as a motor. The supplementation of power by the electric machine 74 to the LP shaft 36 in this manner can be transitory or steady state, depending on the control requirements requested of the turboprop engine. For example, in those operating conditions in which power output of the engine lags behind a commanded power, the electric machine 74 can provide near instantaneous supplemental power to the LP shaft 36 to provide on-condition power output from the turboprop until the engine 10 achieves a steady state operating condition at the higher output power. In still further forms, the electric machine can be operated as a motor in some portions of operation of the engine 10, and as a generator in other portions of operation of the engine 10, along the lines of any of the variations discussed herein.

Given the proximity of the electric machine 74 to the intake channel 54, the electric machine 74 can be further positioned to exchange heat with the inlet portion of the air 53 traversing the intake channel 54 to aid in removing beat from the electric machine 74. Cooling of the electric machine 74 using the inlet portion of air 53 permits tighter packaging of the electric machine 74 and closer location of the electric machine 74 to heat generating portions of the engine 10. The relative location of the electric machine 74 and intake channel 54 can permit an effective exchange of heat through any number of useful mechanisms including at least one of conduction and convection cooling. In some forms cooling air may directly impinge upon the electric machine 74 and/or may be used to vent a cavity in which the electric machine 74 is located. In still further forms the electric machine 74 can be used in part to form the flow path of the intake channel 54 to provide direct heat transfer between the electric machine 74 and the inlet portion of air 53. In yet still further forms the electric machine 74 may be in direct contact with a portion of the intake channel 54 forming the flow path such that heat transfer occurs between the electric machine 74 and inlet portion of air 53 via that particular portion of the intake channel 54 forming the flow path. Further aspects of the location of electric machine 74 and various cooling techniques are described further below.

Various other embodiments are disclosed further herein related to the location and use of the electric machine 74, the shape and configuration of the intake channel 54, and various techniques to exchange heat between the electric machine 74 and the inlet portion of air 53 flowing in the intake channel 54. As will be appreciated, like reference numerals refer to like elements and, thus, any of the variations disclosed herein related to any particular exemplary embodiment in any given figure are also applicable to embodiments depicted and discussed with respect to the other figures.

Figure 2:
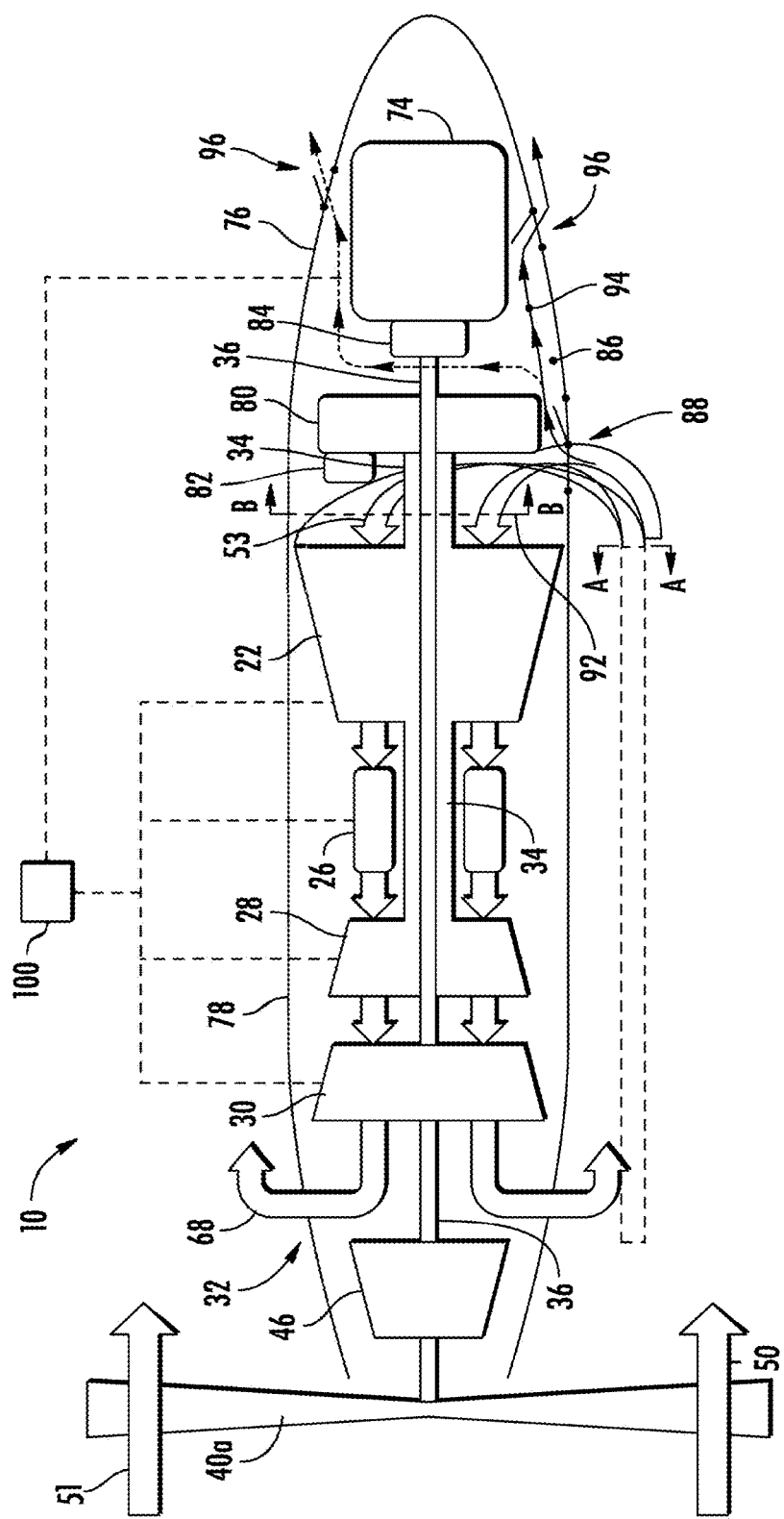
FIG. 2 is a schematic view of a gas turbine engine with an electric machine in accordance with the present disclosure.

Turning now to FIG. 2, an exemplary embodiment of the turboprop engine 10 is illustrated in which the engine 10 includes an electric machine 74 located aft of the core turbine engine 16 in a tail cone 76 defining an aft end of an engine nacelle 78. As will be appreciated, the engine nacelle 78 is used to enclose the gas turbine engine and includes one or more portions that interface with aircraft structure such as a wing, pylon, fuselage, etc. The tail cone 76 may be a complete body of revolution that circumferentially encloses the electric machine 74 in some embodiments. In alternative embodiments, however, the tail cone 76 may be a partial body of revolution or other shape that covers the electric machine to complete an enclosure with other aircraft structure (e.g., wing, pylon, fuselage, etc.). Thus, the tail cone 76 is any suitable structure of the engine nacelle which is located aft of the core turbine engine 16 and is used to wholly or partially enclose the electric machine 74.

In some forms of the embodiments disclosed herein the engine nacelle 78 may take on the form of an engine cowling when the engine 10 is installed on a single engine turboprop aircraft. In such installations the electric machine 74 can be located between the core turbine engine 16 and a firewall of the aircraft. In such installations, therefore, the engine cowling or other forebody structure of the aircraft can be used to enclose the electric machine 74.

The embodiment of FIG. 2 includes an accessory gear box (AGB) 80 located aft of the HP compressor 22 and is coupled to a starter motor 82. The starter motor 82 is coupled to the HP shaft via the AGB 80 such that during a start sequence of the turboprop engine 10 the starter motor 82 can be used to impart rotational power via the AGB 80 to the HP shaft 34. In the illustrated embodiment, the AGB 80 is depicted as being co-axial with the HP shaft 34 and LP shaft 36 (it will be appreciated that although the AGB 80 is rotatingly coupled to the HP shaft 34, it is not otherwise rotatingly coupled with the LP shaft 36). To provide such a coaxial relationship between the HP shaft 34 and AGB 80, in one form the AGB 80 is a planetary gear system in which the HP shaft 34 is coupled to a sun gear of the planetary gear system. In other forms a central gear of the AGB 80 is coupled via one or more idler gears to the starter motor 82. Other forms are also contemplated to permit a co-axial relationship between the AGB 80 and HP shaft 34. In other forms, however, the AGB 80 need not be co-axial with the HP shaft 34.

The electric machine 74 is also depicted in FIG. 2 as being coupled to the LP shaft 36 through a speed change device 84 which can be used to alter a speed ratio between the LP shaft 36 and the electric machine 74. In some forms, the speed change device 84 can be a transmission that provides a fixed speed ratio, but in other forms the transmission can provide variable speed ratios. In still other forms, the transmission can include a clutch mechanism to disengage the electric machine 74 from the LP shaft 36. Still further, although the embodiment depicted in FIG. 2 includes the speed change device 84, other embodiments need not include the device 84. In such an embodiment, the electric machine 74 is directly connected to the LP shaft 36.

Figure 7A:
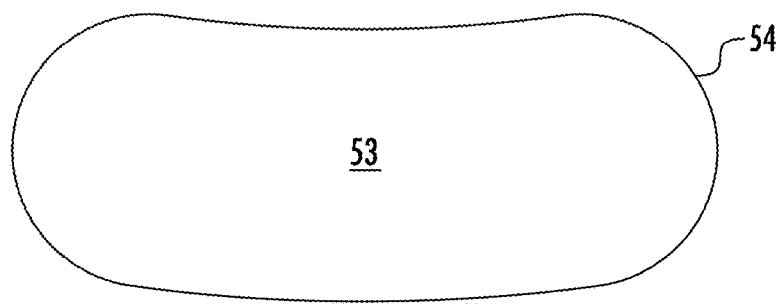
FIG. 7A is a cross sectional view of a non-annular portion of a flow path of an intake channel in accordance with the present disclosure.
Figure 7B:
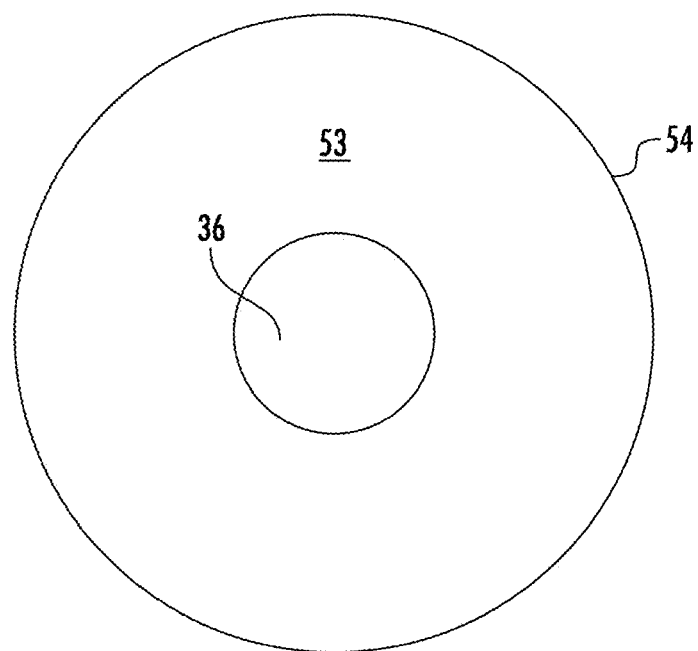
FIG. 7B is a cross sectional view of an annular portion of a flow path of an intake channel in accordance with the present disclosure.

The intake channel 54 forms a flow path between the AGB 80 and the HP compressor 22. The flow path of the intake channel 54 follows the route depicted in FIG. 2, where the inlet portion of air 53 captured by the intake channel 54 passes first through a non-annular inlet 90 depicted at sightline A-A (an embodiment of which is illustrated in FIG. 7A, discussed in more detail below) before it is split into an annular flow path 92 depicted at sightline B-B (an embodiment of which is illustrated in FIG. 7B, discussed in more detail below). The non-annular inlet 90 is radially offset from the LP shaft 36 and confined to a circumferential section about the LP shaft 36. The intake channel 54 takes the form of the annular shape leading up to the delivery of the inlet portion of air 53 to the HP compressor 22. The intake channel 54 thus begins with a non-annular intake shape and ends with an annular shape. As will be appreciated, the annular shape of the intake channel includes a central interior that accommodates the LP shaft 36. The intake channel 54 in the illustrated embodiment is thus required to morph, or change, from the non-annular shape at the inlet 90 to the annular shape at its discharge to the compressor 22 so that the intake channel 54 accommodates the intrusion of the LP shaft 36 through the intake channel 54 and to the electric machine 74. In this way, the LP shaft 36 extends through at least a portion of the intake channel 54 where the flow path in the intake channel 54 changes shape to accommodate the LP shaft 36. In some forms, an exterior surface of the LP shaft 36 may be exposed to the inlet portion of air 53 such that the inlet portion of air 53 flowing in the intake channel 54 is exposed to the rotating exterior surface of the LP shaft 36. In other forms, however, the intake channel 54 may include a separate structure used to define the central interior and which is used to separate the exterior surface of the LP shaft 36 from the inlet portion of air 53 flowing in the intake channel 54.

In some forms, the inlet 90 of the intake channel 54 is located at either a six o-clock position on the nacelle such as what would conventionally be considered the bottom, or underside, of the nacelle. An inlet on a Beechcraft Denali or Beechcraft King Air Turboprop are examples. The exhaust section 32 can be located at either or both of the three o'clock and nine o'clock position on the nacelle such as would conventionally be considered a left or right side of the nacelle. In this manner, the spacing of the inlet 90 of the intake channel 54 is circumferentially displaced from the exhaust section 32 to minimize/prevent exhaust gases from being circulated to the inlet 90 for ingestion into the engine 10. Furthermore, it will be appreciated that the inlet 52, though illustrated at an axially aft location in the various embodiments, can be located forward closer to the blades 40 while still maintaining the configuration to reverse the flow from the direction of the incoming flow of air 50 to the axial flow direction required in the turbine engine configurations depicted.

Also depicted in FIG. 2 is an offtake flow path 86 created by an offtake opening 88 provided in the intake channel 54 and which is configured to provide a flow of offtake air 94 to be used for heat exchange purposes with the electric machine 74. The offtake opening 88 can be located downstream of the inlet 90 to the intake channel 54 and is structured to remove part of the inlet portion of air 53 flowing through the offtake channel 86. The offtake opening 88 can be a permanent vent structure that includes a fixed opening through which air can pass regardless of mode of operation of the electric machine 74. In other forms, however, the offtake opening 88 can include a movable mechanical structure that permits modulating the area of the offtake opening 88, including in some forms fully closing the offtake opening. Such a movable mechanical structure can take any variety of forms such as a hinged plate, sleeve valve, or other suitable device.

The offtake flow path 86 can take a variety of forms including the solid line depicted in FIG. 2 in which the flow path 86 flows past the electric machine 74, In one form, the offtake flow path 86 can alternatively and/or additionally be routed along the dotted line shown in FIG. 2. Such a flow path can provide additional level of venting of the cavity in which the electric machine 74 is located, and/or provide greater dwell time within the cavity to ensure a higher level of heat exchange.

The offtake flow path can include one or more discharge openings 96 and 98 to permit the flow of offtake air 94 to exit from the nacelle 78. The flow of offtake air 94 can be urged to exit through a pressure differential that exists between the offtake opening 88 and the discharge openings 96 and/or 98. Such a pressure differential can be provide via ejector action if needed through suitable structure configured to provide such an action (e.g., a venturi ejector). One or both of the discharge openings 96 and 98, in some embodiments, can be a permanent vent structure that includes a fixed opening through which air can pass regardless of mode of operation of the electric machine 74.

In other forms, however, one or both of the discharge openings 96 and 98 can include a movable mechanical structure that permits modulating the area of the discharge openings 96 and 98, including in some forms fully closing the discharge openings. Such a movable mechanical structure can take any variety of forms such as a hinged plate, sleeve valve, or other suitable device. The moveable mechanical structure can protrude into a passing flow of air to which the discharged flow of offtake air 94 is being discharged, and in other forms can protrude into the offtake flow path 86.

Given the proximity of the electric machine 74 to the intake channel 54 and the configurations disclosed herein, various cooling techniques are contemplated with respect to the various embodiments. For example, though the passing flow of offtake air 94 is illustrated in FIG. 2 passing adjacent and/or around the electric machine 74, in some embodiments, the passing flow of offtake air 94 can be directed to impinge directly upon a portion of the electric machine. Further, a surface of the electric machine 74, such as an outer housing, can form part of the flow path of the offtake flow path 86. In other forms, a structure forming the offtake flow path 86 can be in heat conductive relationship with a portion of the electric machine 74 (e.g., a housing of the electric machine 74).

The embodiment depicted in FIG. 2 also includes a controller 100 configured to control various aspects of the depicted embodiment (the embodiment depicted in FIG. 1 can also include a controller for control of analogous features). As depicted through the various dotted lines, the controller 100 can control one or more different systems associated with operation of the engine 10. The dotted nature depicted in the figure denotes the optional inclusion of one or more, or all, of the systems connected with the controller 100. For example, the controller 100 can be used to control variable stator vanes 70 in either or both turbines 28 and 30. Additionally and/or alternatively, the controller 100 can be used to control variable stator vanes 60 in the compressor 22. Additionally and/or alternatively, the controller 100 can be used to control fuel flow to the combustion section 26. Additionally and/or alternatively, the controller 100 can be used to control one or more of the openings of the openings 88, 96, and 98. Additionally and/or alternatively, the controller 100 can be used to control operation of the electric machine 74. Additionally and/or alternatively, the controller 100 can command fuel flow to the combustion section 26 to be stopped and also simultaneously command the propeller section 14 to be positioned in a forward or reverse pitch configuration.

The controller 100 can thus be used in any or all of the following examples. The controller 100 may selectively drive the electric machine 74 as a generator. In those situations in which the electric machine 74 is 'powered on' to operate as a generator, the controller 100 can make adjustments to fuel rate delivery to the combustion section 26 while also optionally changing position of variable stator vanes 60 and/or 70. The controller 100 can optionally operate a clutch in the speed change device 84.

Figure 3:
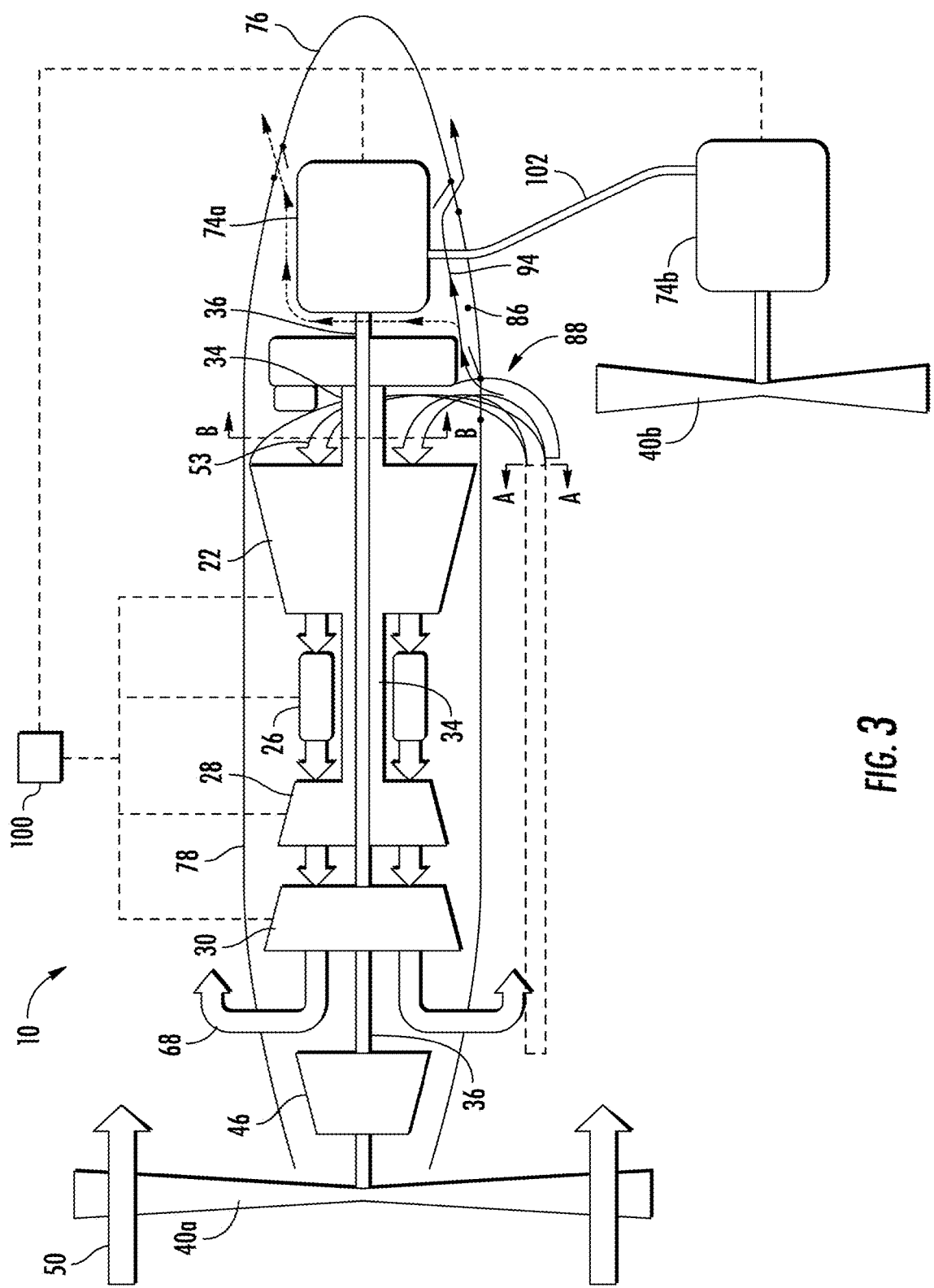
FIG. 3 is a schematic view of a gas turbine engine with an electric machine in accordance with the present disclosure.

Turning now to FIG. 3, another embodiment of the reverse flow engine 10 discussed above is illustrated. The exemplary engine 10 of FIG. 3 may be configured in substantially the same manner as the exemplary engine 10 of FIG. 2, and as such the same or similar numbers may refer to the same or similar parts.

For the embodiment of FIG. 3, the engine 10 includes an electric machine 74 coupled to the engine 10 and operated as a generator, the electric machine 74 further in electrical communication via a power conduit 102 with an electric machine 74b which is operated as a motor. The electric machine 74b operated as a motor is used to drive a set of propeller blades 40b apart from the blades 40a driven by the turbine engine 10 depicted at the top of FIG. 3. The electric machine 74b configured as a motor can be used to provide additional thrust output beyond that provided by the propeller blades 40a driven by the turbine engine 10.

Although the electric machine 74b is illustrated apart from any turbomachinery components such as those at the top of the figure, in some embodiments the electric machine 74b can be integrated with a gas turbine engine much in the same manner as the turboprop engine 10 depicted at the top of the figure. In these embodiments, the electrical coupling between the electric machines 74a and 74b can be used to exchange power between the two (e.g., where one machine is a motor and the other a generator) or can be coupled to a common energy storage device (e.g. a bank of batteries). Any of the variations in the embodiments discussed above are also applicable to the embodiments shown in FIG. 3, such as but not limited to heat exchange between the electric machine 74 and the inlet portion of air 53, the offtake flow path 86, etc.

Figure 4:
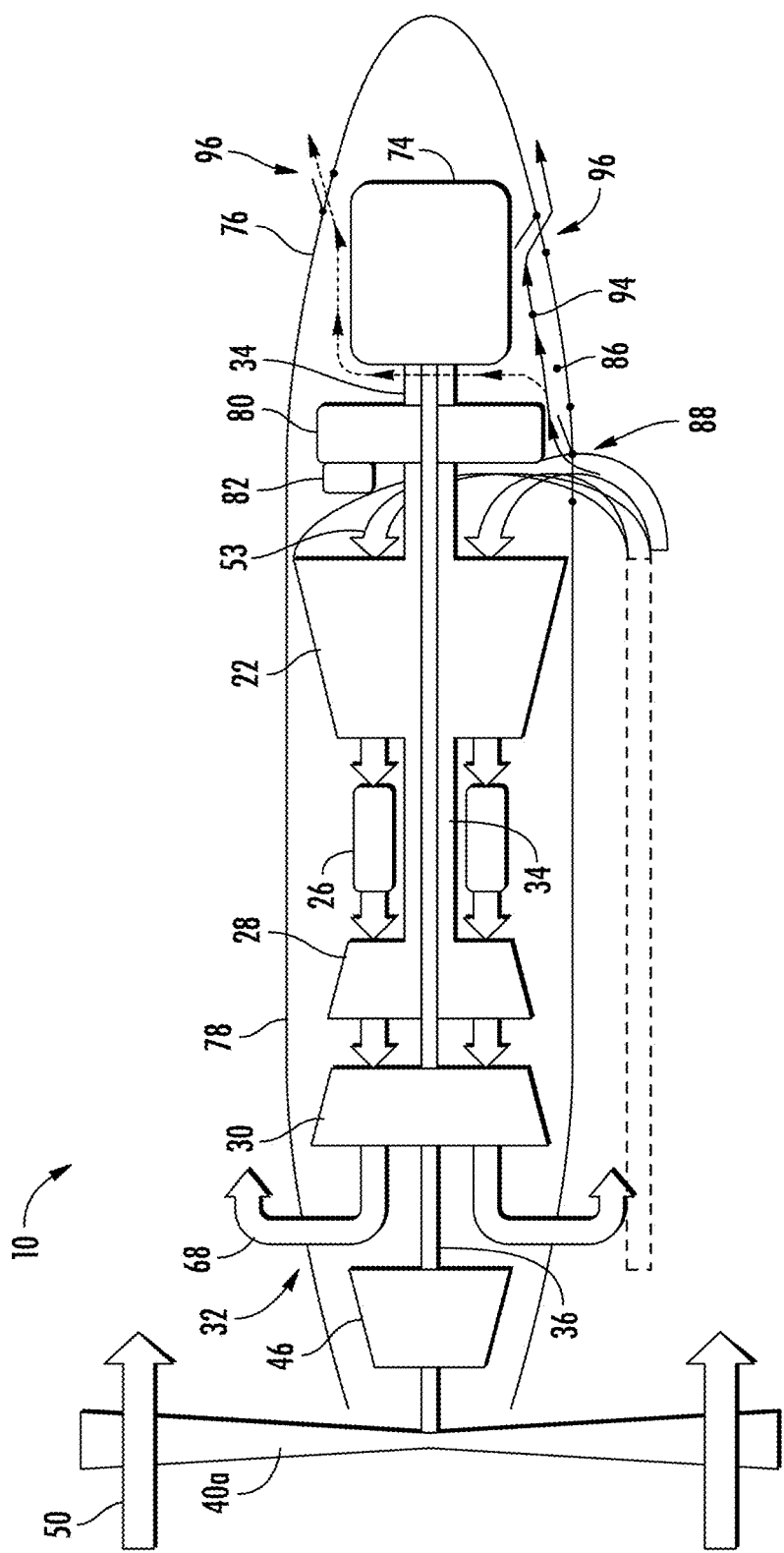
FIG. 4 is a schematic view of a gas turbine engine with an electric machine in accordance with the present disclosure.

Turning now to FIG. 4, another embodiment of the reverse flow engine 10 discussed above is illustrated. The exemplary engine 10 of FIG. 4 may be configured in substantially the same manner as the exemplary engine 10 of FIG. 2, and, as such, the same or similar numbers may refer to the same or similar parts.

For the embodiment of FIG. 4, the engine 10 includes an electric machine 74 coupled to the HP shaft 34 of the engine 10, in which the configuration can employ the electric machine 74 as either a motor (e.g., to start the engine 10) or a generator (e.g., to scavenge power for electric power generation). As will be appreciated in this embodiment, the LP shaft 36 need not be extended to the rear of the engine 10.

Figure 5:
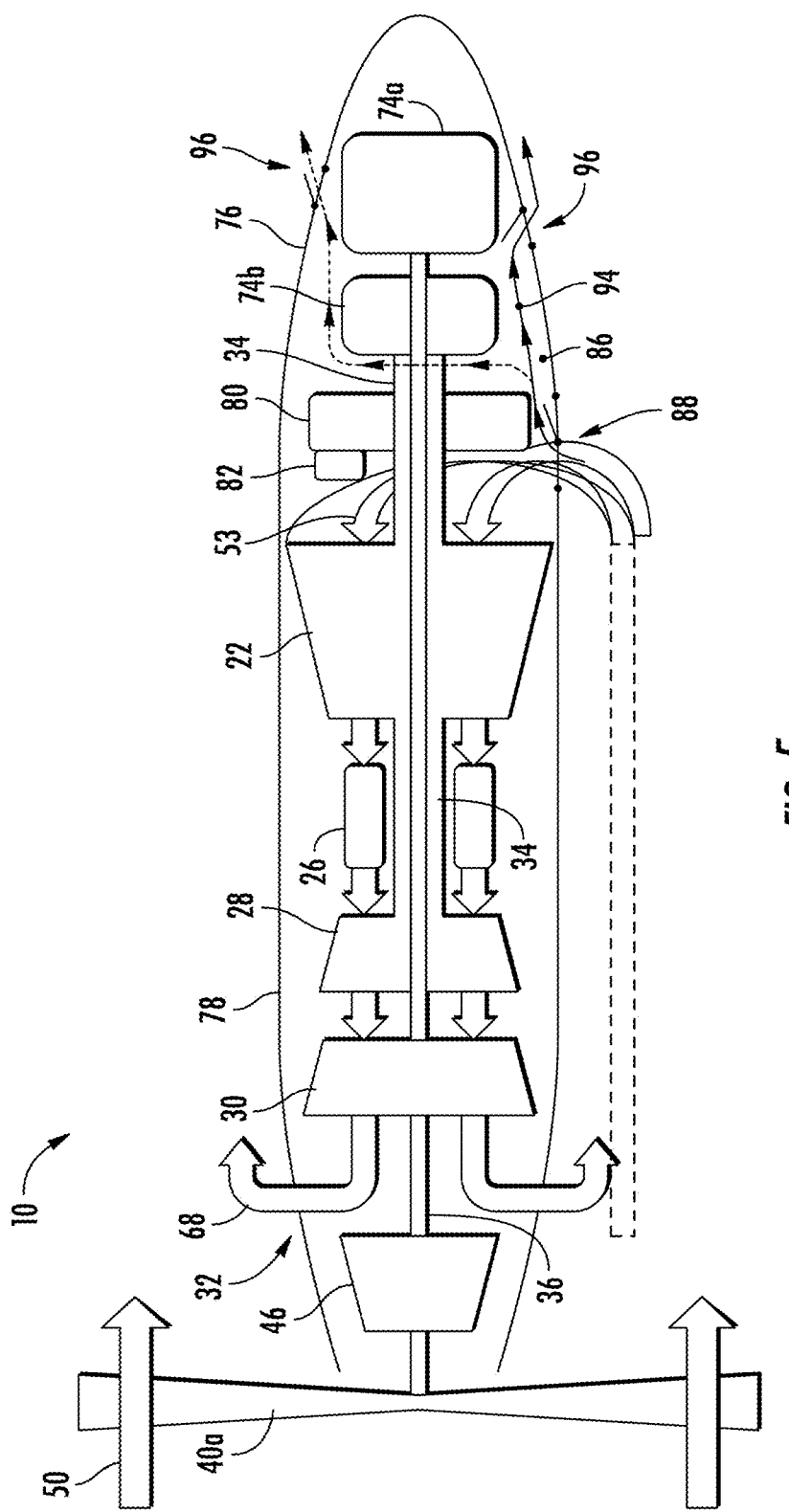
FIG. 5 is a schematic view of a gas turbine engine with an electric machine in accordance with the present disclosure.

Turning now to FIG. 5, another embodiment of the reverse flow engine 10 discussed above is illustrated. The exemplary engine 10 of FIG. 5 may be configured in substantially the same manner as the exemplary engine 10 of FIG. 2, and as such the same or similar numbers may refer to the same or similar parts.

For the embodiment of FIG. 5, the engine 10 includes electric machines 74a and 74b, each coupled with respective LP shaft 36 and HP shaft 34. This embodiment enables power input/extraction to/from either spool 34, 36 independently, as well as the potential to transfer power between the two spools 34, 36 of the engine to improve operability/mitigate vibration, compressor stall or instability issues. As will therefore be appreciated, power can be extracted from spool 34 and provided to spool 36 in one mode of operation, power can be extracted from spool 36 and provided to spool 34 in another mode of operation, and power can be either extracted from or provided to both spools 34, 36 in yet another mode of operation.

Any of the electric machines discussed herein are capable of being packaged so as to provide power densities suitable for use in the applications discussed herein. For example, the electric machines can have a power density ranging anywhere from greater than 3 kW/kg, greater than 5 KW/kg, and greater than 6 kW/kg.

As noted, the exemplary controller 100 useful in any of FIGS. 2-5 is configured to regulate any of the aforementioned systems such as variable stator vanes 60 and/or 70, electric machine 74, fuel flow to the combustion section 26, etc., either alone or in combination, based on a control scheme stored in the controller 100. In one or more exemplary embodiments, the controller 100 depicted in FIGS. 2 and 3 may be a stand-alone controller 100 for any of the aforementioned systems, or alternatively, may be integrated into one or more of a controller for the gas turbine engine with which the aforementioned systems are integrated, a controller for an aircraft including the gas turbine engine with which the aforementioned systems are integrated, etc.

Figure 6:
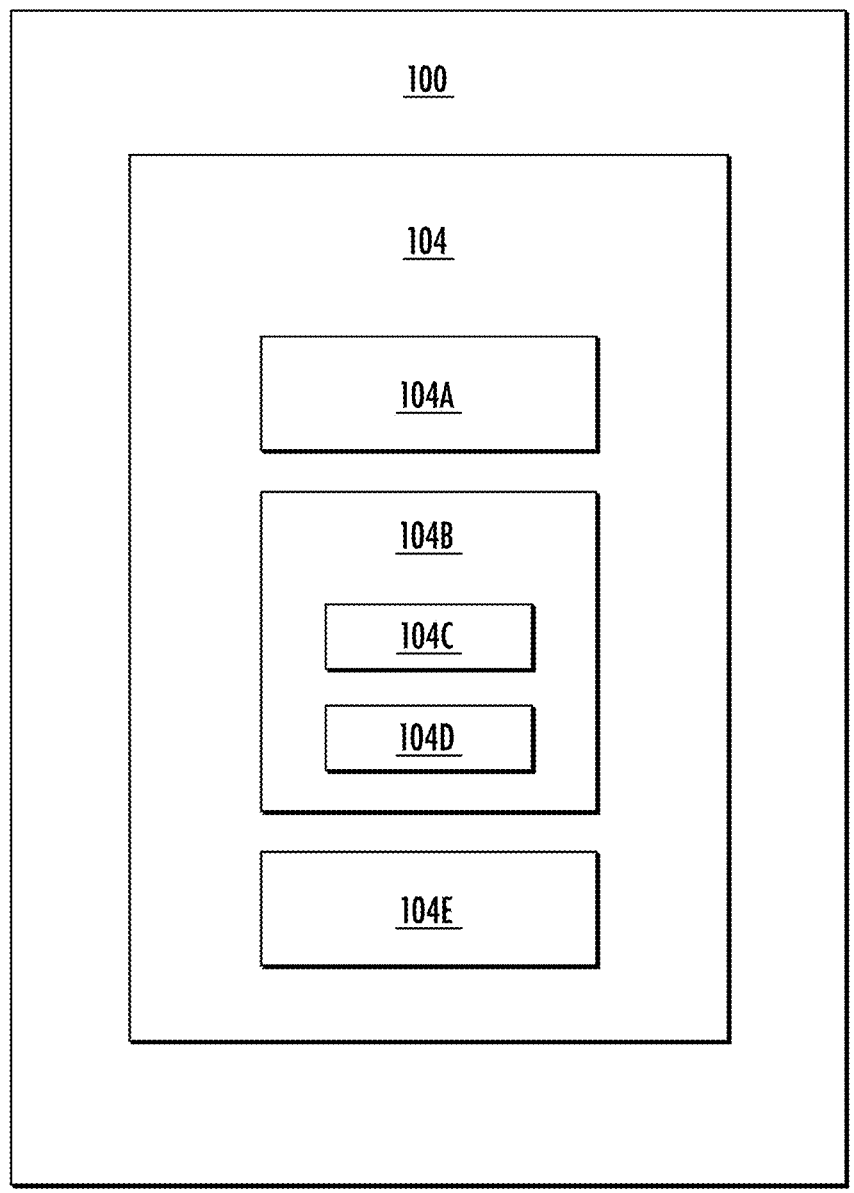
FIG. 6 is a view of a controller in accordance with the present disclosure.

Referring particularly to the operation of the controller 100, in at least certain embodiments, the controller 100 can include one or more computing device(s) 104 such as depicted in FIG. 6. The computing device(s) 104 can include one or more processor(s) 104A and one or more memory device(s) 104B. The one or more processor(s) 104A can include any suitable processing device, such as a microprocessor, microcontroller, integrated circuit, logic device, and/or other suitable processing device. The one or more memory device(s) 104B can include one or more computer-readable media, including, but not limited to, non-transitory computer-readable media, RAM, ROM, hard drives, flash drives, and/or other memory devices.

The one or more memory device(s) 104B can store information accessible by the one or more processor(s) 104A, including computer-readable instructions 104C that can be executed by the one or more processor(s) 104A. The instructions 104C can be any set of instructions that when executed by the one or more processor(s) 104A, cause the one or more processor(s) 104A to perform operations. In some embodiments, the instructions 104C can be executed by the one or more processor(s) 104A to cause the one or more processor(s) 104A to perform operations, such as any of the operations and functions for which the controller 100 and/or the computing device(s) 104 are configured, the operations for any of the aforementioned systems such as variable stator vanes 60 and/or 70, electric machine 74, fuel flow to the combustion section 26, etc., as described herein, and/or any other operations or functions of the one or more computing device(s) 104. The instructions 104C can be software written in any suitable programming language or can be implemented in hardware. Additionally, and/or alternatively, the instructions 104C can be executed in logically and/or virtually separate threads on the one or more processor(s) 104A. The one or more memory device(s) 104B can further store data 104D that can be accessed by the one or more processor(s) 104A. For example, the data 104D can include data indicative of power flows, data indicative of engine/aircraft operating conditions, and/or any other data and/or information described herein.

The computing device(s) 104 can also include a network interface 104E used to communicate, for example, with the other components of system (e.g., via a communication network). The network interface 104E can include any suitable components for interfacing with one or more network(s), including, for example, transmitters, receivers, ports, controllers, antennas, and/or other suitable components. One or more devices can be configured to receive one or more commands from the computing device(s) 104 or provide one or more commands to the computing device(s) 104.

The network interface 104E can include any suitable components for interfacing with one or more network(s), including, for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Turning now to FIGS. 7A and 7B, cross sectional views of two separate flow stations along the flow path of the intake channel 54 are illustrated. FIG. 7A illustrates view A-A from FIGS. 2 and 3, above, which depicts a cross section of the intake channel 54 that routes an inlet portion of air 53 of the flow of air 50. The cross-section A-A depicted in FIG. 7A is at or close to the inlet of the intake channel 54 and has a non-annular flow shape. The non-annular flow shape depicted in FIG. 7A is similar to a kidney shape in the illustrated embodiment, but other non-annular shapes are also contemplated. The cross-section B-B depicted in FIG. 7B, from FIGS. 2 and 3 above, is at or close to the discharge of the intake channel 54 as it delivers the inlet portion of air 53 of the flow of air 50 to the compressor 22. The annular flow shape depicted in FIG. 7B encloses the LP shaft 36.

Figure 8:
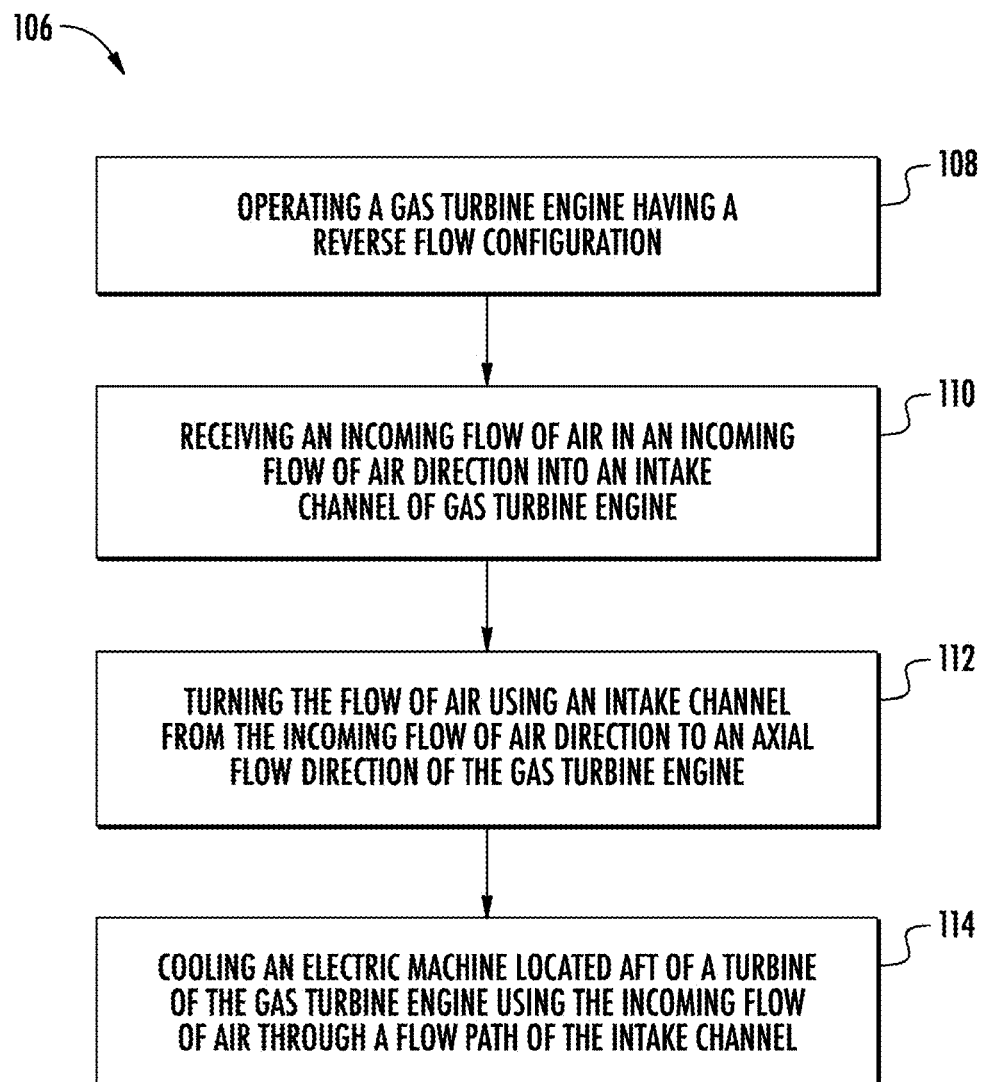
FIG. 8 is a flow chart describing a method of operating a gas turbine engine having an electric machine in accordance with the present disclosure.

Referring now to FIG. 8, a flow diagram of a method of operating a gas turbine engine in accordance with an exemplary aspect of the present disclosure is provided. The method of FIG. 7 may be utilized to operate one or more of the exemplary engine and electric machine placement described above with reference to FIGS. 1 through 5B. Accordingly, it will be appreciated that the method may generally be utilized to operate a gas turbine engine including engine 10, electric machine 74, and intake channel 54. However, in other exemplary aspects, the method may additionally or alternatively be utilized to operate any other suitable gas turbine engine.

More specifically, FIG. 8 discloses a method 106 of operating a reverse flow gas turbine engine which includes at 108 operating a gas turbine engine having a reverse flow configuration. The engine can take the form of a turboprop as discussed above in various embodiments. Step 110 includes receiving an incoming flow of air into an intake channel of the gas turbine engine. The flow of air received in the intake channel is turned at step 112 from its initial flow direction into an axial flow direction of the gas turbine engine. Step 114 discloses cooling an electric machine located aft of a turbine of the gas turbine engine using the flow of air in the intake channel.

The arrangement of the electric machine 74 coupled with the low pressure shaft 36 and located on a side of the high pressure compressor 22 opposite the high pressure turbine 28 provides various technical effects, including the ability to cool the electric machine 74 using the intake flow of air. Such a placement provides for additional separation from hot section components of the engine 10. The electric machine 74 can be placed in proximity to the intake channel 54 at an aft end of the engine 10 in a heat exchange relationship, where the intake flow of air can exchange heat through either or both of conduction and convection with the electric machine 74. In some forms an offtake flow of air can be extracted from the intake flow of air for use in cooling the electric machine 74 in lieu of the intake flow of air for additional flexibility, such as selective cooling provided through activation of discharge openings 96, 98. Various other flexible arrangements can also be provided of the electric machine 74, and specifically cooling of the electric machine. For example, an electric machine 74b can be coupled with the low pressure shaft 36, while another electric machine 74a is coupled with the high pressure shaft 34. Both of electric machines 74a and 74b can be located on a side of the high pressure compressor 22 opposite the high pressure turbine 28.

As noted above, turbine engines include a turbo-engine that provides power for rotating a propulsor (e.g., a propeller). The turbo-engine burns air and fuel to generate an exhaust gas flow that drives an aerodynamically-coupled power turbine, or low-pressure turbine, that is further coupled to a set of propulsor blades of the propulsor via a propulsor shaft. In this sense, a speed of the turbo-engine indirectly affects a speed of the power turbine by providing torque to drive the propulsor, thus providing thrust.

The pitch of the propulsor blades can also be rotated on the propulsor shaft to provide additional thrust at the expense of increasing the torque demand of the turbine shaft. For instance, if the pitch of the propulsor blades is reduced, each propulsor blade rotates on the propulsor shaft such that the air resistance of the propulsor blade as the propulsor blade rotates about the propulsor shaft decreases, and, thus, reduces the torque demand for the propulsor shaft. In the instance when the turbo-engine speed is constant, the reduced torque demand of the propulsor results in increased propulsor shaft rotational speed (RPM). Conversely, if the pitch of the propulsor blades is increased, each propulsor blade rotates on the propulsor shaft such that the air resistance of the propulsor blade as the propulsor blade rotates about the propulsor shaft increases, and, thus, increases the torque demand for the propulsor shaft. In the instance when the turbo-engine speed is constant, the increased torque demand of the propulsor results in decreased propulsor shaft speed.

In certain embodiments, the present disclosure provides for a propulsion system including a turbine engine (e.g., a turboprop engine) with a propulsor, and a remote propulsor that is remote from the turbine engine. The turbine engine includes an electric machine and the remote propulsor includes an electric machine. In this way, the propulsor of the turbine engine can be powered electrically by the electric machine. Similarly, the remote propulsor can be powered electrically by the electric machine. In some embodiments, the remote propulsor is coupled to a remote turbine engine such that the remote turbine engine powers the remote propulsor.

Turbine engine control systems typically employ dual throttle levers used by the pilot to adjust, respectively, the turbo-engine speed demand, e.g., the speed of the turbo-engine, and the propulsor speed demand, e.g., via the pitch of the propulsor blades. In some instances, the dual throttle levers include a first throttle lever that controls the turbine engine and a second throttle lever that controls the remote propulsor. This dual-lever turbine engine control system allows for variation of aircraft speed and torque demand during, for instance, takeoff, cruise, or reverse thrust operations. Typically, small turboprop aircraft include one lever for the core engine speed (power or fuel flow), and a second lever for controlling the pitch of the propulsor blades. The propulsor is designed to operate at a constant speed, so a pilot would need to first adjust the core engine speed to increase/decrease power, and then adjust the propulsor blade pitch to maintain the proper propulsor speed. The propulsor is driven by a free turbine downstream of the core engine, so when the core speed increases, if the propulsor pitch remains constant, then the propulsor speed increases. The pilot needs to change the pitch to counter the change in speed resulting from the core engine change. This results in an increased workload for the pilot.

The present disclosure provides for an improved turbine engine control system that receives a single throttle lever input, and controls the turbine engine speed and the propulsor speed and the propulsor pitch angle based on the single throttle lever input. The turbine engine control system can also control the remote propulsor speed and the remote propulsor pitch angle based on the single throttle lever input. Thus, the turbine engine control system can control the turbine engine and the remote propulsor based on the single throttle lever input. In this way, the propulsion system of the present disclosure requires only a single throttle lever to be actuated by the pilot to control both the turbine engine and the remote propulsor, thus, reducing pilot workload, allowing the pilot to better focus attention on other needs. The remote propulsor can include at least one of an electrical propulsor (e.g., powered by an electric machine) or a second turbine engine (e.g., turboprop engine). The present disclosure provides for communication between the turbine engine and the remote propulsor via a data communication bus using at least one of wireless (e.g., 5G), the aircraft communication bus (e.g., ARINC), or a dedicated wire harness between the turbine engine and the remote propulsor.

In certain embodiments, the propulsion system disclosed herein is a hybrid electric propulsion system in which the turbine engine (e.g., turboprop engine) includes the electric machine and the propulsor can be electrically powered by the electric machine. The remote propulsor can also be powered by an electric machine. The electric machines in the propulsion system can operate at a high-speed requiring a reduction gearbox between the electric machine and the propulsors. For example, the propulsor of the turbine engine and the remote propulsor both include a reduction gearbox between the electric machine of the respective propulsor and the propulsor.

The reduction gearbox requires lubrication when the propulsor (e.g., the propulsor of the turbine engine and/or the remote propulsor) is operated, with the local turbine engine in a shutdown/standby condition, such that the lubrication system of the local turbine engine is not functional. In particular, in current turbine engines, a pump of the lubrication system is powered by the turbine shaft (e.g., the LP shaft or the HP shaft), and, thus, the lubrication system is unable to provide lubricant to the gearbox when the turbine engine is shut down (the turbine shaft stops rotating). Therefore, the present disclosure also provides for a hybrid electric turbine engine system that incorporates a reduction gearbox with a gearbox lubrication system that is separate from the engine lubrication system. The gearbox lubrication system comprises a pump and a lubricant reservoir (e.g., a sump). In some embodiments, the gearbox lubrication system includes a heat exchanger, a pressure sensor, or a level sensor. The pressure sensor and level sensor output signals can be communicated to the remote propulsor either by discrete outputs or by a digital data bus via the turbine engine control system. In one embodiment, the lubrication system supplies the lubricant to one or more engine bearings from the propulsor gearbox lubrication system, while the turbine engine is shut down, and the propulsor is electrically driven. The gearbox lubrication system is powered by a pump that is drivingly coupled to at least one of the propulsor shaft, the turbine shaft, or the gears of the gearbox. In this way, the lubrication system is a mechanically driven lubrication system.

The present disclosure also provides for an electrically driven lubrication system. The lubrication system allows the turbo-engine to be shut down, while still providing lubrication to the propulsor. The lubrication system can be powered by aircraft power or by electric power from the remote turbine engine, when the remote turbine engine is in control. The lubrication system can include lubricant sensors that provide data to the remote turbine engine as well as to the local turbine engine, so as to allow for safe control by the remote turbine engine.

The present disclose further provides a plurality of lubricant sensors (e.g., temperature sensors, pressure sensors, level sensors, or flow rate sensors) associated with the lubrication system that enable fault monitoring by the remote turbine engine. The turbine engine control system identifies failure modes of the lubricant sensors and operates the remote turbine engine at a reduced power or shutting down the propulsor based on the failure modes.

Figure 9:
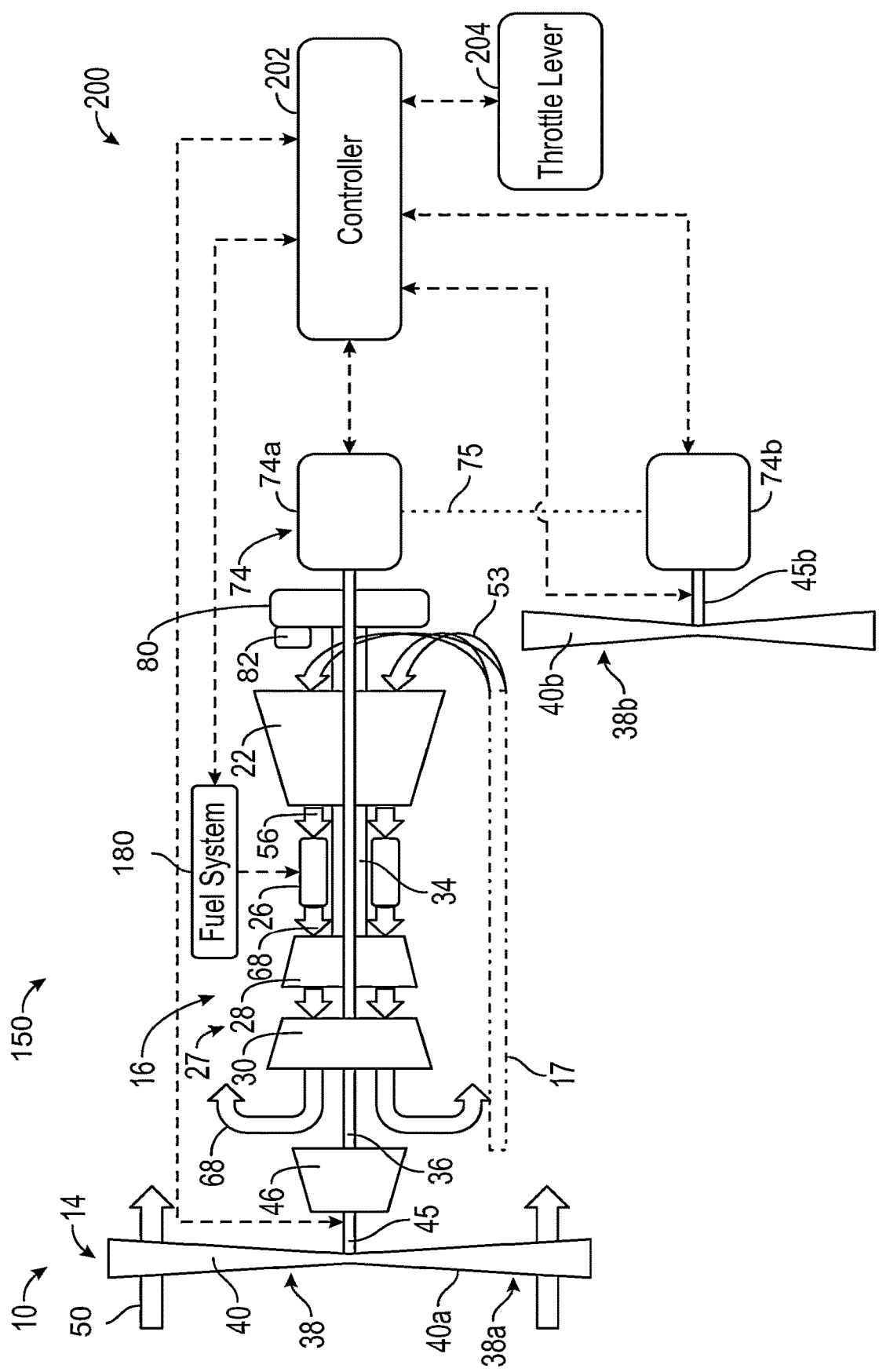
FIG. 9 is a schematic view of a propulsion system having a turbine engine control system, according to the present disclosure.

FIG. 9 is a schematic view of a propulsion system 150 having a turbine engine control system 200, according to the present disclosure. The propulsion system 150 of FIG. 9 is similar to the systems described above with respect to FIGS. 2-5. As such, common elements of the description will not be repeated here.

The turbine engine 10 also includes a fuel system 180 for providing the fuel to the combustor 26. For example, the fuel system 180 can include a fuel tank for storing the fuel, one or more fuel lines in flow communication with the fuel tank and the combustor 26, and a fuel pump for delivering the fuel from the fuel tank to the combustor 26 through the one or more fuel lines. The turbine engine 10 includes a first propulsor 38a having a plurality of first propulsor blades 40a and a first propulsor shaft 45a, and a first electric machine 74a.

The propulsion system 150 also includes a second propulsor 38b having a plurality of second propulsor blades 40b. The second propulsor 38b is remote (e.g., separate) from the turbine engine 10. The second propulsor 38b includes a second propulsor shaft 45b that is drivingly coupled to a second electric machine 74b. The second electric machine 74b is in electrical communication with the first electric machine 74a via a power conduit 75. In this way, the first electric machine 74a provides power to the second electric machine 74b via the power conduit 75. In some embodiments, the second electric machine 74b provides power to the first electric machine 74a via the power conduit 75. In some embodiments, the first electric machine 74a and the second electric machine 74b exchange power via a common energy storage device (e.g., one or more batteries). The second electric machine 74b is operated as a motor and drives the plurality of second propulsor blades 40b. The second electric machine 74b can be used to provide additional thrust output beyond that provided by the plurality of first propulsor blades 40a driven by the turbine engine 10.

The turbine engine control system 200 includes a controller 202 and a single input device, also referred to as a single throttle lever 204. The controller 202 is in two-way communication with the propulsion system 150 (e.g., the turbine engine 10, the second propulsor 38b, and the single throttle lever 204) for controlling aspects of the propulsion system 150 (e.g., the turbine engine 10, the second propulsor 38b, and the single throttle lever 204). The controller 202, or components thereof, may be located onboard the turbine engine 10, onboard the aircraft, or can be located remote from each of the turbine engine 10 and the aircraft (e.g., on the ground or on a remote propulsor). The controller 202 can be a Full Authority Digital Engine Control (FADEC) that controls aspects of the turbine engine 10.

The controller 202 may be a standalone controller or may be part of an engine controller to operate various systems of the turbine engine 10. In this embodiment, the controller 202 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 202 to perform operations. The controller 202 and, more specifically, the one or more processors are programmed or configured to perform these operations, such as the operations discussed further below. In some embodiments, the instructions can be executed by the one or more processors to cause the one or more processors to complete any of the operations and functions for which the controller 202 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The single throttle lever 204 is a single, pilot-controllable, power control lever for controlling a power level of the turbine engine 10 and the second propulsor 38b. In this way, the turbine engine control system 200 includes a single throttle lever 204 (e.g., one throttle lever) for controlling aspects of both the turbine engine 10 and the second propulsor 38b. The single throttle lever 204 may be a pilot-accessible mechanical lever, for instance, located in a cockpit or a flight deck of an aircraft, that allows the pilot to provide input to control the turbine engine control system 200 by physically moving the single throttle lever 204 through a predetermined physical range of motion corresponding to the operation range of the turbine engine control system 200. The single throttle lever 204 physical range of motion may additionally include a first portion or a first range, wherein moving the single throttle lever 204 into the first portion corresponds to a forward movement of the aircraft, and a second portion or a second range, wherein moving the single throttle lever 204 into the second portion corresponds to a rearward movement of the aircraft.

The single throttle lever 204 can include a positional sensor that detects or converts the position of the single throttle lever 204, relative to the operational range of the single throttle lever 204 motion (in both the first position and the second position), and generate an output signal (e.g., a control signal) indicative of the position of the single throttle lever 204. For example, the single throttle lever 204 can include a lever anchored at a lever pivot, and rotatable over 88°, wherein the foremost 44° of rotation (relative to the pilot) may provide the first portion in the range of motion, while the rearmost 44° may provide the second portion, or reverse, range of motion. The positional sensor, in turn, generates a control signal that ranges from −44° to +44°. The 0° to 44° range defines the first position (corresponding to forward movement) and the 0° to −44° range defines the second position (corresponding to rearward movement). The single throttle lever 204 can be rotatable over any range, as desired, for generating a control signal for controlling the turbine engine 10 or portions thereof.

While a lever is described for the single throttle lever 204, additional input devices allowing for pilot input can be used, such as a dial or a knob. Further, the single throttle lever 204 may be remote from the aircraft (e.g., remote controlled). Additionally, particular positions of the single throttle lever 204 may define different flight regimes, such as taxi, cruise, and takeoff. For example, a position of the single throttle lever 204 between 0 degrees and 20 degrees represents a taxi operation, a position of the single throttle lever 204 between 21 degrees and 30 degrees represents a cruise operation, and a position of the single throttle lever 204 at 44° represents a takeoff operation.

In operation, the turbine engine control system 200 receives an input (e.g., the control signal) from the single throttle lever 204 and controls the turbine engine 10 (e.g., at least one of the turbo-engine 16 or the first propulsor 38*a*) and the second propulsor 38*b* based on the input from the single throttle lever 204. In particular, the turbine engine control system 200 controls a rotational speed of the turbo-engine 16 and at least one of a rotational speed of the first propulsor 38*a*, a pitch of the plurality of first propulsor blades 40*a*, or a torque of the first propulsor 38*a*. The turbine engine control system 200 also controls at least one of a rotational speed of the second propulsor 38*b*, a pitch of the plurality of second propulsor blades 40*b*, or a torque of the second propulsor 38*b*. In some embodiments, the turbine engine control system 200 controls the fuel system 80 to increase or to decrease a fuel flow rate of the fuel to the combustor 26 to control the rotational speed of the core turbo-engine 16. In some embodiments, the turbine engine control system 200 controls the first electric machine 74*a* to control the first propulsor 38*a*. For example, the controller 202 controls the first electric machine 74*a* and the second electric machine 74*b* to increase or to decrease an amount of power from the first electric machine 74*a* to the first propulsor 38*a* for controlling the rotational speed or the torque of the first propulsor 38*a*. The turbine engine control system 200 similarly controls the second electric machine 74*b* to control the second propulsor 38*b*.

To control the turbine engine 10, the first propulsor 38*a*, and the second propulsor 38*b*, the controller 202 receives a position input from the single throttle lever 204. The controller 202 then converts the position input into at least one of a turbine engine setting or a first propulsor setting, and a second propulsor setting. The turbine engine setting includes a rotational speed of the turbo-engine 16. The first propulsor setting includes at least one of a rotational speed of the first propulsor 38*a*, a pitch of the plurality of first propulsor blades 40*a*, or a torque of the first propulsor 38*a*. The second propulsor setting includes at least one of a rotational speed of the second propulsor 38*b*, a pitch of the plurality of second propulsor blades 40*b*, or a torque of the second propulsor 38*b*. The controller 202 then controls at least one of a rotational speed of the turbo-engine 16, a rotational speed of the first propulsor 38*a*, a pitch of the plurality of first propulsor blades 40*a*, or a torque of the first propulsor 38*a*, and at least one of a rotational speed of the second propulsor 38*b*, a pitch of the plurality of second propulsor blades 40*b*, or a torque of the second propulsor 38*b* based on the at least one of the turbine engine setting or the first propulsor setting, and the second propulsor setting. For example, the controller 202 controls the rotational speed of the turbo-engine 16 based on the turbine engine setting. The controller 202 controls at least one of the rotational speed of the first propulsor 38*a*, the pitch of the plurality of first propulsor blades 40*a*, or the torque of the first propulsor 38*a* based on the first propulsor setting. The controller 202 controls at least one of the rotational speed of the second propulsor 38*b*, the pitch of the plurality of second propulsor blades 40*b*, or the torque of the second propulsor 38*b* based on the second propulsor setting.

In one embodiment, the controller 202 determines the turbine engine setting, the first propulsor setting, and the second propulsor setting based on one or more speed maps. For example, the controller 202 includes a turbo-engine speed map, a first propulsor speed map, and a second propulsor speed map. The turbine engine speed map, the first propulsor speed map, and the second propulsor speed map each operates as a demand map, or a look-up table, and may be configured with predetermined or dynamic profiles or setting values, for instance, via an implementation of an algorithm. In particular, the speed maps correlate various position inputs from the single throttle lever 204 to the turbine engine setting, the first propulsor setting, and the second propulsor setting. Each of the turbine engine speed map, the first propulsor speed map, and the second propulsor speed map may additionally define limitations to aircraft operation. For example, the turbine engine speed map, the first propulsor speed map, and the second propulsor speed map may provide limited maximum or minimum thrust or speed utilized during taxi, cruise, or takeoff. In another example, the turbine engine speed map, the first propulsor speed map, and the second propulsor speed map may define a maximum or a minimum turbine engine 10 speed, first propulsor 38*a* speed and pitch, or second propulsor 38*b* speed and pitch utilized during ground idle. In another example, the first propulsor speed map and the second propulsor speed map may define a constant propulsor speed with an adjusting propulsor blade pitch value. Alternatively, the first propulsor speed map and the second propulsor speed map may provide a constant propulsor blade pitch value with a varying propulsor speed. In yet another example, the first propulsor speed map and the second propulsor speed map may provide a varied speed or a varied pitch in either a forward thrust operation or a reverse thrust operation. In even yet another example, the first propulsor speed map and the second propulsor speed map may employ multiple maps, wherein, for instance, a forward control signal utilizes a forward propulsor speed map while a reverse control signal utilizes a reverse propulsor speed map. In even yet another example, the turbine engine speed map, the first propulsor speed map, and the second propulsor speed map may be configured to prevent excess or undesirable temperature conditions on the turbo-engine 16 and over-torque or over-speed on the first propulsor 38*a* and the second propulsor 38*b*, respectively.

The turbine engine speed map, the first propulsor speed map, and the second propulsor speed map may additionally define profiles of operation, wherein, for example, the turbine engine speed map, the first propulsor speed map, and the second propulsor speed map are configured to provide setting values for optimal aircraft efficiency, turbine engine efficiency, or propulsor efficiency. For example, the first propulsor speed map and the second propulsor speed map may be configured to provide an optimized propulsor speed for a corresponding turbine engine speed map value. The optimized profiles may additionally take into account additional sensor values, for instance, relating to air speed, altitude, etc., to provide an optimal turbine engine 10 speed, an optimal first propulsor 38*a* speed and first propulsor blade 40*a* pitch, and an optimal second propulsor 38*b* speed and second propulsor blade 40*b* pitch, for example, for an optimized fuel efficiency profile, an optimized thrust profile, an optimized audible profile (i.e., by controlling pitch of the first propulsor blades 40*a* or the second propulsor blades 40*b*), or an optimized flight time efficiency profile. The optimization profiles may be further delineated by a given control signal from the single throttle lever 204. The optimized profiles may be user-selectable by the pilot.

Additionally, or alternatively, at least one of the turbine engine speed map, the first propulsor speed map, or the second propulsor speed map may be configured to provide for a linear thrust response, that is, a linear thrust relative to the position of the single throttle lever 204. The thrust response may be linear in a forward thrust operation or a reverse thrust operation. In this sense, "linear" may refer to the overall thrust which, as explained above, is affected by the configurations of the turbine engine 10, the first propulsor 38*a*, the first propulsor blades 40*a*, the second propulsor 38b, and the second propulsor blades 40b. Thus, a linear thrust may not be proportionally related to, for example, only a change in one component (e.g., the core turbo-engine 16, the first propulsor 38a, the first propulsor blades 40a, the second propulsor 38b, or the second propulsor blades 40b) of the configuration. Additionally, "linear" may define a maximum allowable change in setting values, regardless of how much change or how quickly a change was requested via the single throttle lever 204. In this instance, a "linear" thrust response may only allow for a 1% increase in turbine engine power per second. In another sense, "linear" may define a feedback response from a perspective of the pilot. For instance, a pilot may define a feeling of "linear" thrust response as, for example, a 1% increase in thrust for one second, followed by a 2% increase in thrust for three seconds. Further, this thrust response may be different depending on the status, or flight regime, of the aircraft (e.g., taxi, cruise, takeoff, etc.).

Each of the turbine engine speed map, the first propulsor speed map, or the second propulsor speed map receive the control signal from the single throttle lever 204, and the controller 202 determines the turbine engine setting (e.g., the turbo-engine setting and the first propulsor setting) and the second propulsor setting in response to, or as a function of, the received input. In some embodiments, the controller 202 determines a desired turbine engine setting (e.g., a desired turbo-engine setting and a desired first propulsor setting) and a desired second propulsor setting based on the received input from the single throttle lever 204. The controller 202 then compares the desired turbine engine setting and the desired second propulsor setting to an actual turbine engine setting and an actual second propulsor setting. For example, the controller 202 determines the actual rotational speed of the turbo-engine 16, the actual rotational speed of the first propulsor 38a and the second propulsor 38b, the actual pitch of the first propulsor blades 40a and the second propulsor blades 40b, and the actual torque of the first propulsor 38a and the second propulsor 38b.

The controller 202 then controls the turbo-engine 16, the first propulsor 38a, and the second propulsor 38b based on the comparison. For example, to speed up the first propulsor 38a or the second propulsor 38b, the controller 202 generates a positive value, that, in turn, decreases the first propulsor 38a pitch or the second propulsor 38b pitch, thus increasing the rotational speed of the first propulsor 38a or the second propulsor 38b. Likewise, to slow down the first propulsor 38a or the second propulsor 38b, the controller 202 generates a negative value, that, in turn, increases the first propulsor 38a pitch or the second propulsor 38b pitch, thus decreasing the rotational speed of the first propulsor 38a or the second propulsor 38b. In instances when the control signal is static, the operation of speeding up and/or slowing down of the first propulsor 38a or the second propulsor 38b will ultimately equalize at a point wherein the controller 202 generates a neutral value, at which the pitch of the first propulsor 38a or the second propulsor 38b is neither increased nor decreased. The controller 202 can similarly control the turbo-engine 16, the first propulsor 38a, and the second propulsor 38b during a reverse thrust operation.

Figure 10:
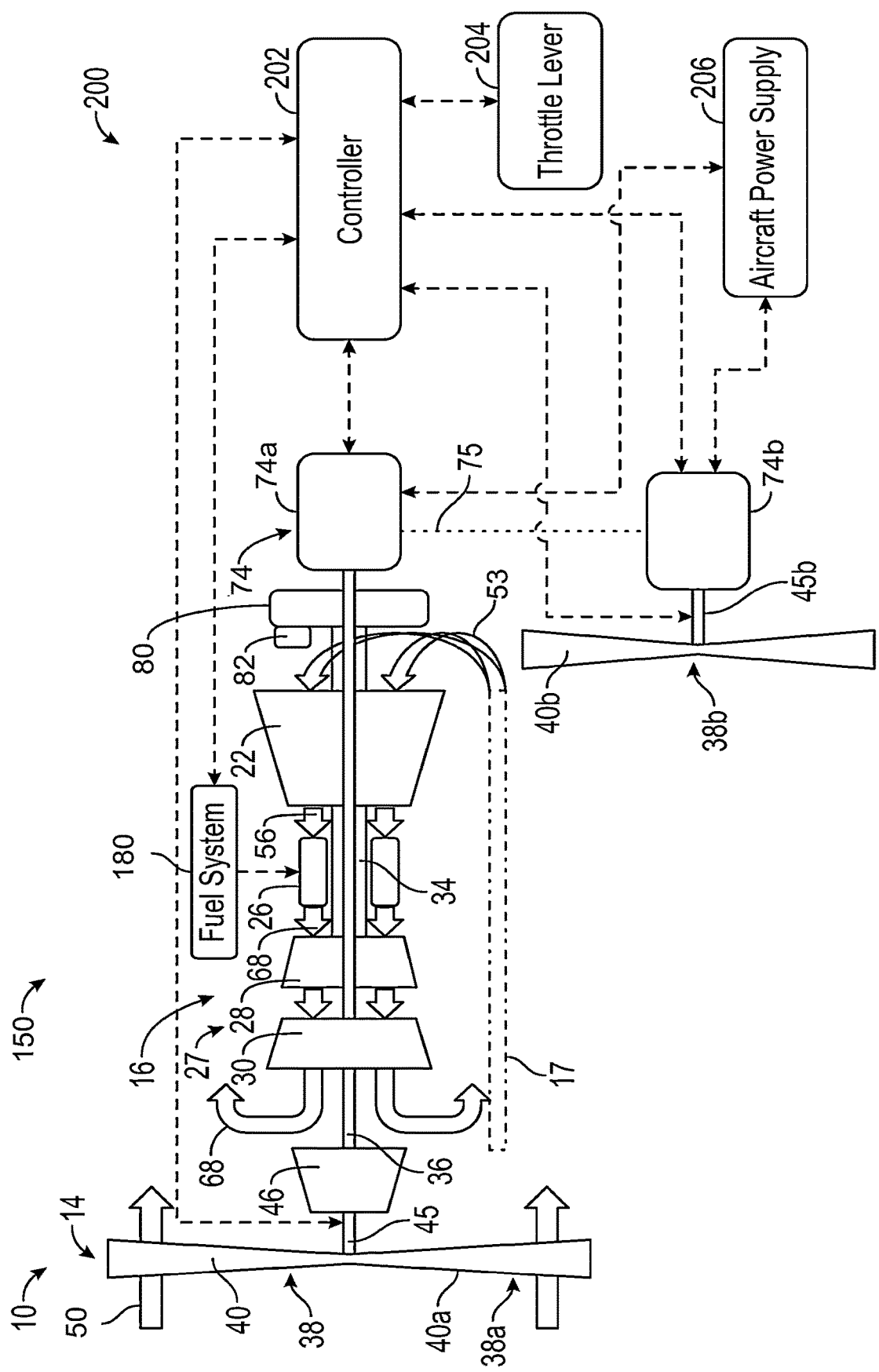
FIG. 10 is a schematic view of the propulsion system of FIG. 9 having the turbine engine control system, according to the present disclosure.

FIG. 10 is a schematic view of the propulsion system 150 having the turbine engine control system 200, according to the present disclosure. As shown in FIG. 10, the turbine engine control system 200 further includes an aircraft power supply 206 for powering the second electric machine 74b. The aircraft power supply 206 includes at least one of a fuel cell, one or more batteries, or an auxiliary power unit (APU) of the aircraft. The aircraft power supply 206 can also power the first electric machine 74a. In some embodiments, the second electric machine 74b receives power from both the first electric machine 74a and the aircraft power supply 206. For example, the aircraft power supply 206 supplies the power during takeoff or landing, and the first electric machine 74a supplies the power during cruise.

Figure 11:
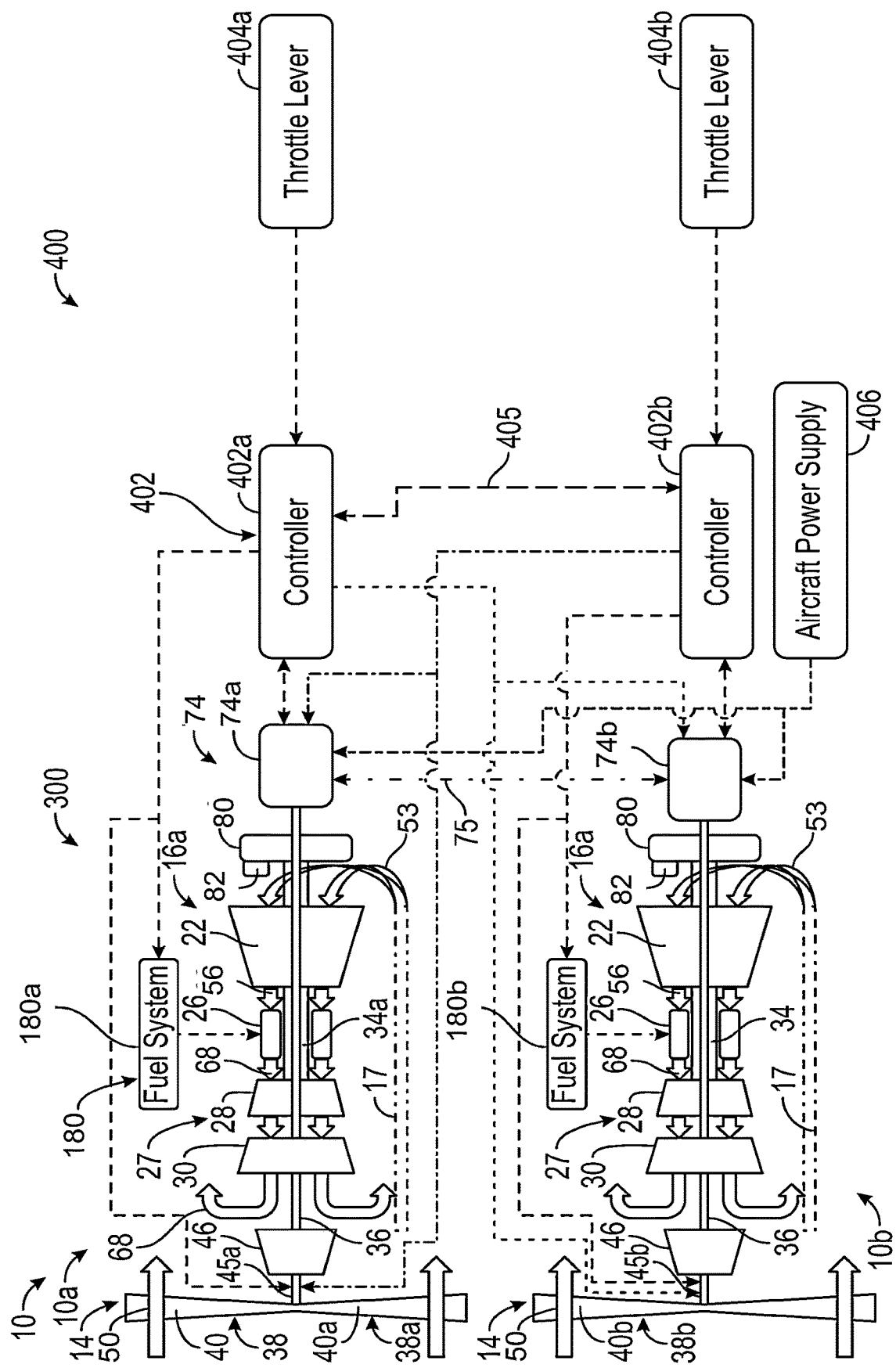
FIG. 11 is a schematic view of a propulsion system having a turbine engine control system, according to another embodiment.

FIG. 11 is a schematic view of a propulsion system 300 having a turbine engine control system 400, according to another embodiment. The turbine engine control system 400 is substantially similar to the turbine engine control system 200 of FIGS. 9 and 10. The same or similar reference numerals will be used for components of the turbine engine control system 400 that are the same as or similar to the components of the turbine engine control system 200 discussed above, unless stated otherwise. The description of these components above also applies to this embodiment, and a detailed description of these components is omitted here.

The propulsion system 300 includes a plurality of turbine engines 10 including a first turbine engine 10a and a second turbine engine 10b. The first turbine engine 10a has a first turbo-engine 16a and the second turbine engine 10b has a second turbo-engine 16b. The second propulsor 38b is drivingly coupled to the second turbo-engine 16b (e.g., via the LP shaft 36 of the second turbo-engine 16b) such that the second turbine engine 10b includes the second propulsor 38b. In this way, the second turbo-engine 16b powers the second propulsor 38b. The first turbine engine 10a includes a first fuel system 180a and the second turbine engine 10b includes a second fuel system 180b.

The turbine engine control system 400 includes one or more controllers 402 and one or more single throttle levers 404 including a first single throttle lever 404a and a second single throttle lever 404b. The turbine engine control system 400 also includes an aircraft power supply 406. The one or more controllers 402 include a first controller 402a for controlling the first turbine engine 10a and a second controller 402b for controlling the second turbine engine 10b. The first single throttle lever 404a is in communication with the first controller 402a. The second single throttle lever 404b is in communication with the second controller 402b. In this way, the first single throttle lever 404a controls the first turbine engine 10a and the second single throttle lever 404b controls the second turbine engine 10b. The turbine engine control system 400 also includes a data communication bus 405 for providing communication between the first controller 402a and the second controller 402b. The data communication bus 405 can include wired communication (e.g., a wire harness, an aircraft data bus, such as ARINC, etc.) or wireless communication (e.g., Wi-Fi®, Bluetooth®, cellular communication, such as 5G, etc.). In this way, the first controller 402a can control aspects of the second turbine engine 10b and the second controller 402b can control aspects of the first turbine engine 10a, under certain operating conditions, as detailed further below.

In operation, the turbine engine control system 400 is substantially similar to the turbine engine control system 200 of FIG. 2. The first controller 402a controls the first turbine engine 10a (e.g., the first turbo-engine 16a and the first propulsor 38a) based on the input from the first single throttle lever 404a. The second controller 402b controls the second turbine engine 10b (e.g., the second turbo-engine 16b and the second propulsor 38b) based on the input from the second single throttle lever 404b.

The first controller 402a receives operating mode signals indicative of an operating mode of the second turbine engine 10*b* from the second controller 402*b*. In some instances, the second turbine engine 10*b* enters a standby operating mode or a failure mode occurs. For example, the rotational speed of the second turbo-engine 16*b* reduces to less than a speed threshold for the current flight condition, or the first controller 402*a* loses communication with the second controller 402*b*. The standby operating mode can comprise at least one of a normal idling mode, an assisted idling mode, a banking mode, or a stopping mode. The normal idling mode occurs when the combustor 26 is operating (e.g., ignited) and the LP shaft 36 rotates at a rotational speed in a range of 45% to 70% of a nominal speed of the LP shaft 36. The nominal speed is a speed of the LP shaft 36 at a maximum cruise condition of the second turbine engine 10*b* (or the first turbine engine 10*a*). The assisted idling mode occurs when the combustor 26 is operating and the LP shaft 36 rotates in a mechanically-assisted manner (e.g., via the starter motor 82) at a rotational speed in a range of 20% to 60% of the nominal speed. The banking mode occurs when the combustor 26 is shut down (e.g., extinguished) and the LP shaft 36 rotates in a mechanically-assisted manner at a rotational speed in a range of 5% to 30% of the nominal speed. The stopping mode occurs when the combustor 26 is shut down and the LP shaft 36 stops rotating or windmills due to airflow through the turbine engine 10.

The first controller 402*a* detects that the second turbine engine 10*b* is in the standby operating mode (e.g., based on the operating mode signals) and provides electrical power from the first turbine engine 10*a* (e.g., the first electric machine 74*a*) to the second turbine engine 10*b* (e.g., the second electric machine 74*b*) such that the first turbine engine 10*a* powers the second turbine engine 10*b*. During the standby operating mode of the second turbine engine 10*b*, the first controller 402*a* controls the second turbine engine 10*b* and the second propulsor 38*b* based on the input from the first single throttle lever 404*a*. In this way, the first controller 402*a* controls the rotational speed of the first turbo-engine 16*a* and the second turbo-engine 16*b*, the rotational speed and the torque of the first propulsor 38*a* and the second propulsor 38*b*, and the pitch of the first propulsor blades 40*a* and the second propulsor blades 40*b* based on the input from the first single throttle lever 404*a*. In some embodiments, the first controller 402*a* controls the second turbine engine 10*b* based on a predetermined position or a positional threshold of the first single throttle lever 404*a*. For example, the pilot could move the first single throttle lever 404*a* into the predetermined position or beyond the positional threshold during any operating mode to control the second turbine engine 10*b* with the first controller 402*a* based on the first single throttle lever 404*a*.

Figure 12:
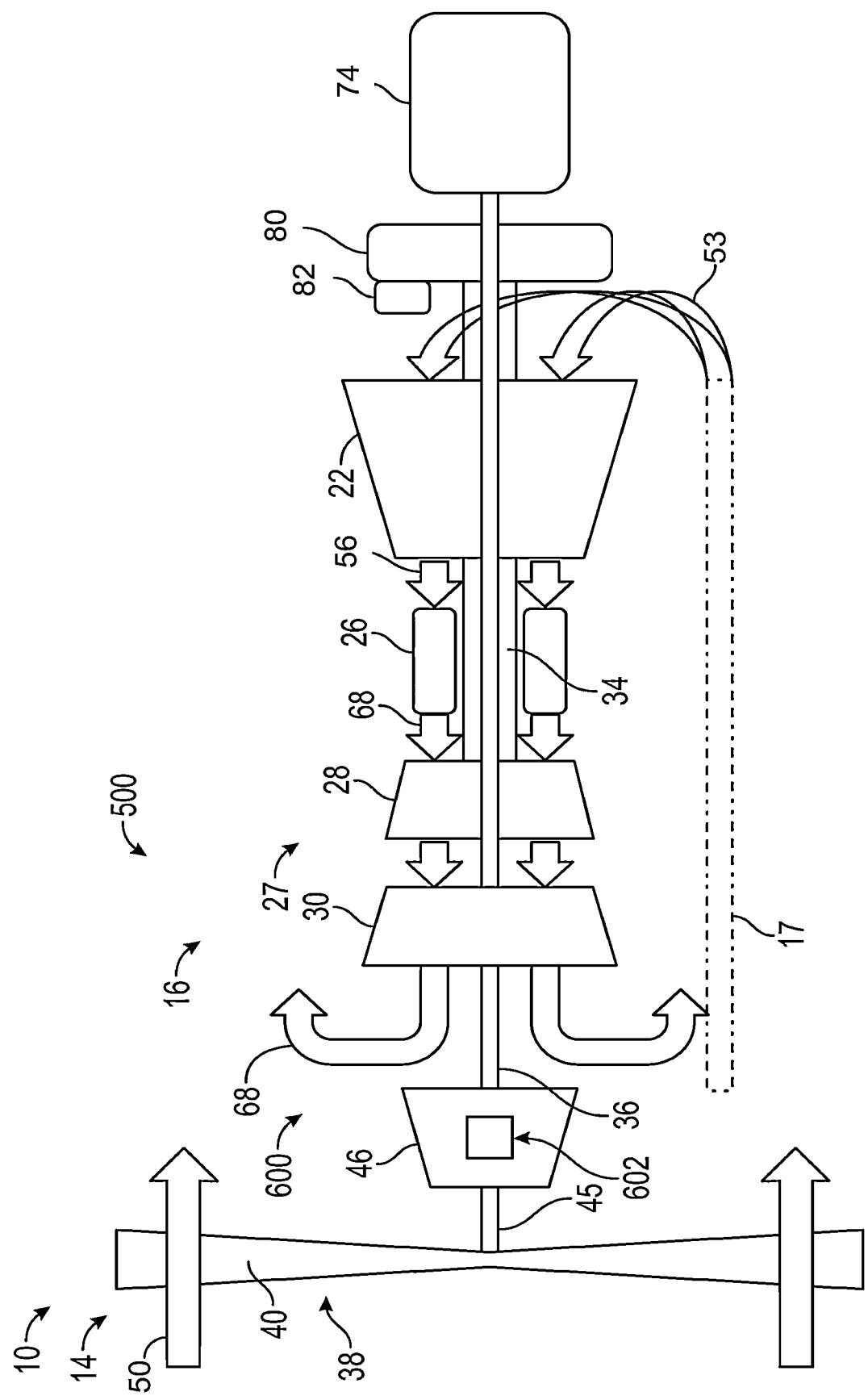
FIG. 12 is a schematic view of a propulsion system, according to another embodiment.

FIG. 12 is a schematic view of a propulsion system 500, according to another embodiment. The propulsion system 500 includes the turbine engine 10. The turbine engine 10 includes a lubrication system 600 having a gearbox lubrication system 602 for the gearbox assembly 46. The gearbox lubrication system 602 is entirely contained within the gearbox assembly 46, as detailed further below.

Figure 13:
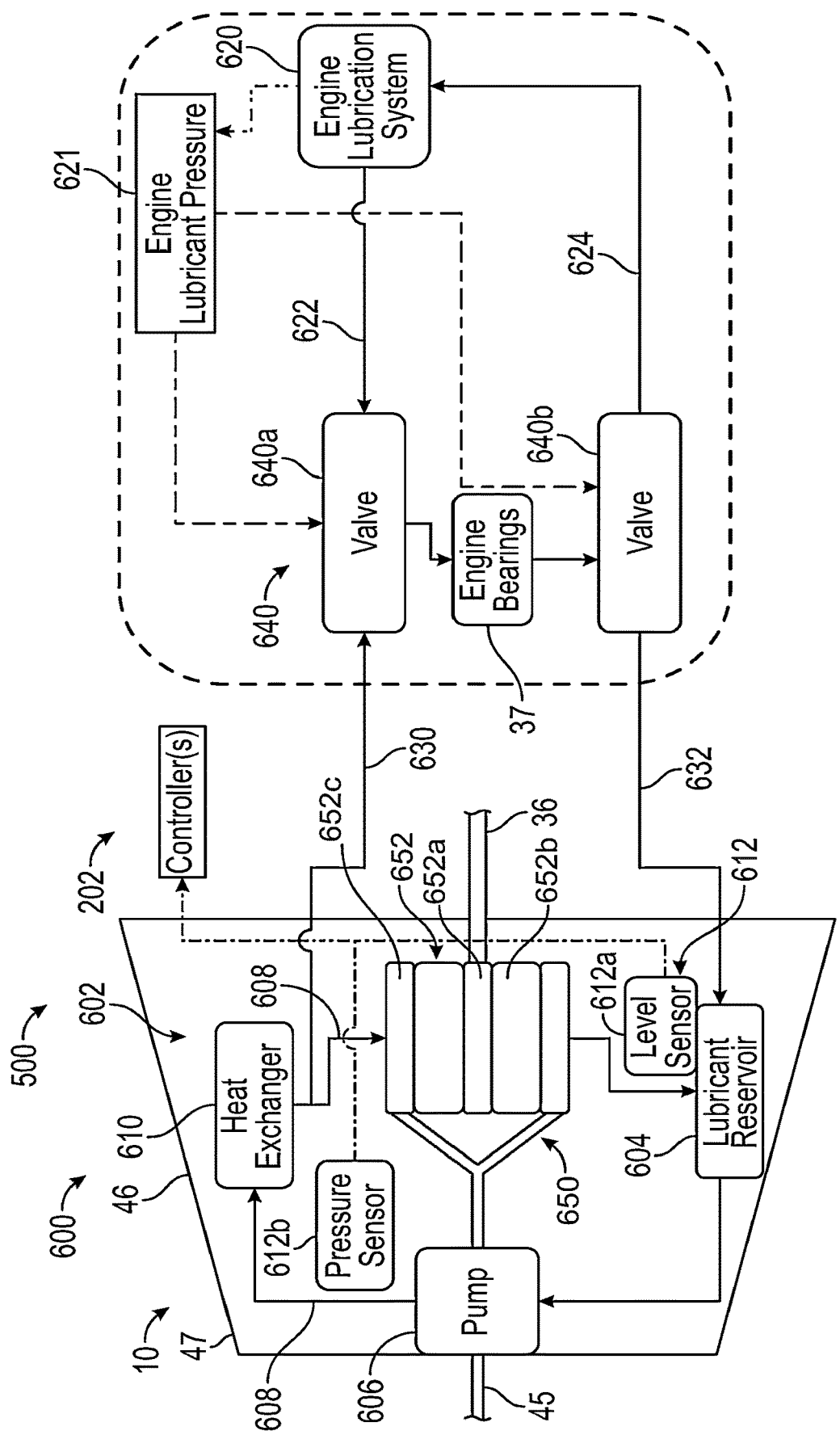
FIG. 13 is an enlarged schematic view of a lubrication system for the propulsion system of FIG. 12, according to the present disclosure.

FIG. 13 is an enlarged schematic view of the lubrication system 600 for the propulsion system 500, according to the present disclosure. As shown in FIG. 13, the turbine engine 10 includes one or more engine bearings 37 that support rotation of the HP shaft 34, the LP shaft 36, or other rotating components of the turbine engine 10. The gearbox assembly 46 includes a gearbox housing 47 and a gear assembly 650 disposed within the gearbox housing 47. The propulsor shaft 45 is drivingly coupled to the LP shaft 36 through the gear assembly 650. The gear assembly 650 includes one or more gears 652. In FIG. 13, the gear assembly 650 is a planetary gear assembly that includes a first gear 652*a*, one or more second gears 652*b*, and a third gear 652*c*. The first gear 652*a* is a sun gear, the one or more second gears 652*b* are planet gears, and the third gear 52*c* is a ring gear. The LP shaft 36 is coupled to the first gear 652*a* and the propulsor shaft 45 is coupled to the third gear 652*c*. The gear assembly 650 can include any number of gears 652 in any configuration for transmitting power from the LP shaft 36 to the propulsor shaft 45, as desired.

The gearbox lubrication system 602 includes a gearbox lubricant reservoir 604, a pump 606, and a gearbox lubricant supply line 608. The gearbox lubricant reservoir 604 stores a lubricant therein. The lubricant can include any type of lubricant for lubricating the gearbox assembly 46. For example, the lubricant is oil, or the like. The gearbox lubricant reservoir 604 includes at least one of a lubricant tank or a sump. The sump collects the lubricant that drains from the gear assembly 650. The gearbox lubricant supply line 608 is in fluid communication with the gearbox lubricant reservoir 604 and the gear assembly 650 for supplying the lubricant from the gearbox lubricant reservoir 604 to the gear assembly 650. The pump 606 is in fluid communication with the gearbox lubricant supply line 608 to pump the lubricant from the gearbox lubricant reservoir 604 to the gear assembly 650 through the gearbox lubricant supply line 608. The pump 606 is drivingly coupled to the propulsor shaft 45. In this way, the pump 606 pumps the lubricant from the gearbox lubricant reservoir 604 when the propulsor shaft 45 rotates. Thus, the lubrication system 600 is a mechanically-driven lubrication system. In some embodiments, the pump 606 is drivingly coupled to the LP shaft 36. In some embodiments, the pump 606 is drivingly coupled to at least one of the plurality of gears 652 of the gear assembly 650. Thus, the pump 606 is drivingly coupled to at least one of the propulsor shaft 45, the LP shaft 36, or the gear assembly 650. The gearbox lubrication system 602 also includes a heat exchanger 610 in fluid communication with the gearbox lubricant supply line 608. The heat exchanger 610 cools the lubricant as the lubricant flows through the gearbox lubricant supply line 608 before being supplied to the gear assembly 650.

The gearbox lubrication system 602 also includes one or more lubricant sensors 612 for sensing information about the lubricant in the gearbox lubrication system 602. The one or more lubricant sensors 612 are in communication with the controller 202 for sending the information about the lubricant to the controller 202. For the propulsion system 300 (FIG. 11), the one or more lubricant sensors 612 send the information about the lubricant to the first controller 402*a* (FIG. 11) of the first turbine engine 10*a* (FIG. 11) and to the second controller 402*b* (FIG. 11) of the second turbine engine 10*b* (FIG. 11). In this way, both the local engine (e.g., the first turbine engine 10*a*) and the remote engine (e.g., the second turbine engine 10*b*) receive the information about the lubricant from the one or more lubricant sensors 612 of each of the turbine engines 10*a*, 10*b*.

The one or more lubricant sensors 612 include a lubricant level sensor 612*a* and a lubricant pressure sensor 612*b*. The lubricant level sensor 612*a* senses a level of the lubricant in the gearbox lubricant reservoir 604. The lubricant pressure sensor 612*b* senses a pressure of the lubricant in the gearbox lubricant supply line 608. The lubricant sensors 612 can also include a lubricant temperature sensor for sensing a temperature of the lubricant, and a lubricant flow sensor for sensing a flow rate of the lubricant. The propulsion system 500 can utilize the information from the sensors to detect a failure mode of the lubrication system 600 and to control the turbine engine 10 in response to the failure mode, as detailed further below.

The lubrication system 600 also includes an engine lubrication system 620 that supplies lubricant to the one or more engine bearings 37. The gearbox lubrication system 602 is fluidly separate from the engine lubrication system 620. In this way, the gearbox lubrication system 602 lubricates the gear assembly 650 without receiving lubricant from the engine lubrication system 620. The engine lubrication system 620 includes an engine lubricant supply line 622 and an engine lubricant return line 624. Although not shown, the engine lubrication system 620 also includes a pump and a gearbox lubricant reservoir. The engine lubricant supply line 622 is in fluid communication with the engine bearings 37 for supplying the lubricant to the engine bearings 37 through the engine lubricant supply line 622. The engine lubricant return line 624 is in fluid communication with the engine bearings 37 for returning the lubricant from the engine bearings 37 back to the engine lubrication system 620.

The lubrication system 600 includes a gearbox engine bearing supply line 630 and a gearbox engine bearing return line 632. The gearbox engine bearing supply line 630 is in fluid communication with the gearbox lubricant supply line 608 and the engine bearings 37 for supplying the lubricant from the gearbox lubrication system 602 to the engine bearings 37. The gearbox engine bearing return line 632 is in fluid communication with the engine bearings 37 and the gearbox lubricant reservoir 604 for returning the lubricant from the engine bearings 37 to the gearbox lubricant reservoir 604.

The lubrication system further includes one or more valves 640 in fluid communication with the engine lubricant supply line 622, the gearbox engine bearing supply line 630, the engine lubricant return line 624, and the gearbox engine bearing return line 632. The one or more valves 640 can be shuttle valves for allowing the lubricant to flow, or preventing the lubricant from flowing, through the engine lubricant supply line 622, the gearbox engine bearing supply line 630, the engine lubricant return line 624, and the gearbox engine bearing return line 632. The one or more valves 640 can include any type of valve, such as, for example, check valves, for allowing the lubricant to flow, or preventing the lubricant from flowing, through the engine lubricant supply line 622, the gearbox engine bearing supply line 630, the engine lubricant return line 624, and the gearbox engine bearing return line 632. The one or more valves 640 include a first valve 640a in fluid communication with the engine lubricant supply line 622 and the gearbox engine bearing supply line 630. The first valve 640a allows the lubricant to flow, or prevents the lubricant from flowing, through the engine lubricant supply line 622 and the gearbox engine bearing supply line 630. The one or more valves 640 include a second valve 640b in fluid communication with the engine lubricant return line 624 and the gearbox engine bearing return line 632. The second valve 640b allows the lubricant to flow, or prevents the lubricant from flowing, through the engine lubricant return line 624 and the gearbox engine bearing return line 632.

The engine lubrication system 620 communicates an engine lubricant pressure signal 621 to the one or more valves 640 for actuating the one or more valves 640, as detailed further below. In some embodiments, the one or more valves 640 are electrically actuated by the turbine engine control system 400. For example, the controller 202 controls the one or more valves 640 to actuate the one or more valves 640.

In operation, the gearbox lubrication system 602 supplies the lubricant to the gear assembly 650 to lubricate the gear assembly 650. The gearbox lubrication system 602 is a standalone lubrication system that operates to supply the lubricant to the gear assembly 650 entirely separate from the engine lubrication system 620. In particular, the pump 606 pumps the lubricant from the gearbox lubricant reservoir 604 to the gear assembly 650 through the gearbox lubricant supply line 608. The heat exchanger 610 cools the lubricant in the gearbox lubricant supply line 608 as the lubricant flows through the gearbox lubricant supply line 608 and to the gear assembly 650. After lubricating the gear assembly 650 (e.g., the plurality of gears 652), the lubricant drains into the gearbox lubricant reservoir 604 (e.g., the sump). The lubricant is then re-circulated through the gearbox lubrication system 602. Thus, the gearbox lubrication system 602 is a self-contained lubrication system for supplying the lubricant to the gear assembly 650 without the use of the engine lubrication system 620. In this way, the gearbox lubrication system 602 can operate even if the turbo-engine 16 (FIG. 12) shuts down.

During normal operation, the engine lubrication system 620 supplies the lubricant to the engine bearings 37 through the engine lubricant supply line 622. During the normal operation, the pressure of the lubricant in the engine lubrication system 620 (e.g., the engine lubricant supply line 622) is greater than the pressure of the lubricant in the gearbox lubrication system 602 (e.g., the gearbox engine bearing supply line 630). Thus, the first valve 640a opens the engine lubricant supply line 622 and closes the gearbox engine bearing supply line 630. In this way, the lubricant flows through the engine lubricant supply line 622 to the engine bearings 37 for lubricating the engine bearings 37, and the first valve 640a prevents the lubricant in the gearbox lubrication system 602 from flowing to the engine bearings 37. After lubricating the engine bearings 37, the engine lubricant return line 624 directs the lubricant back through the engine lubrication system 620. In particular, the second valve 640b opens the engine lubricant return line 624 and closes the gearbox engine bearing return line 632. In this way, the lubricant flows from the engine bearings 37 to the engine lubrication system 620 through the engine lubricant return line 624 to recirculate the lubricant to the engine bearings 37.

The gearbox lubrication system 602 supplies the lubricant to the engine bearings 37 when the turbine engine 10 is shut down. The engine lubrication system 620 reduces the supply, or stops the supply, of the lubricant to the engine bearings 37 when the turbine engine 10 is shut down such that the pressure of the lubricant in the engine lubrication system 620 reduces. Accordingly, the pressure of the lubricant in the gearbox lubrication system 602 is greater than the pressure of lubricant in the engine lubrication system 620 when the turbine engine 10 is shut down. The first valve 640a closes the engine lubricant supply line 622 and opens the gearbox engine bearing supply line 630. In this way, the lubricant from the gearbox lubrication system 602 flows through the gearbox engine bearing supply line 630 to the engine bearings 37 to lubricate the engine bearings 37. After lubricating the engine bearings 37, the gearbox engine bearing return line 632 directs the lubricant back through the gearbox lubrication system 602. In particular, the second valve 640b opens the gearbox engine bearing return line 632 and closes the engine lubricant return line 624. In this way, the lubricant flows from the engine bearings 37 to the gearbox lubricant reservoir 604 to recirculate the lubricant through the gearbox lubrication system 602.

Figure 14:
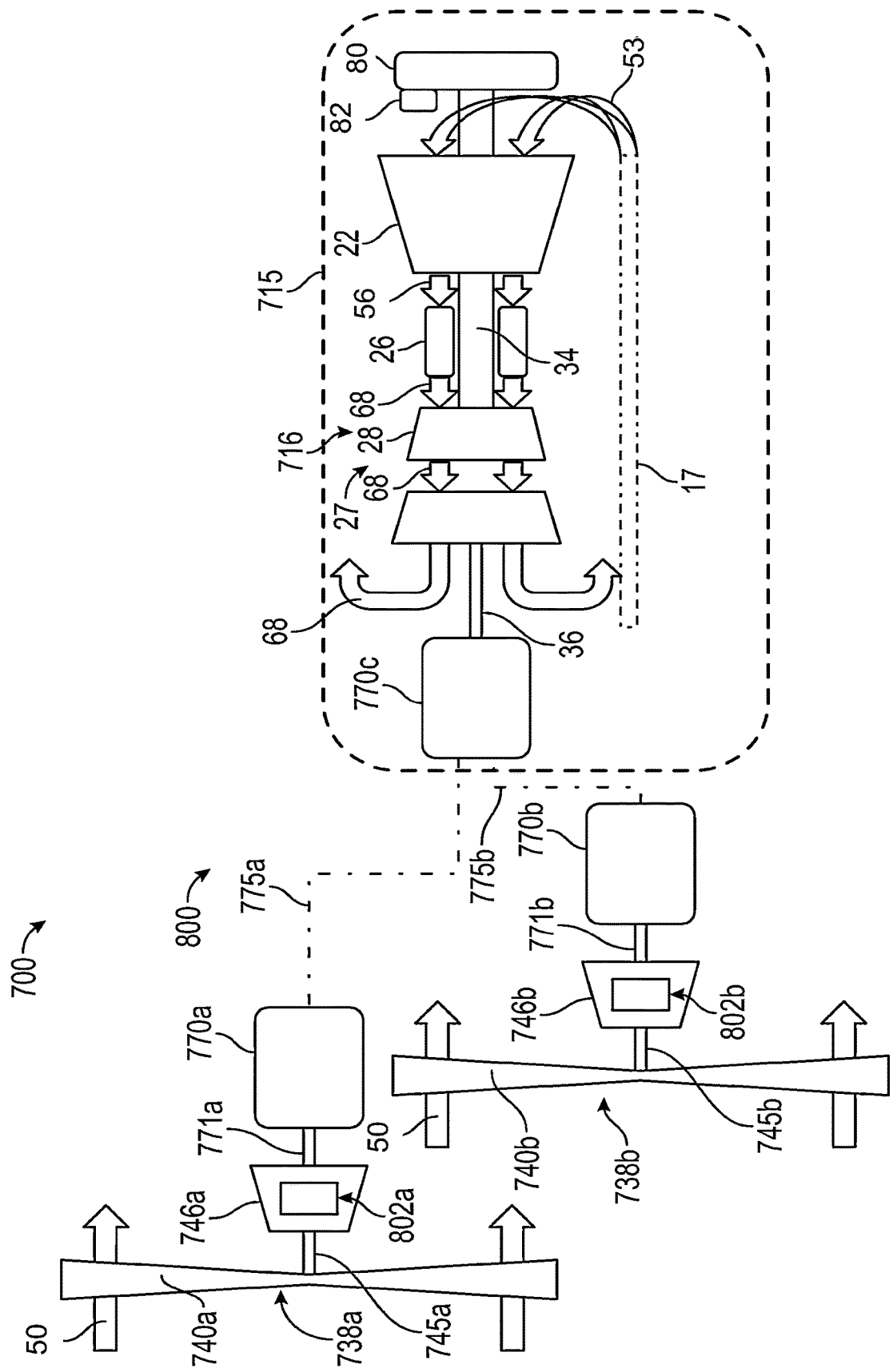
FIG. 14 is a schematic view of a propulsion system having a lubrication system, according to another embodiment.

FIG. 14 is a schematic view of a propulsion system 700 having a lubrication system 800, according to another embodiment. The lubrication system 800 is substantially similar to the lubrication system 600 of FIGS. 12 and 13. The same or similar reference numerals will be used for components of the lubrication system 800 that are the same as or similar to the components of the lubrication system 600 discussed above, unless stated otherwise. The description of these components above also applies to this embodiment, and a detailed description of these components is omitted here.

The propulsion system 700 includes a first propulsor 738a, a second propulsor 738b, and an electric power supply 715. The first propulsor 738a includes a plurality of first propulsor blades 740a and a first propulsor shaft 745a that is drivingly coupled to a first electric machine 770a. In particular, the first electric machine 770a includes a first electric machine shaft 771a, and the first propulsor shaft 745a is drivingly coupled to the first electric machine shaft 771a. The first propulsor 738a also includes a first gearbox assembly 746a, and the first propulsor shaft 745a is drivingly coupled to the first electric machine shaft 771a through the first gearbox assembly 746a. The first gearbox assembly 746a includes a first gearbox lubrication system 802a that is a self-contained lubrication system similar to the gearbox lubrication system 602 of FIGS. 12 and 13. In some embodiments, the first electric machine 770a includes an electric machine lubrication system, such as the electric machine lubrication system 1200, detailed below with respect to FIGS. 16 and 17.

The second propulsor 738b includes a plurality of second propulsor blades 740b and a second propulsor shaft 745b that is drivingly coupled to a second electric machine 770b. In particular, the second electric machine 770b includes a second electric machine shaft 771b, and the second propulsor shaft 745b is drivingly coupled to the second electric machine shaft 771b. The second propulsor 738b also includes a second gearbox assembly 746b, and the second propulsor shaft 745b is drivingly coupled to the second electric machine shaft 771b through the second gearbox assembly 746b. The second gearbox assembly 746b includes a second gearbox lubrication system 802b that is a self-contained lubrication system similar to the gearbox lubrication system 602 of FIGS. 12 and 13. In some embodiments, the second electric machine 770b includes an electric machine lubrication system, such as the electric machine lubrication system 1200, detailed below with respect to FIGS. 16 and 17.

The electric power supply 715 includes a turbo-engine 716. The turbo-engine 716 includes a third electric machine 770c that is drivingly coupled to the LP shaft 36. In this way, the turbo-engine 716 supplies mechanical power to the third electric machine 770c, and the third electric machine 770c converts the mechanical power into electric power. The electric power supply 715 is in electrical communication with the first electric machine 770a via a first electric conduit 775a, and with the second electric machine 770b via a second electric conduit 775b. In this way, the electric power supply 715 supplies electric power to the first electric machine 770a and to the second electric machine 770b for powering the first propulsor 738a and the second propulsor 738b, respectively. In particular, the first electric machine 770a and the second electric machine 770b are in electrical communication with the third electric machine 770c, and the third electric machine 770c supplies the electric power to the first electric machine 770a and to the second electric machine 770b. In some embodiments, the electric power supply 715 includes a fuel cell, a battery, or an APU of the aircraft. In this way, the electric power supply 715 includes at least one of the turbo-engine 716, a fuel cell, a battery, or an APU.

Figure 15:
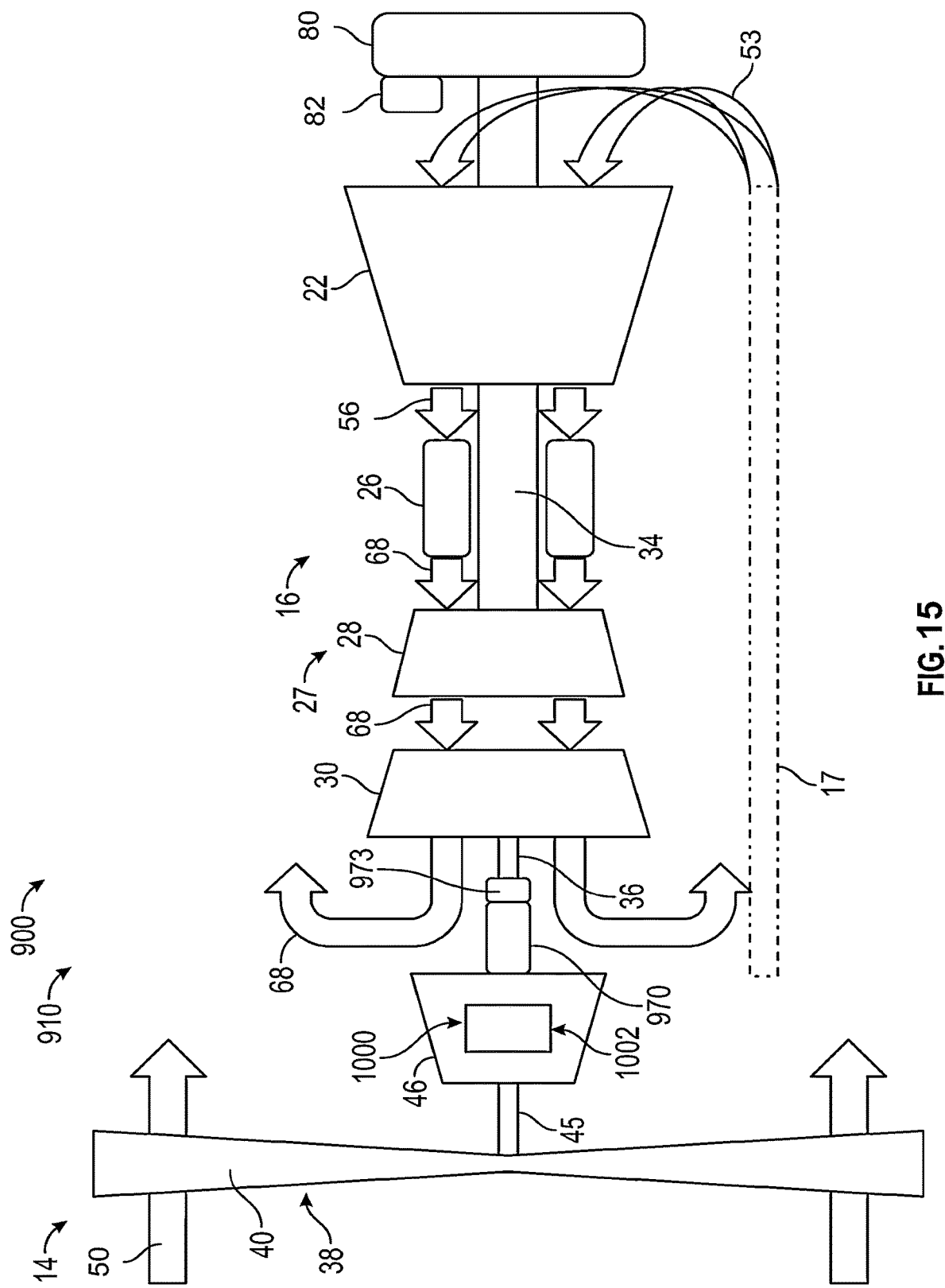
FIG. 15 is a schematic view of a propulsion system, according to another embodiment.

FIG. 15 is a schematic view of a propulsion system 900, according to another embodiment. The propulsion system 900 includes a turbine engine 910 including a lubrication system 1000 having a gearbox lubrication system 1002. The turbine engine 910 includes an electric machine 970 drivingly coupled to the LP shaft 36. The electric machine 970 is positioned forward of the turbine section 27, and, particularly, is positioned forward of the LP turbine 30. In this way, the electric machine 970 is positioned axially between the gearbox assembly 46 and the turbine section 27. The turbine engine 910 also includes a clutch 973 that engages the electric machine 970 to the LP shaft 36 and disengages the electric machine 970 from the LP shaft 36. In particular, the clutch 973 engages the electric machine 970 to the LP shaft 36 when the electric machine 970 operates in an electric generator mode to generate electric power. The clutch 973 disengages the electric machine 970 from the LP shaft 36 when the electric machine 970 operates in an electric motor mode to supply the electric power to the propulsor 38 (e.g., through the gearbox assembly 46).

Figure 16:
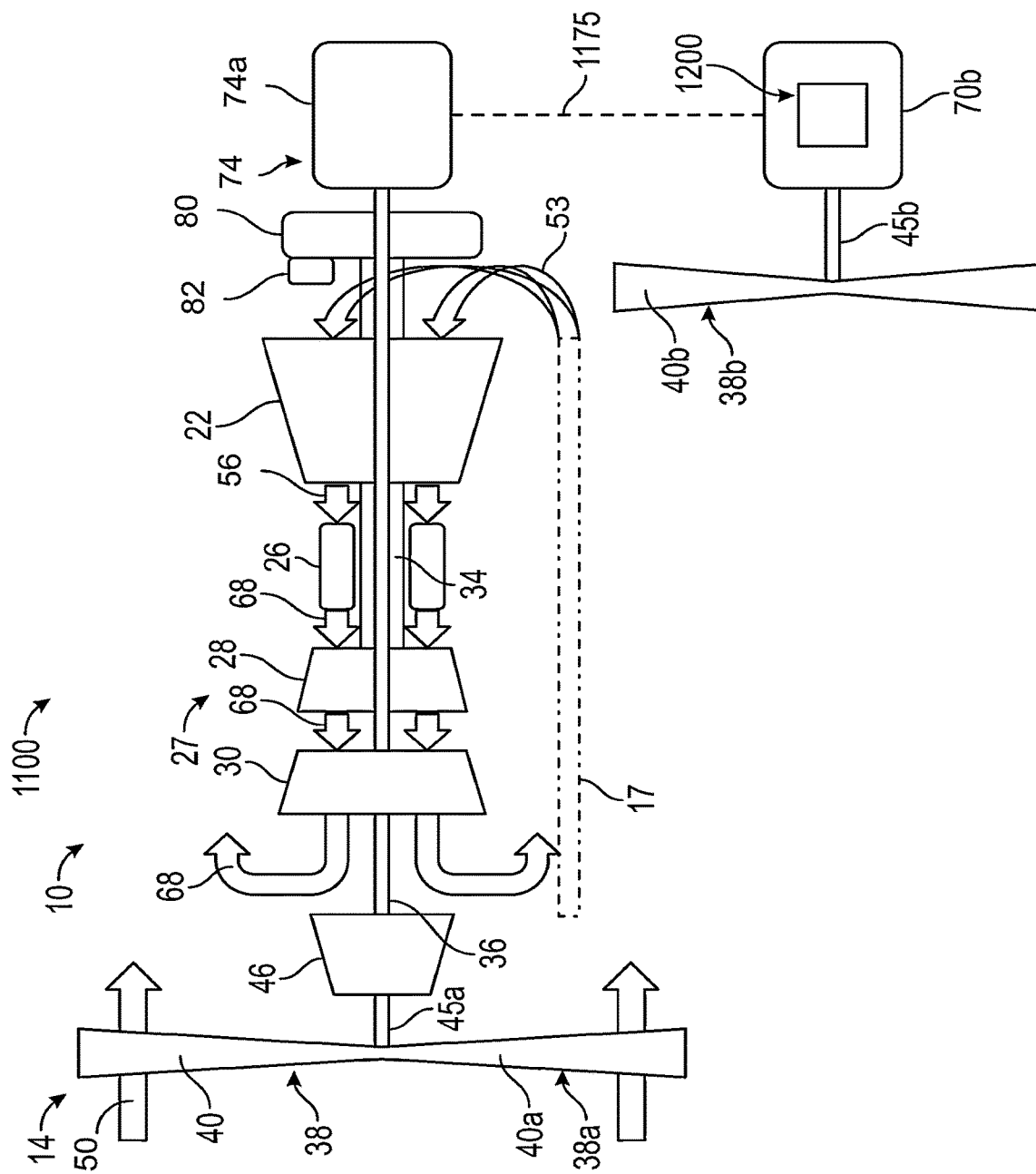
FIG. 16 is a schematic view of a propulsion system, according to another embodiment.

FIG. 16 is a schematic view of a propulsion system 1100, according to another embodiment. The propulsion system 1100 includes the turbine engine 10, the first propulsor 38a, and the second propulsor 38b. The propulsion system 1100 includes an electric machine lubrication system 1200 for the second electric machine 74b. The electric machine lubrication system 1200 is entirely contained within the second electric machine 74b, as detailed further below. In some embodiments, the propulsion system 1100 includes a fluid conduit 1175 that fluidly couples the second electric machine 74b with the first electric machine 74a. In such embodiments, the electric machine lubrication system 1200 supplies the lubricant from the second electric machine 74b to the first electric machine 74a via the fluid conduit 1175. In some embodiments, the second electric machine 74b receives the lubricant from the first electric machine 74a. In some embodiments, the first electric machine 74a includes the electric machine lubrication system 1200.

Figure 17:
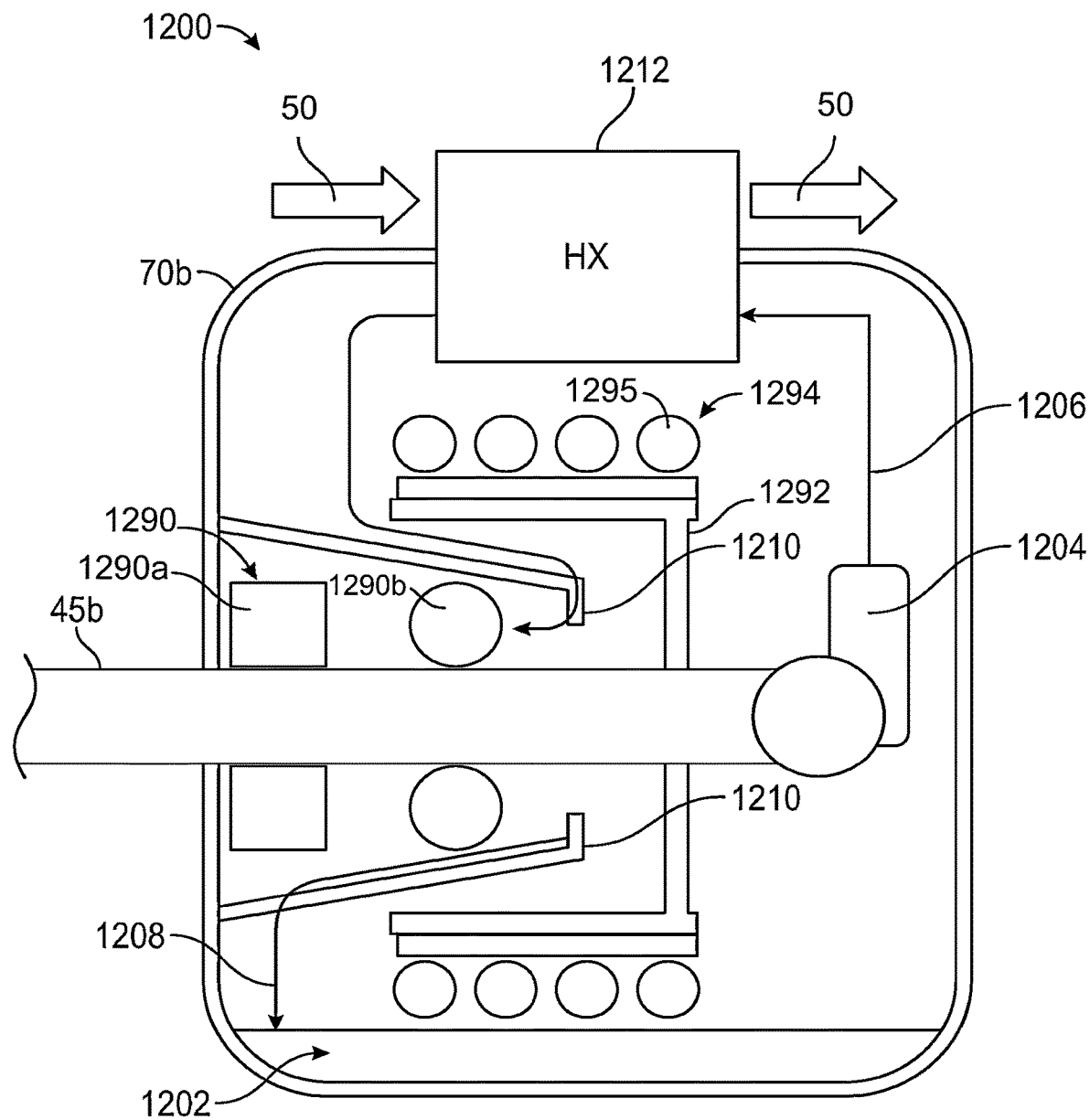
FIG. 17 is an enlarged schematic internal view of an electric machine having an electric machine lubrication system, according to the present disclosure.

FIG. 17 is an enlarged schematic internal view of the second electric machine 74b having the electric machine lubrication system 1200, according to the present disclosure. As shown in FIG. 17, the second electric machine 74b includes one or more electric machine bearings 1290 that support rotation of the second propulsor shaft 45b. The one or more electric machine bearings 1290 include one or more first electric machine bearings 1290a and one or more second electric machine bearings 1290b. The second electric machine 74b includes a rotor 1292 and a stator 1294. The rotor 1292 is coupled to the second propulsor shaft 45b and rotates with rotation of the second propulsor shaft 45b. In this way, the rotor 1292 rotates with respect to the stator 1294, generating electrical power. The stator 1294 includes one or more electrical coils 1295. When the second electric machine 74b operates as an electric generator, the second electric machine 74b generates electric power due to a movement of the rotor 1292 relative to the stator 1294 (e.g., the electric coils 1295) in a first direction. When the second electric machine 74b operates as a motor, the second electric machine 74b applies a torque on the second propulsor shaft 45b due to the movement of the rotor 1292 relative to the stator 1294 in a second direction that is opposite the first direction.

The electric machine lubrication system 1200 includes a lubricant reservoir 1202, an electric machine pump 1204, a lubricant supply line 1206, a lubricant return line 1208, one or more lubricant injectors 1210, and a heat exchanger 1212. The lubricant reservoir 1202 stores the lubricant therein. In some embodiments, the lubricant reservoir 1202 is a sump within the second electric machine 74b. The electric machine pump 1204 is drivingly coupled to the second propulsor shaft 45b. The lubricant supply line 1206 is in fluid communication with the electric machine pump 1204 and the one or more lubricant injectors 1210. The heat exchanger 1212 is in fluid communication with the lubricant supply line 1206 for cooling the lubricant in the lubricant supply line 1206. The lubricant return line 1208 is in fluid communication with the one or more electric machine bearings 1290 and the lubricant reservoir 1202 for returning the lubricant from the electric machine bearings 1290 to the lubricant reservoir 1202.

In operation, the electric machine pump 1204 pumps the lubricant from the lubricant reservoir 1202 to the one or more electric machine bearings 1290 through the lubricant supply line 1206. In particular, the one or more lubricant injectors 1210 inject the lubricant from the lubricant supply line 1206 to the one or more electric machine bearings 1290. The heat exchanger 1212 cools the lubricant in the lubricant supply line 1206 as the lubricant flows through the heat exchanger 1212. In particular, the volume of air 50 (e.g., cold air) flows through the heat exchanger and heat from the lubricant in the heat exchanger 1212 is transferred to the volume of air 50 as the lubricant flows through the heat exchanger 1212. The lubricant then drains through the lubricant return line 1208 into the lubricant reservoir 1202 such that the electric machine lubrication system 1200 recirculates the lubricant through the electric machine lubrication system 1200.

Figure 18:
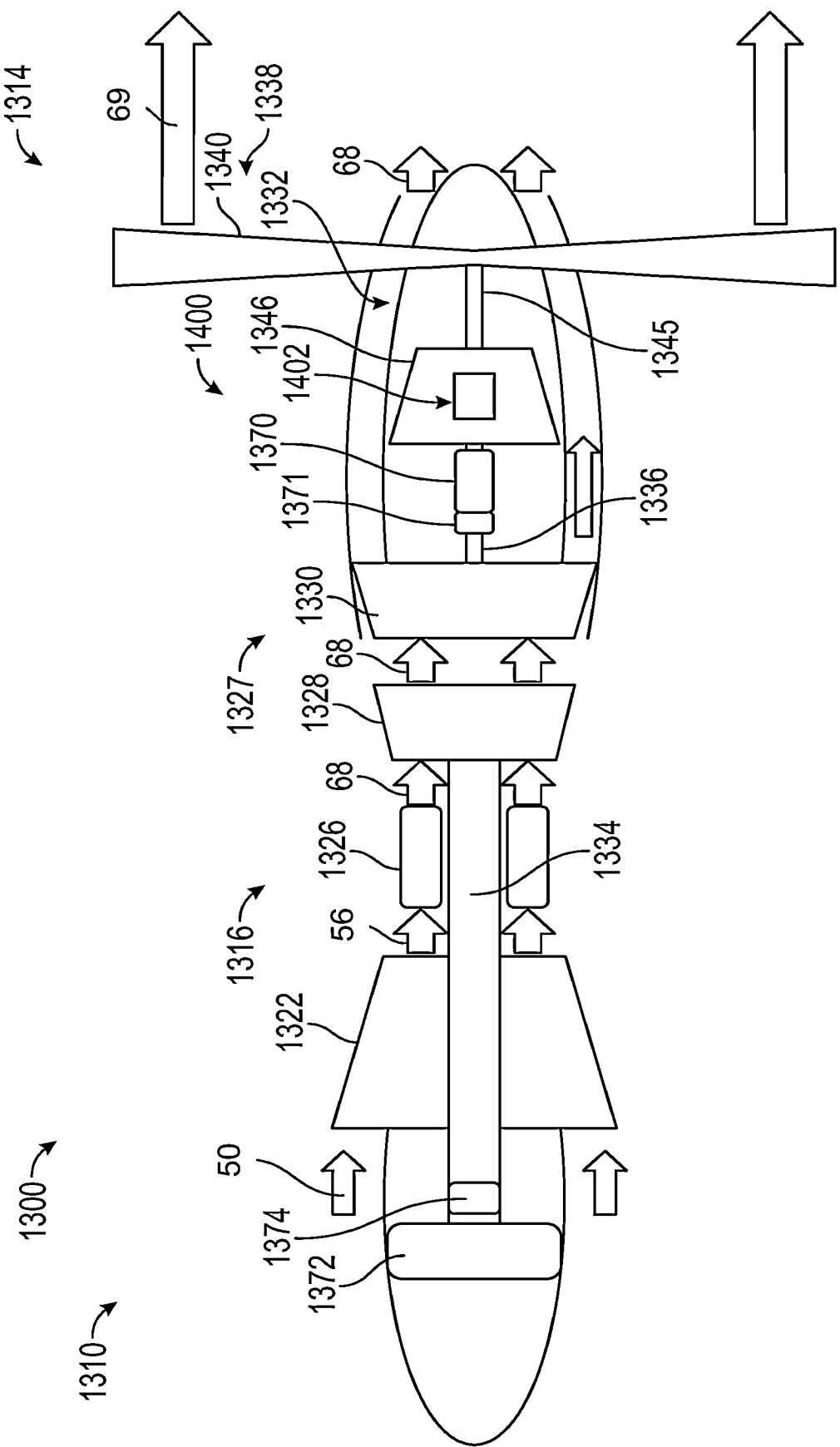
FIG. 18 is a schematic view of a propulsion system, according to another embodiment.

FIG. 18 is a schematic view of a propulsion system 1300, according to another embodiment. The propulsion system 1300 is substantially similar to the propulsion system 1200 of FIG. 12. The same or similar reference numerals will be used for components of the propulsion system 1300 that are the same as or similar to the components of the propulsion system 500 discussed above, unless stated otherwise. The description of these components above also applies to this embodiment, and a detailed description of these components is omitted here.

The propulsion system 1300 includes a turbine engine 1310. The turbine engine 1310 is a turboprop engine in a pusher configuration. The turbine engine 1310 includes a propulsor section 1314, a turbo-engine 1316, and an exhaust section 1332. The turbo-engine 1316 includes a compressor 1322, a combustor 1326, and a turbine section 1327 having an HP turbine 1328 and an LP turbine 1330. The turbine engine 1310 also includes an HP shaft 1334 and an LP shaft 1336. The propulsor section 1314 is arranged aft of the turbo-engine 1316 in the pusher configuration. The propulsor section 1314 includes a propulsor 1338 having a plurality of propulsor blades 1340 coupled to a propulsor shaft 1345. The propulsor shaft 1345 is drivingly coupled to the LP shaft 1336 through a gearbox assembly 1346. The turbine engine 1310 includes a lubrication system 1400. The gearbox assembly 1346 includes a gearbox lubrication system 1402.

The turbine engine 1310 also includes an electric machine 1370 that is drivingly coupled to the LP shaft 1336 through a clutch 1371. The turbine engine 1310 further includes an accessory gearbox 1372 and a starter motor 1374. The turbine engine 1310 operates substantially similar to the turbine engine 10. The combustion gases 68 flow through the exhaust section 1332 under the propulsor 1338, while bypass gas 69 is directed outside the engine.

Figure 19:
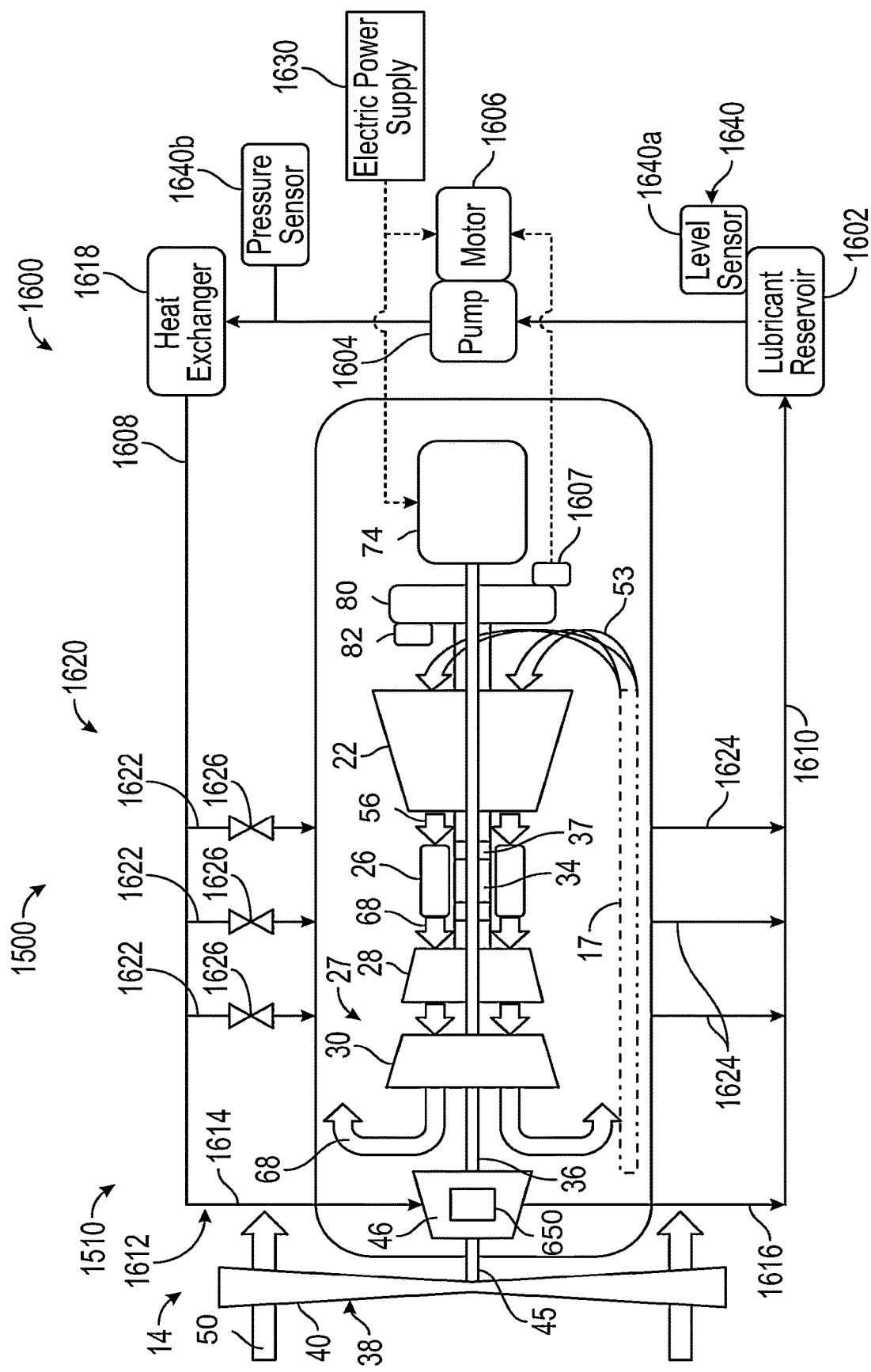
FIG. 19 is a schematic view of a propulsion system, according to another embodiment.

FIG. 19 is a schematic view of a propulsion system 1500, according to another embodiment. The propulsion system 1500 includes a turbine engine 1510 and a lubrication system 1600 for the turbine engine 1510. The lubrication system 1600 includes a lubricant reservoir 1602, a pump 1604 powered by a motor 1606, a lubricant supply line 1608, and a lubricant return line 1610. The lubricant reservoir 1602 includes at least one of a sump or a tank, and stores the lubricant therein. The lubricant supply line 1608 is in fluid communication with the lubricant reservoir 1602, the gearbox assembly 46, and the one or more engine bearings 37 for supplying the lubricant from the lubricant reservoir 1602 to at least one of the gearbox assembly 46 or the one or more engine bearings 37. The pump 1604 is in fluid communication with the lubricant reservoir 1602 and the lubricant supply line 1608 to pump. The lubrication system 1600 also includes a heat exchanger 1618 in fluid communication with the lubricant supply line 1608. The heat exchanger 1618 cools the lubricant as the lubricant flows through the lubricant supply line 1608 before being supplied to the gearbox assembly 46 or the turbine engine 10.

The lubrication system 1600 includes a gearbox lubrication system 1612 and an engine lubrication system 1620. The gearbox lubrication system 1612 includes a gearbox lubricant supply line 1614 and a gearbox lubricant return line 1616. The engine lubrication system 1620 includes one or more engine lubricant supply lines 1622 and one or more engine lubricant return lines 1624. The one or more engine lubricant supply lines 1622 each includes a valve 1626 that open to allow the lubricant to flow through the engine lubricant supply lines 1622 and close to prevent the lubricant from flowing through the engine lubricant supply lines 1622.

The pump 1604 is in fluid communication with the lubricant supply line 1608 to pump the lubricant from the lubricant reservoir 1602 to the at least one of the gearbox assembly 46 or the engine bearings 37 through the lubricant supply line 1608. The pump 1604 is drivingly coupled to the motor 1606. The motor 1606 is an electric motor that converts electric power into mechanical power through a motor shaft for powering the pump 1604. In some embodiments, the motor 1606 is drivingly coupled to accessory gearbox assembly 80 (e.g., through a motor gear assembly 1607) for generating electric power. In some embodiments, the motor 1606 receives electric power from an electric power supply 1630. The electric power supply 1630 includes at least one of the aircraft (e.g., batteries, APU, fuel cell, etc.) or a second turbine engine (e.g., the second turbine engine 10b of FIG. 11). Thus, the motor 1606 receives electric power from at least one of the turbine engine 1510 (e.g., through the accessory gearbox assembly 80), the aircraft, or the second turbine engine 10b. In this way, the lubrication system 1600 is an electrically-driven lubrication system. The lubrication system 1600 also includes one or more lubricant sensors 1640 including a lubricant level sensor 1640a and a lubricant pressure sensor 1640b. The lubricant sensors 1640 can also include a lubricant temperature sensor for sensing a temperature of the lubricant, and a lubricant flow sensor for sensing a flow rate of the lubricant.

In operation, the lubrication system 1600 supplies the lubricant to the gearbox assembly 46 to lubricate the gear assembly 650. In particular, the pump 1604 pumps the lubricant from the lubricant reservoir 1602 to the gearbox assembly 46 through the lubricant supply line 1608 and through the gearbox lubricant supply line 1614. The heat exchanger 1618 cools the lubricant in the lubricant supply line 1608 as the lubricant flows through the lubricant supply line 1608 and to the gearbox assembly 46. After lubricating the gear assembly 650, the lubricant drains into the lubricant reservoir 1602 (e.g., the sump) through the lubricant return line 1610 and the gearbox lubricant return line 1616. The lubricant is then re-circulated through the lubrication system 1600. As discussed above, the pump 1604 is electrically driven by the motor 1606. In this way, the lubrication system 1600 can operate to lubricate the gear assembly 650 even if the turbo-engine 16 shuts down or is operating in the standby operating mode and the propulsor 38 is electrically driven (e.g., by the electric machine 74 or by the second electric machine 74b of FIG. 11).

The lubrication system 1600 can also supply the lubricant to the engine bearings 37 through the engine lubricant supply lines 1622. In particular, the lubrication system 1600 supplies the lubricant to the engine bearings 37 when the turbine engine 1510 is shut down or in the standby operating mode. The valve 1626 of each engine lubricant supply line 1622 opens to allow the lubricant to flow to the engine bearings 37 through the engine lubricant supply lines 1622. After lubricating the engine bearings 37, the engine lubricant return line 1624 directs the lubricant to the lubricant reservoir 1602 through the lubricant return line 1610. In this way, the lubrication system 1600 recirculates the lubricant through the lubrication system 1600. The valve 1626 of each engine lubricant supply line 1622 opens and closes based on a pressure of the lubricant in the engine lubrication system 1620. In some embodiments, a controller (the controller 202 of FIG. 9) controls the valve 1626 to open and to close the valve 1626.

Figure 20:
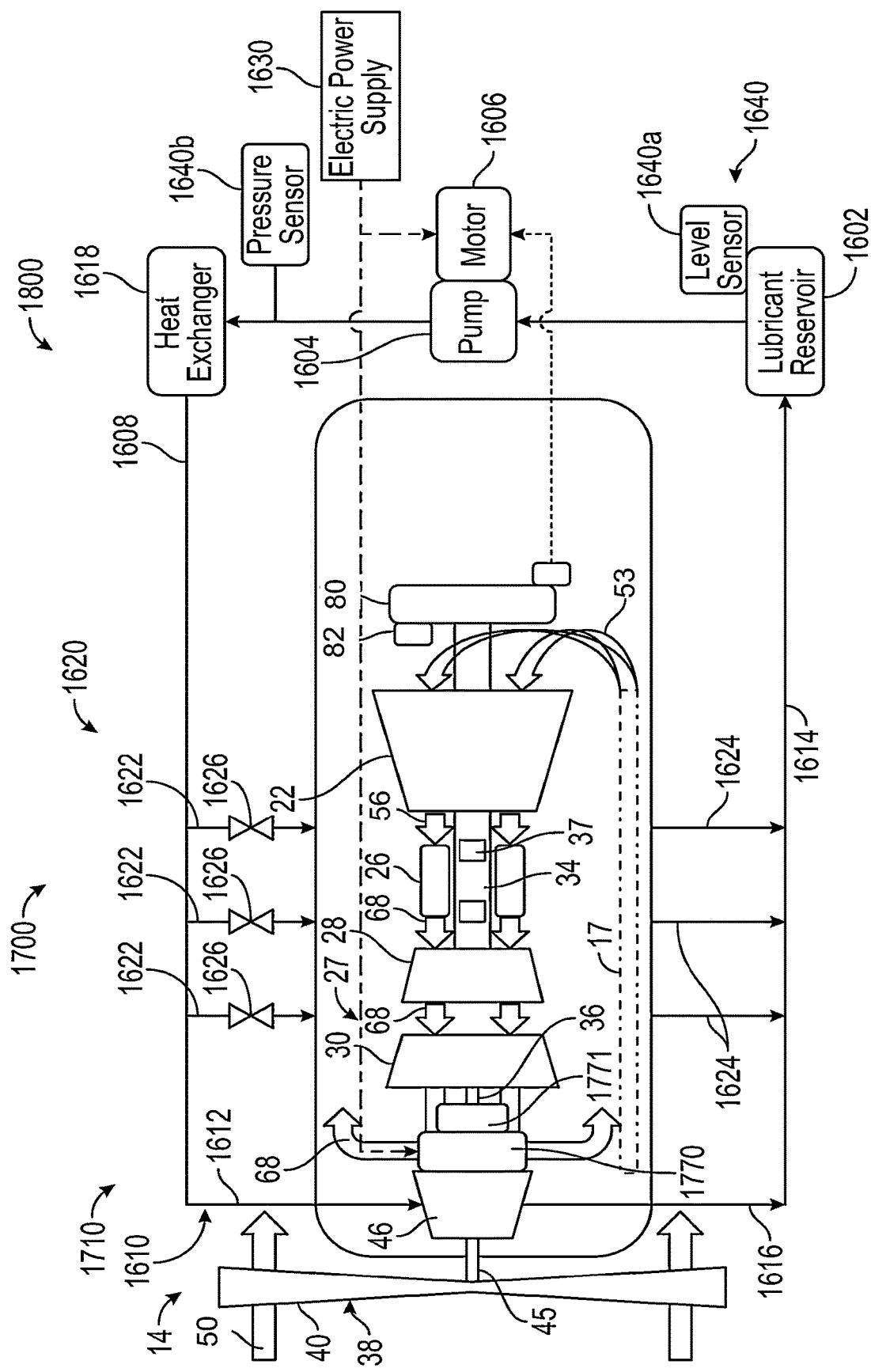
FIG. 20 is a schematic view of a propulsion system, according to another embodiment.

FIG. 20 is a schematic view of a propulsion system 1700, according to another embodiment. The propulsion system 1700 is substantially similar to the propulsion system 1500 of FIG. 19. The same or similar reference numerals will be used for components of the propulsion system 1700 that are the same as or similar to the components of the propulsion system 1500 discussed above, unless stated otherwise. The description of these components above also applies to this embodiment, and a detailed description of these components is omitted here.

The propulsion system 1700 includes a turbine engine 1710 that is substantially similar to the turbine engine 10 (FIG. 1). The turbine engine 1710 includes an electric machine 1770 that is drivingly coupled to the LP shaft 36 via a clutch 1771. The electric machine 1770 is positioned forward of the turbo-engine 16, and is between the gearbox assembly 46 and the turbine section 27 (e.g., the LP turbine 30). The propulsion system 1700 also includes a lubrication system 1800 that is substantially similar to the lubrication system 1600 of FIG. 19.

Figure 21:
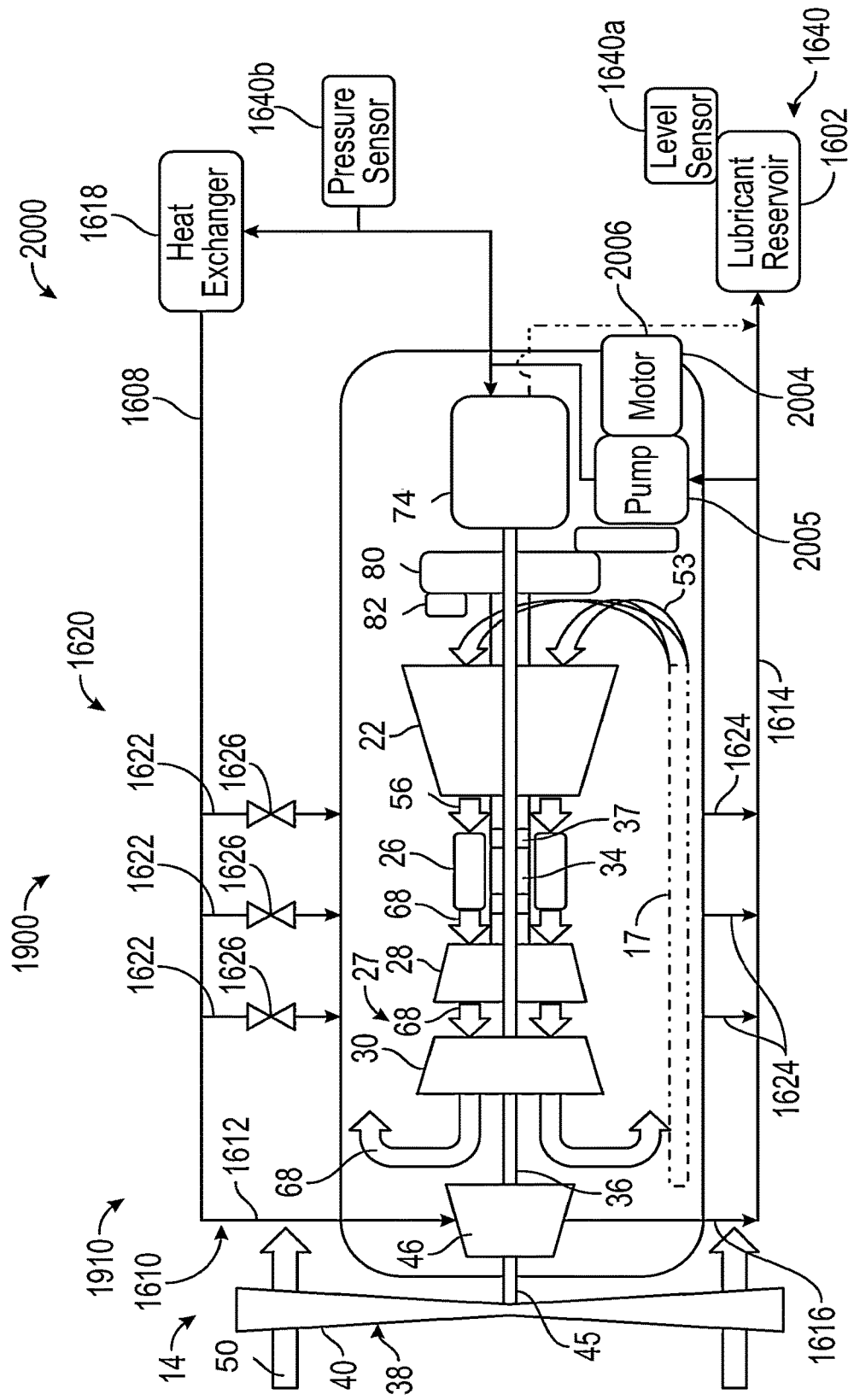
FIG. 21 is a schematic view of a propulsion system, according to another embodiment.

FIG. 21 is a schematic view of a propulsion system 1900, according to another embodiment. The propulsion system 1900 is substantially similar to the propulsion system 1500 of FIG. 19. The same or similar reference numerals will be used for components of the propulsion system 1900 that are the same as or similar to the components of the propulsion system 1500 discussed above, unless stated otherwise. The description of these components above also applies to this embodiment, and a detailed description of these components is omitted here.

The propulsion system 1900 includes a turbine engine 1910 that is substantially similar to the turbine engine 10 (FIG. 1). The propulsion system 1900 also includes a lubrication system 2000 that is substantially similar to the lubrication system 1600 of FIG. 19. The lubrication system 2000 includes a pump 2004 that is coupled to the accessory gearbox assembly 80 through a clutch 2005. The pump 2004 is powered by a motor 2006. The pump 2004 and the motor 2006 are disposed within the outer casing 18 (FIG. 1) of the turbine engine 1910. The clutch 2005 engages the pump 2004 to the accessory gearbox assembly 80 when the turbo-engine 16 is operating to reduce the electrical demand from the motor 2006 in powering the pump 2004. In this way, the turbo-engine 16 powers the pump 2004 while the turbo-engine 16 is operating. The clutch 2005 disengages the pump 2004 from the accessory gearbox assembly 80 when the turbo-engine 16 is shut down. In this way, the motor 2006 powers the pump 2004 when the turbo-engine 16 is shut down, and the propulsor 38 is powered by the electric machine 74.

Figure 22:
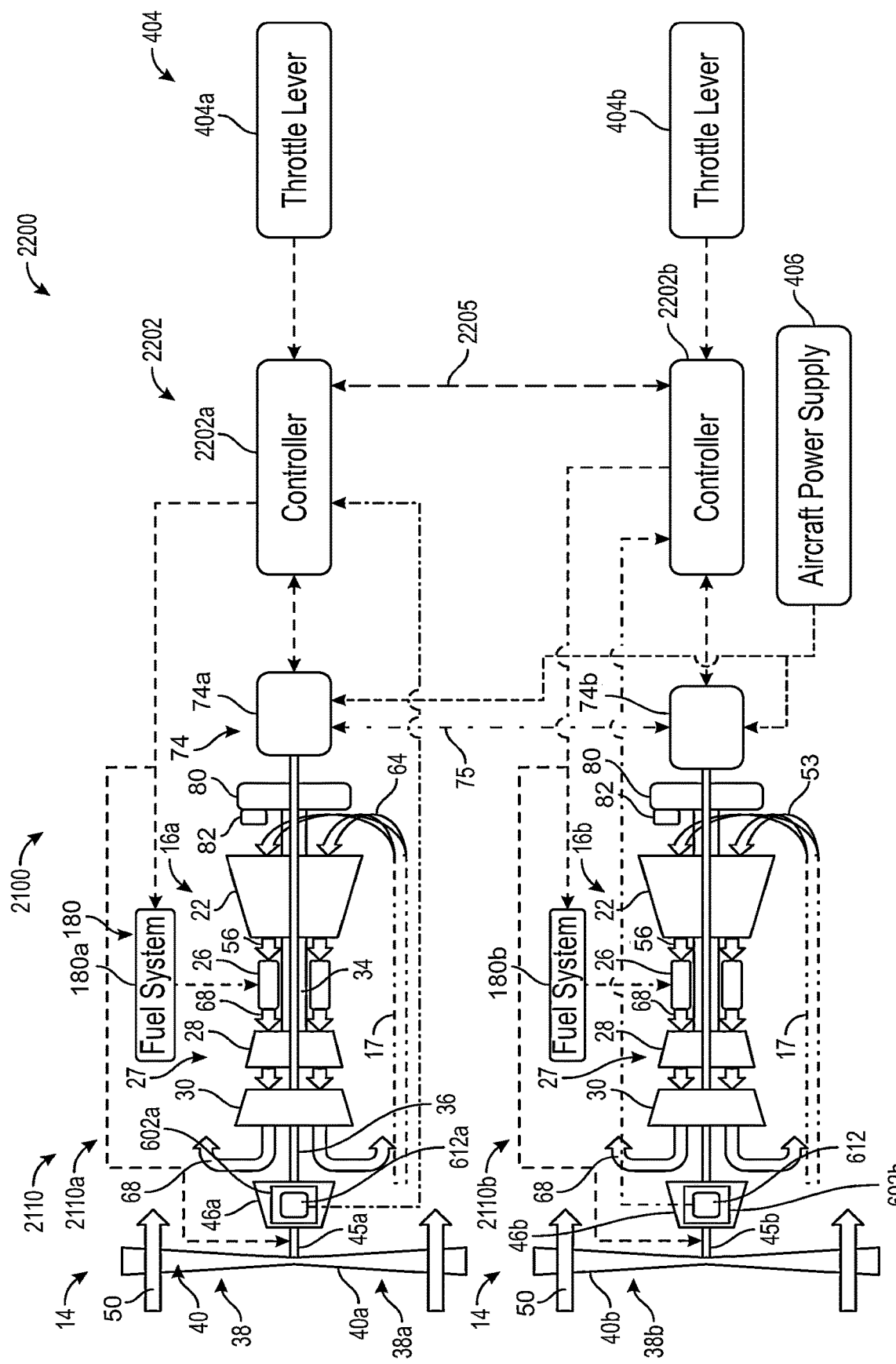
FIG. 22 is a schematic view of a propulsion system, according to another embodiment.

FIG. 22 is a schematic view of a propulsion system 2100, according to another embodiment. The propulsion system 2100 is substantially similar to the propulsion system 300 of FIG. 11. The same or similar reference numerals will be used for components of the propulsion system 2100 that are the same as or similar to the components of the propulsion system 300 discussed above, unless stated otherwise. The description of these components above also applies to this embodiment, and a detailed description of these components is omitted here.

The propulsion system 2100 includes a plurality of turbine engines 2110 including a first turbine engine 2110a and a second turbine engine 2110b. The first turbine engine 2110a includes a first gearbox assembly 46a including first gearbox lubrication system 602a having one or more lubricant sensors 612. The second turbine engine 2110b includes a second gearbox assembly 46b including second gearbox lubrication system 602b having one or more lubricant sensors 612.

The propulsion system 2100 includes a turbine engine control system 2200 that is substantially similar to the turbine engine control system 400 of FIG. 11. The turbine engine control system 2200 includes one or more controllers 2202 and includes a first controller 2202a for the first turbine engine 2110a and a second controller 2202b for the second turbine engine 2110b. The first controller 2202a is in communication with the second controller 2202b via a data communication bus 2205.

The first controller 2202a is in communication with the lubricant sensors 612 of the first gearbox lubrication system 602a. In particular, the first controller 2202a is a dual channel controller and the lubricant sensors 612 of the first gearbox lubrication system 602a include two communication outputs. Each communication output of the lubricant sensors 612 of the first gearbox lubrication system 602a is in communication with a respective channel of the first controller 2202a. In this way, the lubricant sensors 612 are dual redundant sensors (e.g., sensors having two channels to the first controller 2202a).

Similarly, the second controller 2202b is in communication with the lubricant sensors 612 of the second gearbox lubrication system 602b. In particular, the second controller 2202b is a dual channel controller and the lubricant sensors 612 of the second gearbox lubrication system 602b include two communication outputs. Each communication output of the lubricant sensors 612 of the second gearbox lubrication system 602b is in communication with a respective channel of the second controller 2202b. In this way, the lubricant sensors 612 are dual redundant sensors (e.g., sensors having two channels to the second controller 2202b). Each lubricant sensor 612 includes discrete outputs that are electrically isolated from each other such that no single failure can occur in a loss of thrust control.

Figure 23:
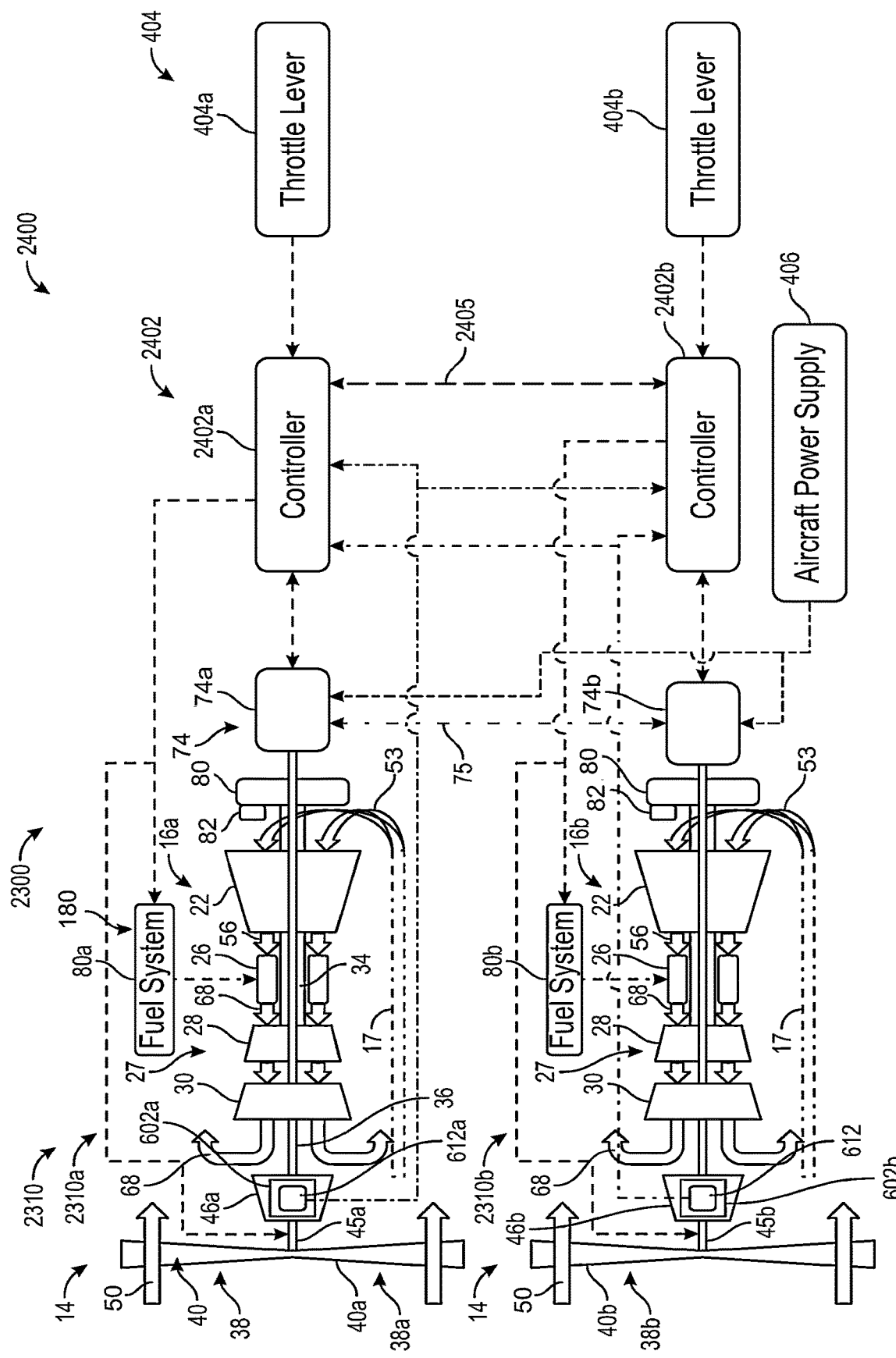
FIG. 23 is a schematic view of a propulsion system, according to another embodiment.

FIG. 23 is a schematic view of a propulsion system 2300, according to another embodiment. The propulsion system 2300 is substantially similar to the propulsion system 2100 of FIG. 22. The same or similar reference numerals will be used for components of the propulsion system 2300 that are the same as or similar to the components of the propulsion system 2100 discussed above, unless stated otherwise. The description of these components above also applies to this embodiment, and a detailed description of these components is omitted here.

The propulsion system 2300 includes a plurality of turbine engines 2310 including a first turbine engine 2310a and a second turbine engine 2310b. The first turbine engine 2310a includes a first gearbox assembly 46a including first gearbox lubrication system 602a having one or more lubricant sensors 612. The second turbine engine 2310b includes a second gearbox assembly 46b including second gearbox lubrication system 602b having one or more lubricant sensors 612.

The propulsion system 2300 includes a turbine engine control system 2400 that is substantially similar to the turbine engine control system 2200 of FIG. 22. The turbine engine control system 2400 includes one or more controllers 2402 and includes a first controller 2402a for the first turbine engine 2310a and a second controller 2402b for the second turbine engine 2310b. The first controller 2402a is in communication with the second controller 2402b via a data communication bus 2405.

The first controller 2402a and the second controller 2402b are each dual channel controllers. The lubricant sensors 612 are quad redundant sensors (e.g., sensors having four channels) with individual outputs to the first controller 2402a and the second controller 2402b. In particular, the lubricant sensors 612 of the first gearbox lubrication system 602a are in communication with the first controller 2402a and the second controller 2402b. The lubricant sensors 612 of the second gearbox lubrication system 602b are in communication with the second controller 2402b and the first controller 2402a. Each lubricant sensor 612 includes discrete outputs that are electrically isolated from each other such that no single failure can occur in a loss of thrust control. In this way, the lubricant sensors 612 of the first gearbox lubrication system 602a include two channels to the first controller 2402a and two channels to the second controller 2402b. Similarly, the lubricant sensors 612 of the second gearbox lubrication system 602b include two channels to the second controller 2402b and two channels to the first controller 2402a. Accordingly, each lubricant sensor 612 is a quad redundant sensor having four channels.

Figure 24:
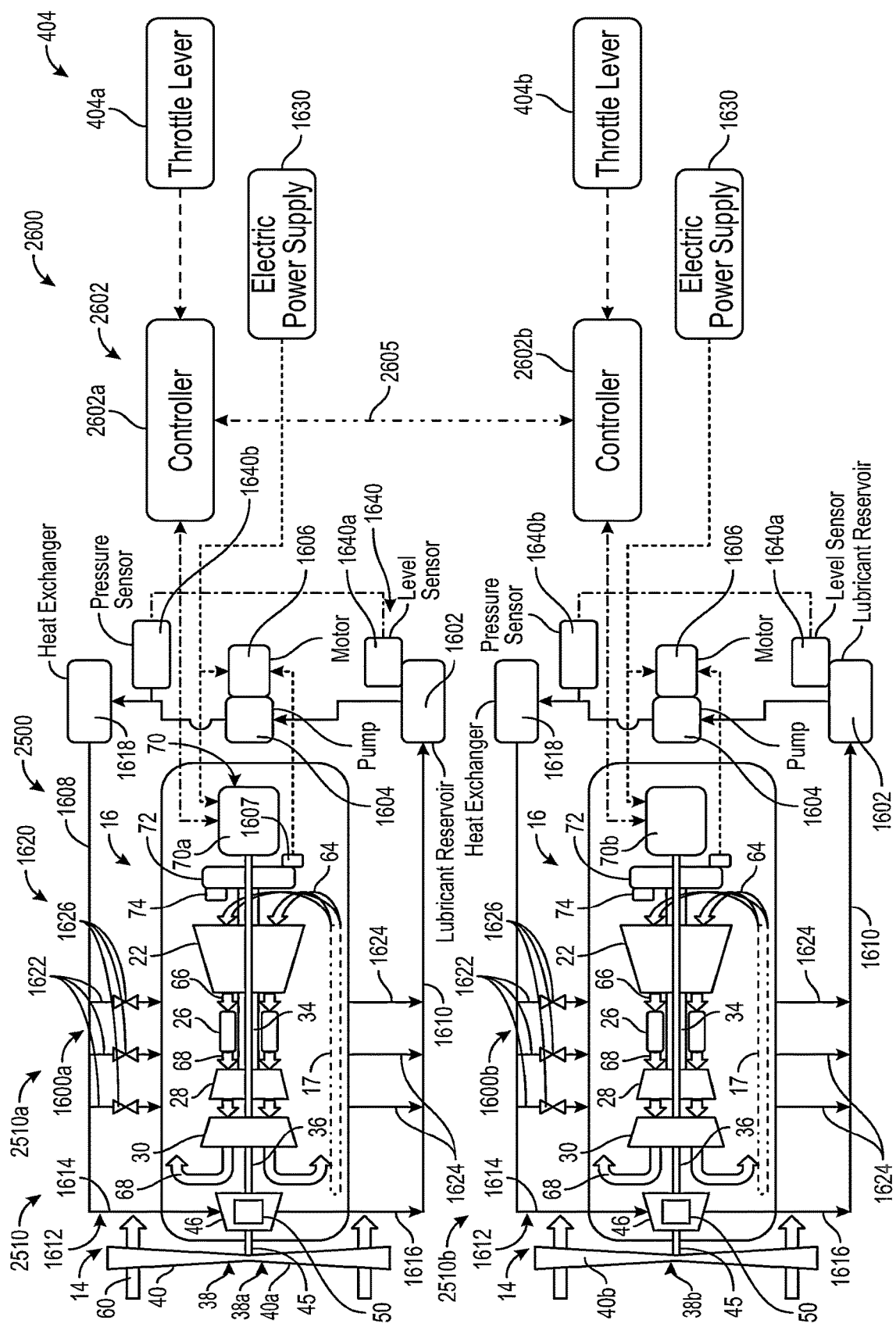
FIG. 24 is a schematic view of a propulsion system, according to another embodiment.

FIG. 24 is a schematic view of a propulsion system 2500, according to another embodiment. The propulsion system 2500 is substantially similar to the propulsion system 1500 of FIG. 19. The same or similar reference numerals will be used for components of the propulsion system 2500 that are the same as or similar to the components of the propulsion system 1500 discussed above, unless stated otherwise. The description of these components above also applies to this embodiment, and a detailed description of these components is omitted here.

The propulsion system 2500 includes a plurality of turbine engines 2510 including a first turbine engine 2510a and a second turbine engine 2510b. The first turbine engine 2510a includes a first lubrication system 1600a, and the second turbine engine 2510b includes a second lubrication system 1600b. The propulsion system 2500 also includes a turbine engine control system 2600 that is substantially similar to the turbine engine control system 2200 of FIG. 22. The turbine engine control system 2600 includes one or more controllers 2602 includes a first controller 2602a for the first turbine engine 2510a and a second controller 2602b for the second turbine engine 2510b. The first controller 2602a is in communication with the second controller 2602b via a data communication bus 2605.

The first controller 2602a and the second controller 2602b are each dual channel controllers. The lubricant sensors 1640 are dual redundant sensors (e.g., sensors having two channels) with individual outputs. In particular, the lubricant sensors 1640 of the first lubrication system 1600a are in communication with the first controller 2602a. The lubricant sensors 1640 of the second lubrication system 1600b are in communication with the second controller 2602b. Each lubricant sensor 1640 includes discrete outputs that are electrically isolated from each other such that no single failure can occur in a loss of thrust control. In this way, the lubricant sensors 1640 of the first lubrication system 1600a include two channels to the first controller 2602a. Similarly, the lubricant sensors 1640 of the second lubrication system 1600b include two channels to the second controller 2602b. Accordingly, each lubricant sensor 1640 is a dual redundant sensor having two channels.

Figure 25:
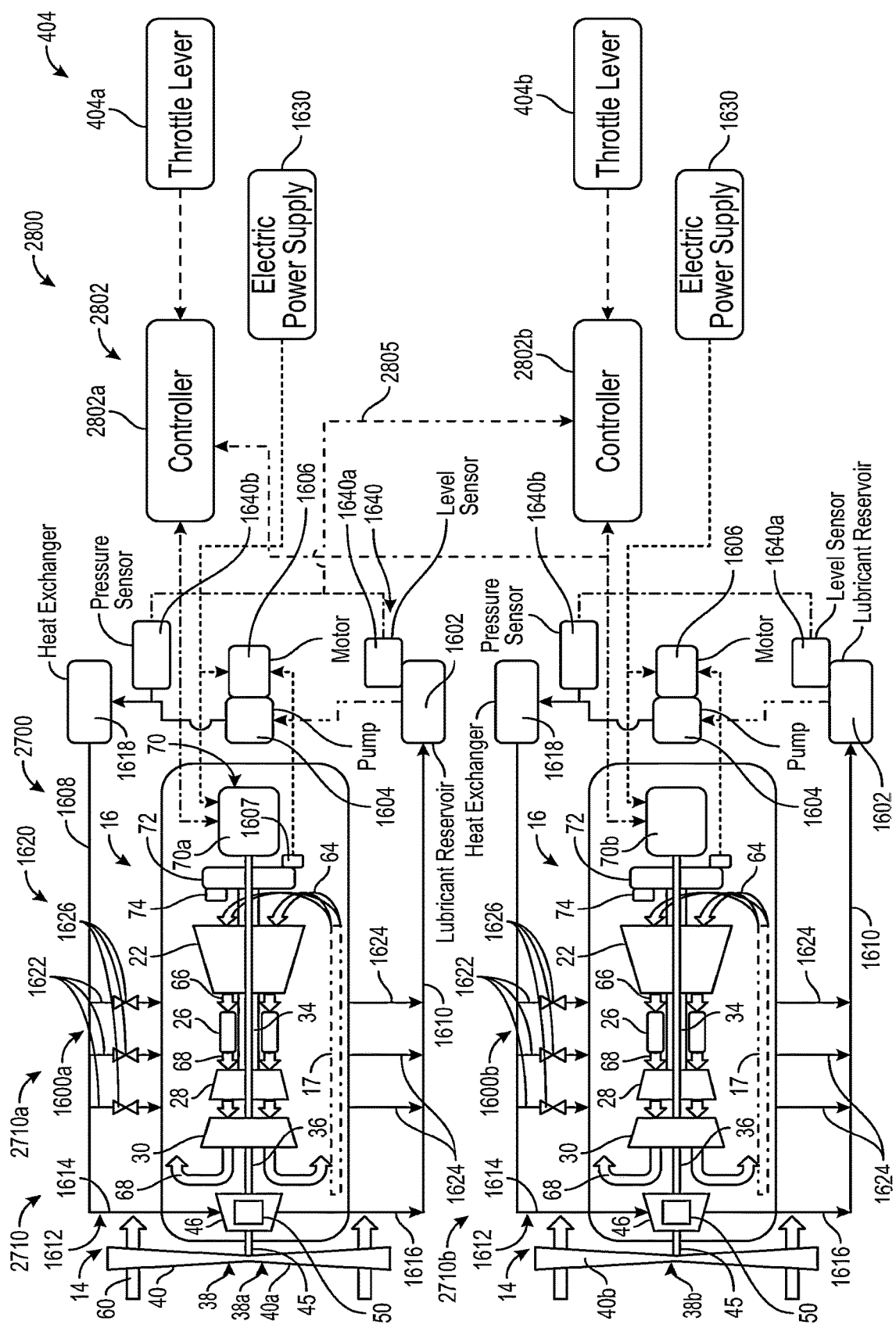
FIG. 25 is a schematic view of a propulsion system, according to another embodiment.

FIG. 25 is a schematic view of a propulsion system 2700, according to another embodiment. The propulsion system 2700 is substantially similar to the propulsion system 2500 of FIG. 24. The same or similar reference numerals will be used for components of the propulsion system 2700 that are the same as or similar to the components of the propulsion system 2500 discussed above, unless stated otherwise. The description of these components above also applies to this embodiment, and a detailed description of these components is omitted here The propulsion system 2700 includes a plurality of turbine engines 2710 including a first turbine engine 2710a and a second turbine engine 2710b. The first turbine engine 2710a includes a first lubrication system 1600a having one or more lubricant sensors 1640. The second turbine engine 2710b includes a second lubrication system 1600b having one or more lubricant sensors 1640.

The propulsion system 2700 includes a turbine engine control system 2800 that is substantially similar to the turbine engine control system 2400 of FIG. 23. The turbine engine control system 2800 includes one or more controllers 2802 and includes a first controller 2802a for the first turbine engine 2710a and a second controller 2802b for the second turbine engine 2710b. The first controller 2802a is in communication with the second controller 2802b via a data communication bus 2805.

The first controller 2802a and the second controller 2802b are each dual channel controllers. The lubricant sensors 1640 are quad redundant sensors (e.g., sensors having four channels) with individual outputs to the first controller 2802a and the second controller 2802b. In particular, the lubricant sensors 1640 of the first lubrication system 1600a are in communication with the first controller 2802a and the second controller 2802b. The lubricant sensors 1640 of the second lubrication system 1600b are in communication with the second controller 2802b and the first controller 2802a. Each lubricant sensor 1640 includes discrete outputs that are electrically isolated from each other such that no single failure can occur in a loss of thrust control. In this way, the lubricant sensors 1640 of the first lubrication system 1600a include two channels to the first controller 2802a and two channels to the second controller 2802b. Similarly, the lubricant sensors 1640 of the second lubrication system 1600b include two channels to the second controller 2802b and two channels to the first controller 2802a. Accordingly, each lubricant sensor 1640 is a quad redundant sensor having four channels.

Figure 26A:
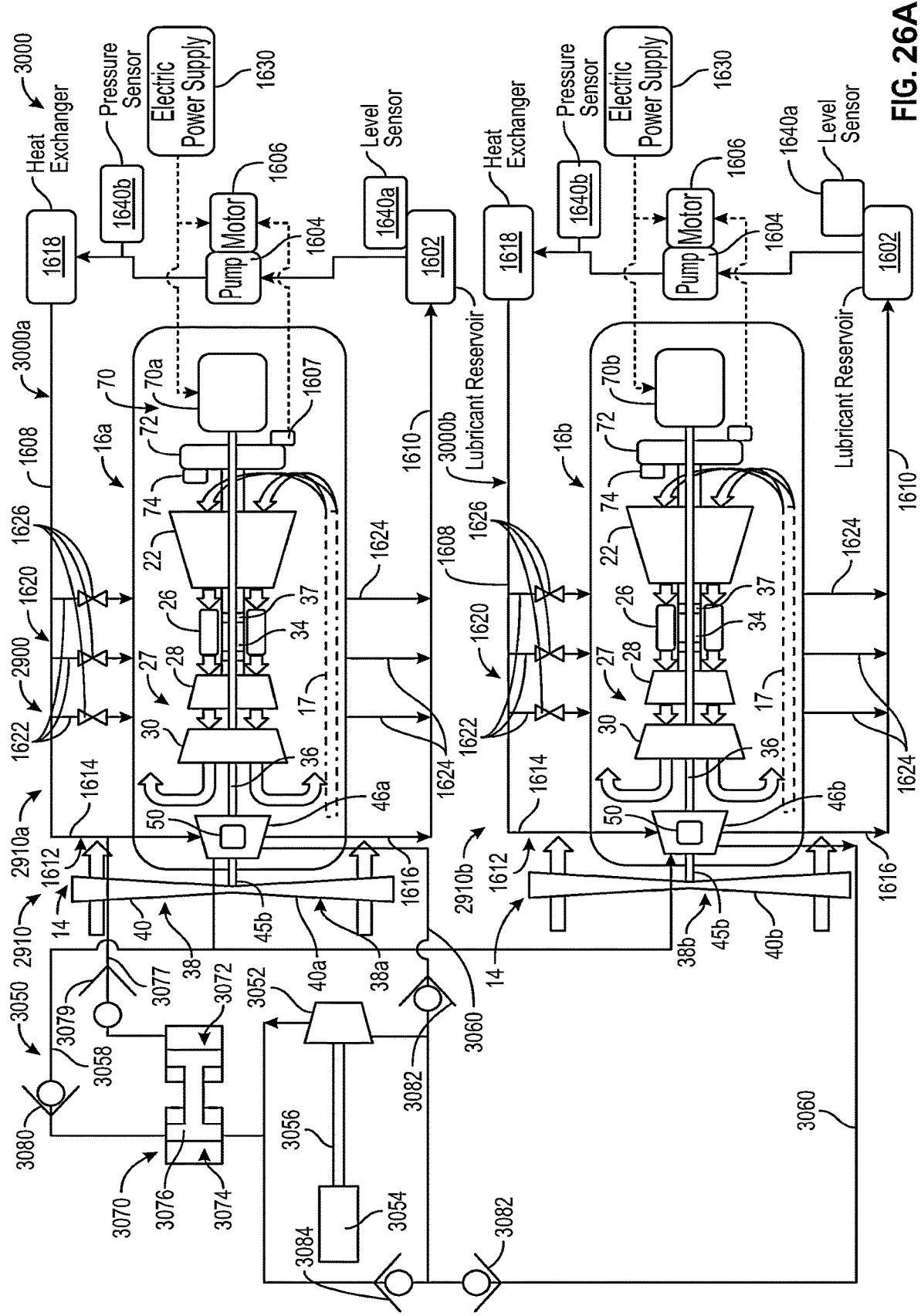
FIG. 26A is a schematic view of a propulsion system with a lubrication system in a normal operation mode, according to another embodiment.
Figure 26B:
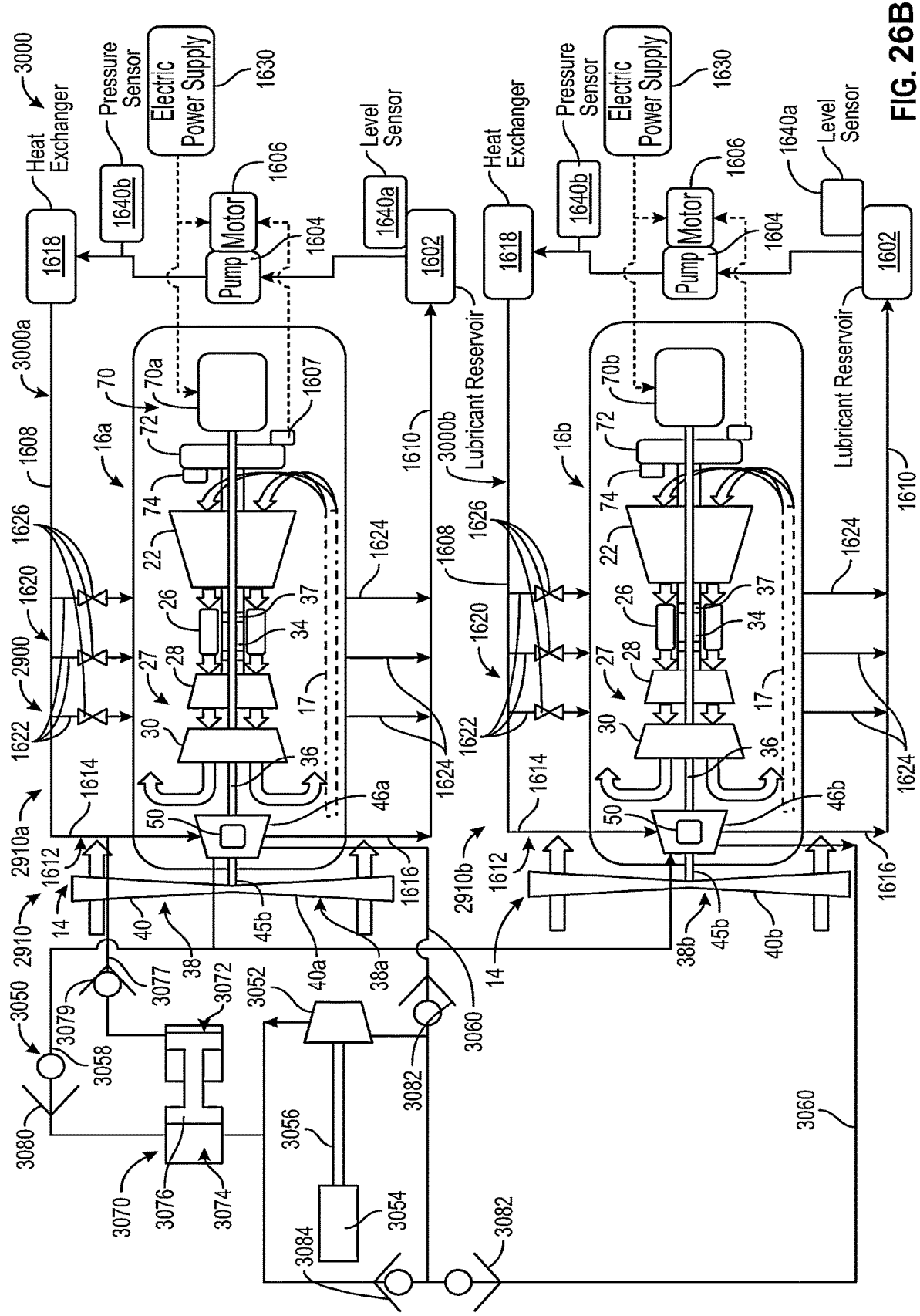
FIG. 26B is a schematic view of the propulsion system of FIG. 26A with the lubrication system in a failure operation mode, according to the present disclosure.

FIG. 26A is a schematic view of a propulsion system 2900 with a lubrication system 3000 in a normal operation mode, according to another embodiment. FIG. 26B is a schematic view of the propulsion system 2900 with the lubrication system 3000 in a failure operation mode, according to another embodiment. The propulsion system 2900 is substantially similar to the propulsion system 1500 of FIG. 19. The same or similar reference numerals will be used for components of the propulsion system 2900 that are the same as or similar to the components of the propulsion system 300 discussed above, unless stated otherwise. The description of these components above also applies to this embodiment, and a detailed description of these components is omitted here.

The propulsion system 2900 includes a plurality of turbine engines 2910 including a first turbine engine 2910a and a second turbine engine 2910b. The lubrication system 3000 includes a first lubrication system 3000a, a second lubrication system 3000b, and an auxiliary lubrication system 3050. The first lubrication system 3000a and the second lubrication system 3000b are substantially similar to the lubrication system 1600.

The auxiliary lubrication system 3050 includes an auxiliary pump 3052, an auxiliary motor 3054 that is drivingly coupled to the auxiliary pump 3052 by a pump shaft 3056, an auxiliary lubricant supply line 3058, and an auxiliary lubricant return line 3060. The auxiliary pump 3052 is in fluid communication with auxiliary lubricant supply line 3058 and the auxiliary lubricant return line 3060. The auxiliary lubricant supply line 3058 is in fluid communication with auxiliary pump 3052 and the first gearbox assembly 46a and the second gearbox assembly 46b for supplying the lubricant to the gear assembly 650 of the first gearbox assembly 46a and the second gearbox assembly 46b. The auxiliary lubricant return line 3060 is in fluid communication with the first gearbox assembly 46a and the second gearbox assembly 46b, and the auxiliary pump 3052 for returning the lubricant from the first gearbox assembly 46a and the second gearbox assembly 46b to the auxiliary pump 3052.

The auxiliary lubrication system 3050 includes an auxiliary lubricant valve 3070 in fluid communication with the auxiliary pump 3052 and the auxiliary lubricant supply line 3058. The auxiliary lubricant valve 3070 is a shuttle valve, but can include any type of valve for allowing the lubricant to flow, or preventing the lubricant from flowing, through the auxiliary lubricant supply line 3058 based on a pressure of the lubricant in the engine lubrication system 1620. The auxiliary lubricant valve 3070 includes a lubricant pressure flowpath 3072, an auxiliary lubricant flowpath 3074, and a valve element 3076. The lubricant pressure flowpath 3072 is in fluid communication with a lubricant pressure signal line 3077 of the engine lubrication system 1620 for sending a lubricant pressure signal to the auxiliary lubricant valve 3070. The auxiliary lubricant flowpath 3074 is in fluid communication with the auxiliary lubricant supply line 3058. The valve element 3076 is disposed within the lubricant pressure flowpath 3072 and the auxiliary lubricant flowpath 3074, and moves to allow or to block the lubricant in the lubricant pressure flowpath 3072 and the auxiliary lubricant flowpath 3074, as detailed further below.

The lubricant pressure signal line 3077 includes a lubricant pressure signal line check valve 3079 disposed therein. The auxiliary lubricant supply line 3058 includes a supply line check valve 3080 disposed therein. The auxiliary lubricant return line 3060 includes one or more return line check valves 3082 disposed therein. In particular, the auxiliary lubricant return line 3060 includes a return line check valve 3082 in fluid communication with the first lubrication system 3000a. The auxiliary lubricant return line 3060 includes a return line check valve 3082 in fluid communication with the second lubrication system 3000b. The lubrication system 3000 also includes a pump check valve 3084 in fluid communication with the auxiliary lubricant return line 3060 and the auxiliary pump 3052.

With reference to FIG. 26A, the lubrication system 3000 operates the same as the lubrication system 1600 of FIG. 19. During normal operation, the lubrication system 3000 supplies the lubricant to the gear assembly 650 or the engine bearings 37 of the first turbine engine 2910a and the second turbine engine 2910b. The lubricant pressure signal line 3077 communicates the pressure of the lubricant in the lubrication system 3000 to the auxiliary lubricant valve 3070. During the normal operation, the pressure of the lubricant in the lubrication system 3000 opens the lubricant pressure signal line check valve 3079 and forces the valve element 3076 to close the auxiliary lubricant flowpath 3074 to prevent the lubricant from flowing through the auxiliary lubrication system 3050 (e.g., through the auxiliary lubricant supply line 3058).

With reference to FIG. 26B, the auxiliary lubrication system 3050 supplies the lubricant to the lubrication system 3000 when the lubrication system 3000 fails or one of the plurality of turbine engines 2910 shuts down. In such instances, the pressure of the lubricant in the lubrication system 3000 reduces below a threshold such that the valve element 3076 overcomes the pressure in the lubricant pressure signal line 3077. In this way, the valve element 3076 moves to open the auxiliary lubricant flowpath 3074. The auxiliary motor 3054 powers the auxiliary pump 3052 to pump the lubricant through the auxiliary lubricant supply line 3058. Thus, the pressure of the lubricant in the auxiliary lubricant supply line 3058 opens the supply line check valve 3080 and the auxiliary lubrication system 3050 supplies the lubricant to at least one of the gear assembly 650 or the engine bearings 37 through the auxiliary lubricant supply line 3058. As the auxiliary pump 3052 continues to pump the lubricant, the lubricant drains from the at least one of the gear assembly 650 or the engine bearings 37 and flows through the auxiliary lubricant return line 3060. Thus, the pressure of the lubricant in the auxiliary lubricant return line 3060 opens the one or more return line check valves 3082 open to allow the lubricant to flow back to the inlet of the auxiliary pump 3052. The pressure of the lubricant from the auxiliary pump 3052 closes the pump check valve 3084 such that the lubricant flows through the auxiliary lubricant valve 3070 into the auxiliary lubricant supply line 3058 and the pump check valve 3084 prevents the lubricant from flowing from the auxiliary pump 3052 into the auxiliary lubricant return line 3060.

Figure 27:
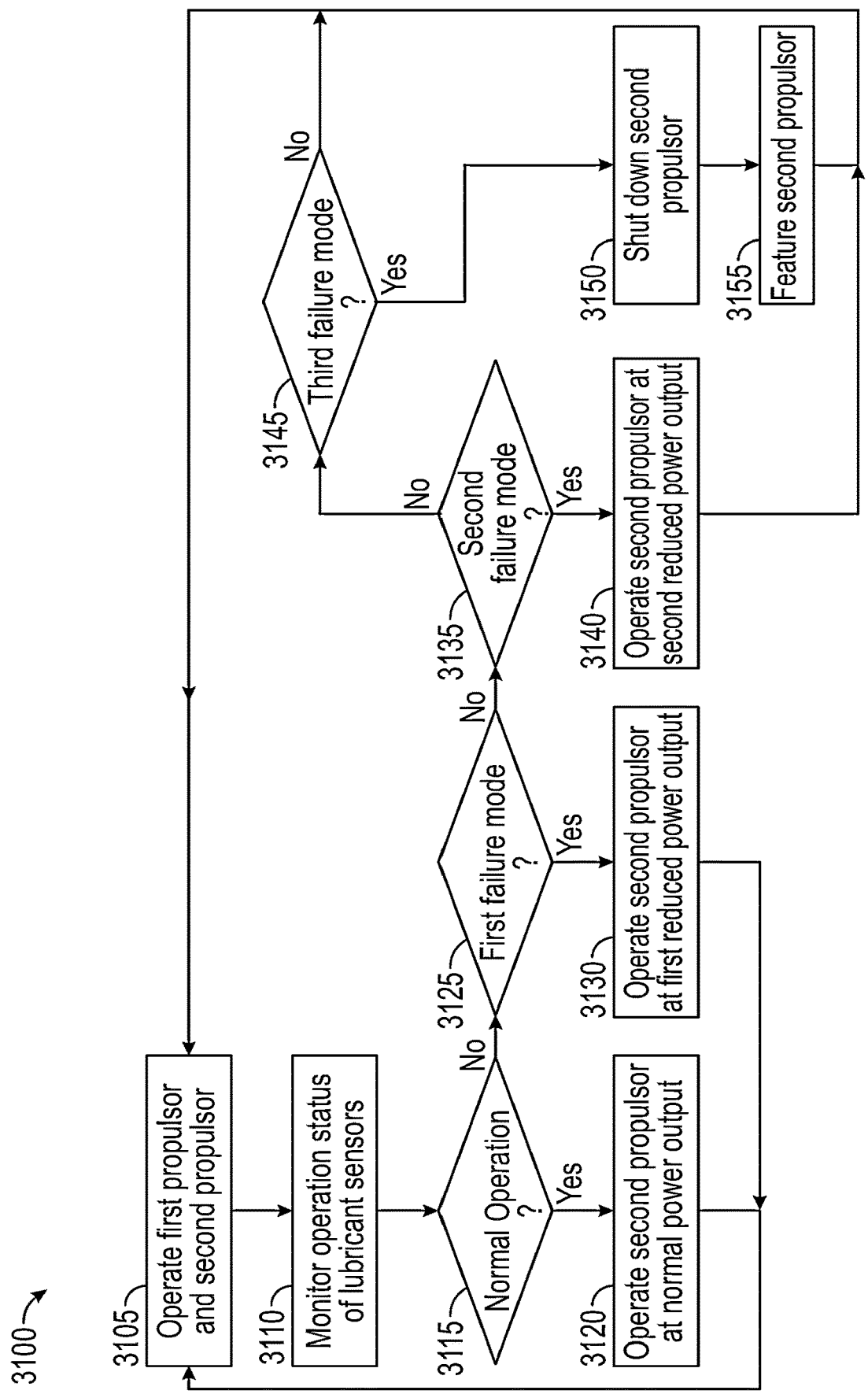
FIG. 27 is a flowchart of a method of operating the lubrication system of the propulsion system of FIG. 24, according to the present disclosure.

FIG. 27 is a flowchart of a method 3100 of operating the lubrication system 1600 of the propulsion system 2500 of FIG. 24, according to the present disclosure. While reference is made to the lubrication system 1600 and the propulsion system 2500, the method 3100 can be utilized for any of the lubrication systems detailed herein. The method 3100 can be performed by the one or more controllers 2602 (e.g., at least one of the first controller 2602a or the second controller 2602*b*). Further, while reference is made the second propulsor 38*b*, the method 3100 can also be utilized for the first propulsor 38*a*.

In step 3105, the method 3100 includes operating the first propulsor 38*a* and the second propulsor 38*b*. In particular, the method 3100 includes operating the first turbine engine 2910*a* and the second turbine engine 2910*b*. For example, the first controller 2602*a* operates the first turbine engine 2510*a*, and the second controller 2602*b* operates the second turbine engine 2510*b*. During the normal operation, the lubrication system 1600 supplies the lubricant to the gear assembly 650 and the engine bearings 37, as detailed above.

In step 3110, the method 3100 includes monitoring an operation status of the lubricant sensors 1640 of the second turbine engine 2510*b*. Monitoring the operation status of the lubricant sensors 1640 of the second turbine engine 2510*b* includes at least one of comparing inputs from the dual channels of each lubricant sensor 1640 or comparing inputs from a plurality of the lubricant sensors 1640. For example, comparing normal flow and normal pressure with a low lubricant level may indicate the lubricant level sensor 1640*a* has failed. In another example, normal flow and normal temperature with a low pressure may indicate the lubricant pressure sensor 1640*b* has failed.

In step 3115, the method 3100 includes determining whether the operating status of the lubricant sensors 1640 of the second turbine engine 2510*b* indicate a normal operation.

In step 3120, the method 3100 includes operating the second propulsor 38*b* (e.g., the second turbine engine 2510*b*) at a normal power output for a particular operating mode (e.g., idle, taxi, takeoff, cruise, landing) if the operating status of the lubricant sensors 1640 of the second turbine engine 2510*b* indicates the normal operation (step 3115: YES). Operating the second propulsor 38*b* at the normal power output includes at least one of a normal fuel flow rate, a normal power output from the second electric machine 74*b*, or a normal pitch angle of the second propulsor blades 40*b*. The normal operation includes operating the first turbine engine 2510*a* and the second turbine engine 2510*b* at the same power output level (or substantially equal power output levels). The method 3100 then proceeds back to step 3105. If the operating status of the lubricant sensors 1640 is not normal (step 3115: NO), the method 3100 proceeds to step 3125.

In step 3125, the method 3100 includes determining whether the operating status of the lubricant sensors 1640 of the second turbine engine 2510*b* indicate a first failure mode. The first failure mode includes at least one of the lubricant temperature, the lubricant pressure, the lubricant level, or the lubricant flow rate to be greater than or less than a first threshold. For example, the first failure mode includes at least one of the lubricant temperature greater than a first lubricant temperature threshold, the lubricant pressure less than a first lubricant pressure threshold, the lubricant level less than a first lubricant level threshold, or the lubricant flow rate less than a first lubricant flow rate threshold.

In step 3130, the method 3100 includes operating the second propulsor 38*b* (e.g., the second turbine engine 2510*b*) at a first reduced power output if the operating status indicates the first failure mode. The first reduced power output is less than the normal power output for the particular operating mode (e.g., idle, taxi, takeoff, cruise, landing). Operating the second propulsor 38*b* at the first reduced power output includes at least one of a first reduced fuel flow rate, a first reduced power output from the second electric machine 74*b*, or a first adjusted pitch angle of the second propulsor blades 40*b*. A reduced power output level is such that the heat imparted to the lubricant (primarily by the gearbox gear mesh) is reduced in magnitude (e.g., a 10% reduction, a 20% reduction, or a 40% reduction in thrust or output power. The method 3100 then proceeds back to step 3105. If the operating status of the lubricant sensors 1640 does not indicate the first failure mode (step 3125: NO), the method 3100 proceeds to step 3135.

In step 3135, the method 3100 includes determining whether the operating status of the lubricant sensors 1640 of the second turbine engine 2510*b* indicate a second failure mode. The second failure mode occurs when at least one of the lubricant temperature, the lubricant pressure, the lubricant level, or the lubricant flow rate is greater than or less than a second threshold. For example, the second failure mode includes at least one of the lubricant temperature is greater than a second lubricant temperature threshold, the lubricant pressure is less than a second lubricant pressure threshold, the lubricant level is less than a second lubricant level threshold, or the lubricant flow rate is less than a second lubricant flow rate threshold. The second lubricant temperature threshold is greater than the first temperature threshold. The second lubricant pressure threshold is less than the first lubricant pressure threshold. The second lubricant level threshold is less than the first lubricant level threshold. The second lubricant flow rate threshold is less than the first lubricant flow threshold.

In step 3140, the method 3100 includes operating the second propulsor 38*b* (e.g., the second turbine engine 2510*b*) at a second reduced power output if the operating status indicates the second failure mode. The second reduced power output is less than the first reduced power output for the particular operating mode (e.g., idle, taxi, takeoff, cruise, landing). Operating the second propulsor 38*b* at the second reduced power output includes at least one of a second reduced fuel flow rate, a second reduced power output from the second electric machine 74*b*, or a second adjusted pitch angle of the second propulsor blades 40*b*. The second reduced power output corresponds to a fail-safe level of operation at which the second reduced power output is a minimum power output of the second propulsor 38*b* for supplying the lubricant from the second lubrication system 1600*b* to the first lubrication system 1600*a*. The method 3100 then proceeds back to step 3105. If the operating status of the lubricant sensors 1640 does not indicate the second failure mode (step 3135: NO), the method 3100 proceeds to step 3145.

In step 3145, the method 3100 includes determining whether the operating status of the lubricant sensors 1640 of the second turbine engine 2510*b* indicate a third failure mode. The third failure mode includes at least one of the lubricant temperature, the lubricant pressure, the lubricant level, or the lubricant flow rate to be greater than or less than a third threshold. For example, the third failure mode occurs when at least one of the lubricant temperature is greater than a third lubricant temperature threshold, the lubricant pressure is less than a third lubricant pressure threshold, the lubricant level is less than a third lubricant level threshold, or the lubricant flow rate is less than a third lubricant flow rate threshold. The third lubricant temperature threshold is greater than the second temperature threshold. The third lubricant pressure threshold is less than the second lubricant pressure threshold. The third lubricant level threshold is less than the second lubricant level threshold. The third lubricant flow rate threshold is less than the second lubricant flow threshold. In some embodiments, the third failure mode includes at least one of the lubricant pressure, the lubricant level, or the lubricant flow rate being zero. In some embodiments, the third failure mode is indicated by a chip detector fault in one or more of the lubricant sensors 1640.

In such embodiments, the method 3100 includes setting a maintenance indicator flag in response to the chip detector fault, and outputting the maintenance indicator flag to a computing device. The computing device can include, for example, a display, a speaker, or the like, for outputting the maintenance indicator flag. For example, the maintenance indicator flag can include at least one of a visual alert on a display or an audio alert through a speaker. In some embodiments, the computing device is located on the aircraft (e.g., in the cockpit). In some embodiments, the computing device is located remote from the aircraft (e.g., on the ground).

In step 3150, the method 3100 includes shutting down the second propulsor 38*b* (e.g., the second turbine engine 2510*b*). When the second propulsor 38*b* is shut down, the power output is zero.

In step 3155, the method 3100 includes feathering the second propulsor 38*b* when the second propulsor 38*b* is shut down. Feathering the second propulsor 38*b* includes adjusting the pitch of the second propulsor blades 40*b* to a feather position (e.g., the chord of the second propulsor blades 40*b* is approximately parallel to the flow of the volume of air 50). Adjusting the pitch of the second propulsor blades 40*b* to the feather position reduces drag on the second propulsor 38*b* as the second propulsor 38*b* continues to move through the air (e.g., during a flight). In some embodiments, the method 3100 includes applying a brake to the second propulsor 38*b* when the second propulsor 38*b* is shut down and the second propulsor blades 40*b* are in the feather position. In this way, applying the brake prevents the second propulsor blades 40*b* from rotating when the second propulsor 38*b* is shut down. In some embodiments, applying the brake includes applying the brake on the second propulsor shaft 45*b*. The method 3100 then proceeds back to step 3105. If the operating status of the lubricant sensors 1640 does not indicate the third failure mode (step 3145: NO), the method 3100 proceeds back to step 3105.

Figure 28:
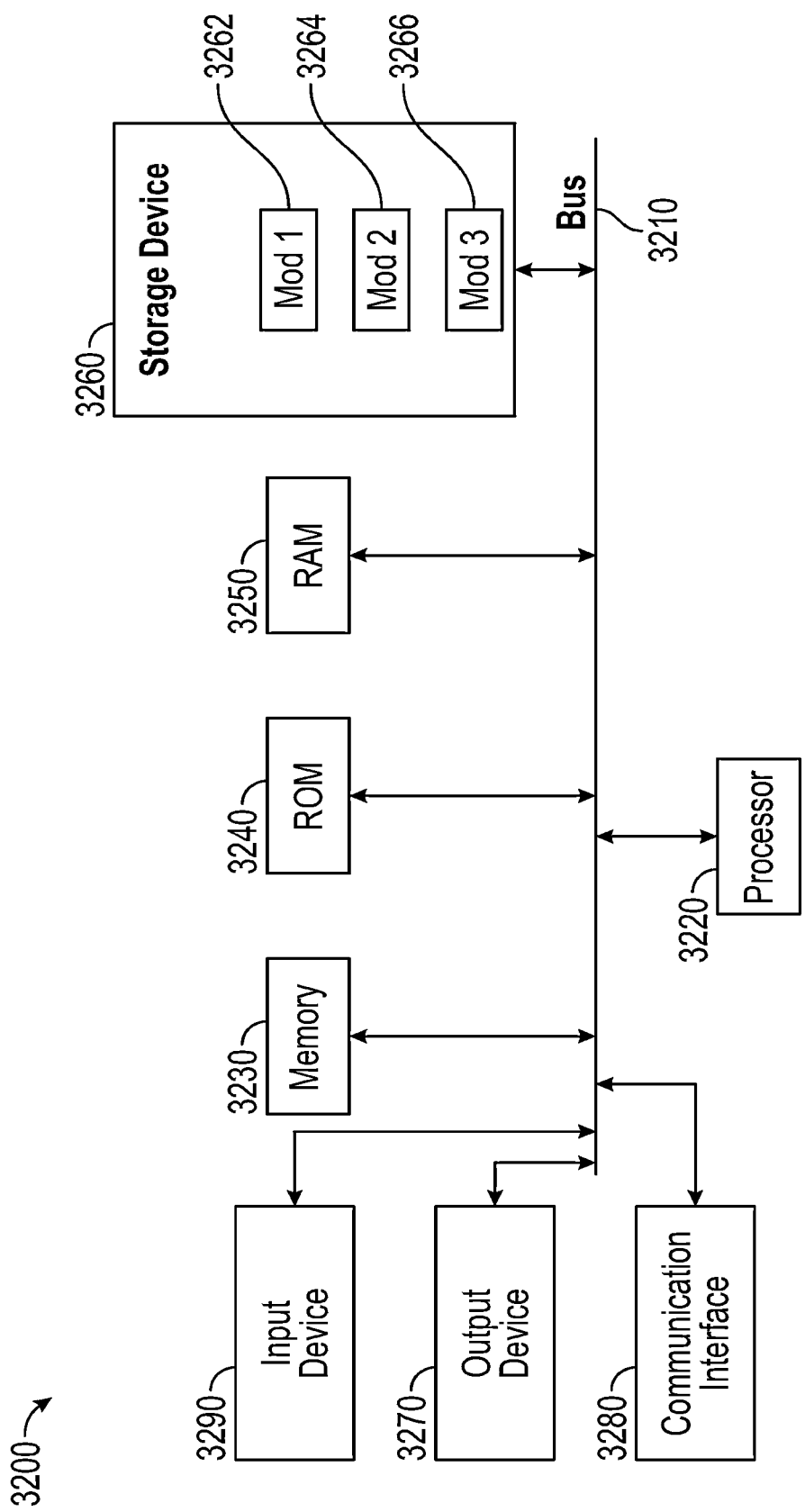
FIG. 28 is an exemplary computing system, according to the present disclosure.

FIG. 28 shows a computing system 3200, according to the present disclosure. The computing system 3200 may carry out any of the methods or systems described herein. The controllers described previously herein may be according to the computing system 3200. The computing system 3200 includes a general-purpose computing device, including a processing unit (CPU), or processor 3220, and a system bus 3210 that couples various system components including a system memory 3230 such as a read-only memory (ROM) 3240 and a random-access memory (RAM) 3250 to the processor 3220. The computing system 3200 can include a cache of high-speed memory connected directly with, in close proximity to, or integrated as part of the processor 3220. The computing system 3200 copies data from the system memory 3230 or the storage device 3260 to the cache for quick access by the processor 3220. In this way, the cache provides a performance boost that avoids the processor 3220 delays while waiting for data. These and other modules can control or be configured to control the processor 3220 to perform various actions. Other system memory 3230 may be available for use as well. The system memory 3230 can include multiple different types of memory with different performance characteristics. The disclosure may operate on a computing system 3200 with more than one processor 3220 or on a group or cluster of computing devices networked together to provide greater processing capability. The processor 3220 can include any general-purpose processor and a hardware module or software module, such as module 1 3262, module 2 3264, and module 3 3266 stored in the storage device 3260, configured to control the processor 3220 as well as a special-purpose processor where software instructions are incorporated into the actual processor design. The processor 3220 may essentially be a completely self-contained computing system, containing multiple cores or processors, a bus, memory controller, cache, etc. A multi-core processor may be symmetric or asymmetric.

The system bus 3210 may be any of several types of bus structures including a memory bus or memory controller, a peripheral bus, and a local bus using any of a variety of bus architectures. A basic input/output (BIOS) stored in the ROM 3240 or the like, may provide the basic routine that helps to transfer information between elements within the computing system 3200, such as during start-up. The computing system 3200 further includes one or more storage devices 3260 such as a hard disk drive, a magnetic disk drive, an optical disk drive, a tape drive, or the like. The storage devices 3260 can include software modules 3262, 3264, and 3266 for controlling the processor 3220. Other hardware or software modules are contemplated. The storage device 3260 is connected to the system bus 3210 by a drive interface. The drives and the associated computer-readable storage media provide nonvolatile storage of computer-readable instructions, data structures, program modules and other data for the computing system 3200. In one aspect, a hardware module that performs a particular function includes the software component stored in a tangible computer-readable storage medium in connection with the necessary hardware components, such as the processor 3220, the system bus 3210, the output device 3270, and so forth, to carry out the function. In another aspect, the computing system 3200 can use a processor and a computer-readable storage medium to store instructions which, when executed by a processor (e.g., one or more processors), cause the processor to perform a method or other specific actions. The basic components and appropriate variations are contemplated depending on the type of device, such as whether the computing system 3200 is a small, handheld computing device, a desktop computer, or a computer server.

Although certain embodiments described herein employs the storage device 3260, other types of computer-readable media which can store data that are accessible by a computer, such as magnetic cassettes, flash memory cards, digital versatile disks, cartridges, random-access memories (RAMs) 3250, and a read-only memory (ROM) 3240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 3200, an input device 3290 represents any number of input mechanisms, such as a microphone for speech, a touch-sensitive screen for gesture or graphical input, keyboard, mouse, motion input, speech and so forth. An output device 3270 can also be one or more of a number of output mechanisms known to those of skill in the art. In some instances, multimodal systems enable a user to provide multiple types of input to communicate with the computing system 3200. The communications interface 3280 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Accordingly, the present disclosure provides for propulsion systems that include hybrid electric turboprop engines. The turbine engine control systems herein can control the turbine engine and the remote propulsor based on a single throttle lever input. In this way, the propulsion systems of the present disclosure require only a single throttle lever to be actuated by the pilot to control both the turbine engine and the remote propulsor, thus, reducing pilot workload, allowing the pilot to better focus attention on other needs. The present disclosure also provides for a propulsion system that incorporates a gearbox assembly with a gearbox lubrication system that is separate from the engine lubrication system. The gearbox lubrication system can be powered by the electric machine or by the remote propulsor. In this way, the propulsion system can lubricate the gearbox assembly even when the turbine engine is shut down and the turbine shaft is no longer powering the pump of the engine lubrication system. The present disclosure also provides for a propulsion system having an electrically powered lubrication system that allows the turbo-engine to be shut down, while still providing lubrication the propulsor. The lubrication system sensors provide data to the remote engine as well as the local engine so as to allow for safe control of the local engine by the remote engine. Lastly, the present disclosure provides a plurality of lubricant sensors (e.g., temperature sensors, pressure sensors, level sensors, or flow rate sensors) associated with the lubrication system that enable fault monitoring by the remote turbine engine. The turbine engine control system identifies failure modes of the lubricant sensors and operates the remote turbine engine at a reduced power or shutting down the propulsor based on the failure modes.

Further aspects are provided by the subject matter of the following clauses:

An aircraft engine assembly comprising: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; an intake channel of the gas turbine engine configured to receive an incoming flow of air and thereby form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

The aircraft engine assembly of one or more of these clauses, which further includes a tail cone, and wherein the electric machine is located within the tail cone.

The aircraft engine assembly of one or more of these clauses, wherein the low pressure shaft is oriented to extend through the intake channel such that an axial portion of the low pressure shaft is surrounded by the incoming flow of air in the intake channel.

The aircraft engine assembly of one or more of these clauses, wherein the electric machine is positioned to receive an impingement of the intake flow of air.

The aircraft engine assembly of one or more of these clauses, wherein an offtake flow of air is extracted from the intake flow of air, the offtake flow of air forming a cooling flow of air routed to the electric machine.

The aircraft engine assembly of one or more of these clauses, wherein the low pressure turbine includes variable stator vanes, wherein the gas turbine engine includes an engine controller, and wherein the variable stator vanes of the low pressure turbine are controlled by the controller to change position when the electric machine changes from a first power level to a second power level.

The aircraft engine assembly of one or more of these clauses, which further includes a propeller located on a forward end of the gas turbine engine and coupled via the low pressure shaft with the low pressure turbine, and which further includes a gearbox coupled between the low pressure shaft and the propeller.

The aircraft engine assembly of one or more of these clauses, which further includes a propeller located on a forward end of the gas turbine engine and coupled via the low pressure shaft with the low pressure turbine, and wherein the propeller is variable pitch propeller, and wherein the electric machine is coaxial with the low pressure shaft.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing the intake flow of air in the first axial flow direction toward the high pressure compressor.

An aircraft powerplant comprising: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; and an electric machine coupled to the low pressure shaft and located on an opposite side of the gas turbine engine from the propeller, the electric machine positioned to be cooled by a portion of the intake flow of air defined by the intake channel.

The aircraft powerplant of one or more of these clauses, which further includes an engine nacelle enclosing the gas turbine engine, the electric machine located in an enclosed space aft of the high pressure compressor.

The aircraft powerplant of one or more of these clauses, wherein the engine nacelle includes a discharge opening sized to permit discharge of the portion of the intake flow of air.

The aircraft powerplant of one or more of these clauses, wherein the electric machine is in a conductive heat exchange communication with the intake flow of air.

The aircraft powerplant of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing air in the first axial flow direction toward the high pressure compressor.

The aircraft powerplant of one or more of these clauses, wherein the gas turbine engine includes an engine controller, and wherein the engine controller commands a change in fuel flow rate to a combustion section of the gas turbine engine when the electric machine changes from a first power level to a second power level.

The aircraft powerplant of one or more of these clauses, wherein the low pressure turbine is a free turbine.

The aircraft powerplant of one or more of these clauses, an engine exhaust configured to receive an exhaust flow in the first axial flow direction from the low pressure turbine and discharge the exhaust flow having a second axial direction component reverse of the first axial direction.

A method of cooling an electric machine comprising: operating a gas turbine engine having a high pressure compressor, a high pressure turbine, and a high pressure shaft, the high pressure compressor coupled to the high pressure turbine via the high pressure shaft, the gas turbine engine also including a low pressure turbine coupled via a low pressure shaft with a propeller; receiving an incoming flow of air in an incoming flow of air direction into an intake channel of the gas turbine engine, the incoming flow of air used in a combustion process of the gas turbine engine, the intake channel forming an intake channel flow path and defining an intake flow air; turning the intake flow of air using the intake channel from the incoming flow of air direction to an axial flow direction of the gas turbine engine; and cooling an electric machine located aft of the low pressure turbine using the intake flow of air flowing through the intake channel flow path.

The method of cooling an electric machine of one or more of these clauses, wherein the cooling includes impingement cooling the electric machine using the intake flow of air.

The method of cooling an electric machine of one or more of these clauses, wherein turning the flow includes changing shape of the flow from a non-annular shape to an annular shape.

The method of cooling an electric machine of one or more of these clauses, wherein the electric machine is located in a tail cone located aft of the gas turbine engine.

An aircraft engine assembly comprising: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a first propeller located on a forward end of the gas turbine engine and coupled via the low pressure shaft with the low pressure turbine; a second propeller located remote from the gas turbine engine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and a turbine engine control system comprising: a single throttle lever; and a controller that: receives an input from the single throttle lever; and controls the gas turbine engine and the second propeller based on the input from the single throttle lever.

The aircraft engine assembly of any preceding clause, wherein the controller controls at least one of a rotational speed of the turbo-engine, a rotational speed of the first propeller, a pitch of a plurality of first propeller blades of the first propeller, or a torque of the first propeller.

The aircraft engine assembly of any preceding clause, wherein the controller controls at least one of a rotational speed of the second propeller, a pitch of a plurality of second propeller blades of the second propeller, or a torque of the second propeller.

The aircraft engine assembly of any preceding clause, wherein the controller receives a position input from the single throttle lever, converts the position input into at least one of a turbo-engine setting, a first propeller setting, or a second propeller setting, and controls the second propeller and at least one of the turbo-engine or the first propeller based on the at least one of the turbo-engine setting, the first propeller setting, or the second propeller setting.

The aircraft engine assembly of any preceding clause, further comprising an aircraft power supply that powers the second propeller.

The aircraft engine assembly of any preceding clause, wherein the gas turbine engine is a first gas turbine engine and the turbo-engine is a first turbo-engine, and further comprising a second turbine engine having a second turbo-engine, and the second propeller being drivingly coupled to the second turbo-engine.

The aircraft engine assembly of any preceding clause, wherein the controller controls the second turbine engine based on the input from the single throttle lever when the second turbine engine is in a standby operating mode or a failure mode.

The aircraft engine assembly of any preceding clause, wherein the electric machine is drivingly coupled to the first propeller, the electric machine powering the first propeller when the gas turbine engine is shut down.

The aircraft engine assembly of any preceding clause, wherein the electric machine is a first electric machine, and further comprising a second electric machine that is drivingly coupled to the second propeller, the second electric machine powering the second propeller.

The aircraft engine assembly of any preceding clause, further comprising a power conduit that provides electrical communication from the first electric machine to the second electric machine, the first electric machine powering the second electric machine through the power conduit.

The aircraft engine assembly of any preceding clause, further comprising a gearbox coupled between the low pressure shaft and the first propeller.

The aircraft engine assembly of any preceding clause, further comprising a gearbox lubrication system.

The aircraft engine assembly of any preceding clause, wherein the gearbox lubrication system further comprises a gearbox lubricant reservoir, a pump, and a gearbox lubricant supply line.

The aircraft engine assembly of any preceding clause, wherein the gearbox lubrication system further comprises a heat exchanger.

The aircraft engine assembly of any preceding clause, wherein the pump is in fluid communication with the low pressure shaft.

The aircraft engine assembly of any preceding clause, wherein the gearbox lubrication system further comprises a lubricant sensor.

The aircraft engine assembly of any preceding clause, wherein the controller is in communication with the lubricant sensor.

The aircraft engine assembly of any preceding clause, wherein the lubricant sensor is a first lubricant sensor and the controller is a first controller, the first lubricant sensor and the first controller associated with the first propeller, and further comprising a second lubricant sensor and a second controller associated with the second propeller.

The aircraft engine assembly of any preceding clause, wherein the lubricant sensor includes a lubricant level sensor and a lubricant pressure sensor.

The aircraft engine assembly of any preceding clause, wherein the gearbox lubrication system further comprises one or more valves controllable by the controller.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

We claim:

1. An aircraft engine assembly comprising:
a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine;
a first propeller located on a forward end of the gas turbine engine and coupled via the low pressure shaft with the low pressure turbine;
a second propeller located remote from the gas turbine engine;
an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction;
an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated; and
a turbine engine control system comprising:
a single throttle lever; and
a controller that:
receives an input from the single throttle lever; and
controls the gas turbine engine and the second propeller based on the input from the single throttle lever.

2. The aircraft engine assembly of claim 1, wherein the controller controls at least one of a rotational speed of the gas turbine engine, a rotational speed of the first propeller, a pitch of a plurality of first propeller blades of the first propeller, or a torque of the first propeller.

3. The aircraft engine assembly of claim 1, wherein the controller controls at least one of a rotational speed of the second propeller, a pitch of a plurality of second propeller blades of the second propeller, or a torque of the second propeller.

4. The aircraft engine assembly of claim 1, wherein the controller receives a position input from the single throttle lever, converts the position input into at least one of a gas turbine engine setting, a first propeller setting, or a second propeller setting, and controls the second propeller and at least one of the gas turbine engine or the first propeller based on the at least one of the gas turbine engine setting, the first propeller setting, or the second propeller setting.

5. The aircraft engine assembly of claim 1, further comprising an aircraft power supply that powers the second propeller.

6. The aircraft engine assembly of claim 1, wherein the gas turbine engine is a first gas turbine engine, and further comprising a second turbine engine, and the second propeller being drivingly coupled to the second turbine engine.

7. The aircraft engine assembly of claim 6, wherein the controller controls the second turbine engine based on the input from the single throttle lever when the second turbine engine is in a standby operating mode or a failure mode.

8. The aircraft engine assembly of claim 1, wherein the electric machine is drivingly coupled to the first propeller, the electric machine powering the first propeller when the gas turbine engine is shut down.

9. The aircraft engine assembly of claim 8, wherein the electric machine is a first electric machine, and further comprising a second electric machine that is drivingly coupled to the second propeller, the second electric machine powering the second propeller.

10. The aircraft engine assembly of claim 9, further comprising a power conduit that provides electrical communication from the first electric machine to the second electric machine, the first electric machine powering the second electric machine through the power conduit.

11. The aircraft engine assembly of claim 1, further comprising a gearbox coupled between the low pressure shaft and the first propeller.

12. The aircraft engine assembly of claim 11, further comprising a gearbox lubrication system.

13. The aircraft engine assembly of claim 12, wherein the gearbox lubrication system further comprises a gearbox lubricant reservoir, a pump, and a gearbox lubricant supply line.

14. The aircraft engine assembly of claim 13, wherein the gearbox lubrication system further comprises a heat exchanger.

15. The aircraft engine assembly of claim 13, wherein the pump is in fluid communication with the low pressure shaft.

16. The aircraft engine assembly of claim 13, wherein the gearbox lubrication system further comprises a lubricant sensor.

17. The aircraft engine assembly of claim 16, wherein the controller is in communication with the lubricant sensor.

18. The aircraft engine assembly of claim 17, wherein the lubricant sensor is a first lubricant sensor and the controller is a first controller, the first lubricant sensor and the first controller associated with the first propeller, and further comprising a second lubricant sensor and a second controller associated with the second propeller.

19. The aircraft engine assembly of claim 16, wherein the lubricant sensor includes a lubricant level sensor and a lubricant pressure sensor.

20. The aircraft engine assembly of claim 17, wherein the gearbox lubrication system further comprises one or more valves controllable by the controller.

* * * * *